United States Patent
Barnea

(10) Patent No.: US 12,458,681 B2
(45) Date of Patent: Nov. 4, 2025

(54) COMPOSITIONS AND METHOD FOR TREATING ACUTE RADIATION SYNDROME

(71) Applicant: Prince Biotech, LLC, Mason, OH (US)

(72) Inventor: Eytan R. Barnea, New York, NY (US)

(73) Assignee: Prince Biotech, LLC, Mason, OH (US)

( * ) Notice: Subject to any disclaimer, the term of this patent is extended or adjusted under 35 U.S.C. 154(b) by 0 days.

(21) Appl. No.: 18/731,133

(22) Filed: May 31, 2024

(65) Prior Publication Data

US 2024/0350580 A1 Oct. 24, 2024

Related U.S. Application Data

(63) Continuation of application No. 17/472,574, filed on Sep. 10, 2021, now abandoned, which is a continuation of application No. 15/512,001, filed as application No. PCT/US2015/050532 on Sep. 16, 2015, now abandoned.

(60) Provisional application No. 62/211,660, filed on Aug. 28, 2015, provisional application No. 62/113,298, filed on Feb. 6, 2015, provisional application No. 62/051,077, filed on Sep. 16, 2014.

(51) Int. Cl.
| | |
|---|---|
| *A61K 38/10* | (2006.01) |
| *A61K 9/00* | (2006.01) |
| *A61K 38/07* | (2006.01) |
| *A61K 38/08* | (2019.01) |
| *A61K 39/00* | (2006.01) |
| *C12N 5/0789* | (2010.01) |

(52) U.S. Cl.
CPC ............ *A61K 38/10* (2013.01); *A61K 9/0019* (2013.01); *A61K 38/07* (2013.01); *A61K 38/08* (2013.01); *A61K 39/001* (2013.01); *C12N 5/0647* (2013.01); *C12N 2501/998* (2013.01)

(58) Field of Classification Search
CPC ...... A61K 38/10; A61K 9/0019; A61K 38/07; A61K 38/08; A61K 39/001; C07K 7/08; C12N 5/0647; C12N 2501/998; A61P 43/00
See application file for complete search history.

(56) References Cited

U.S. PATENT DOCUMENTS 4,629,722 A * 12/1986 Ribi ................. A61K 35/74
424/282.1

FOREIGN PATENT DOCUMENTS

| WO | WO-2013106273 A2 * | 7/2013 | ................. A61P 1/04 |
| WO | WO-2015061483 A2 * | 4/2015 | ......... A61K 38/1709 |

* cited by examiner

*Primary Examiner* — Jeanette M Lieb
(74) *Attorney, Agent, or Firm* — FROST BROWN TODD LLP

(57) ABSTRACT

Embodiments are directed to a method of treating acute radiation syndrome comprising administering to a subject following exposure to radiation a PreImplantation factor (PIF) peptide. Some embodiments describe a method of treating acute radiation syndrome following radiation exposure comprising transplanting bone marrow that has been exposed to a PIF peptide prior to transplantation into a subject. Other embodiments describe a method of increasing engraftment of a transplanted organ, tissue, or cell by pre-exposing the organ, tissue, or cell to a PIF peptide.

20 Claims, 64 Drawing Sheets

Specification includes a Sequence Listing.

LVEDD: Left ventricular end diastolic diameter
LVESD: Left ventricular end systolic diameter 24 hours after beginning of the treatment. BAC were treated with PIF for 7 days. Every day supernatant was collected and tested for cortisol level. Significant difference between PIF treated group and control group was observed only 24 hours after beginning of the treatment. All data presented as mean from 6 wells ± SD, statistics: t-test.

COMPOSITIONS AND METHOD FOR TREATING ACUTE RADIATION SYNDROME

CROSS-REFERENCE TO RELATED APPLICATIONS

This present application is a continuation of U.S. patent application Ser. No. 17/472,574, filed Sep. 10, 2021, which is a continuation of U.S. patent application Ser. No. 15/512,001, filed Mar. 16, 2017, which is a U.S. National Stage Entry under 35 U.S.C. § 371 of PCT/US15/50532, filed Sep. 16, 2015, which claims priority to and the benefit of U.S. Provisional Patent Application Ser. No. 62/051,077 filed Sep. 16, 2014; U.S. Provisional Patent Application Ser. No. 62/113,298 filed Feb. 6, 2015; and U.S. Provisional Patent Application Ser. No. 62/211,660 filed Aug. 28, 2015, the entire contents of all of which are incorporated herein by reference.

SEQUENCE LISTING

In compliance with the final rule on the "Standard for Presentation of Nucleotide and Amino Acid Sequence Listings Using extensible Markup Language (XML) in Patent Applications to Implement WIPO Standard ST.26 (Federal Register, vol. 87, no. 98, 30806-30821) and 37 C.F.R. §§ 1.831 through 1.835 pertaining to the same, the instant application includes the Sequence Listing submitted in XML format (and in compliance with WIPO standard ST.26) via Patent Center, and is also hereby incorporated by reference in its entirety. The XML file, created on Jul. 2, 2024, is named 18731133_REV_Sequence_Listing.xml, and is 60 Kilobytes in size.

SUMMARY

In an embodiment, a method of treating acute radiation syndrome in a subject in need thereof after the subject has been exposed to radiation may comprise administering a therapeutically effective amount of a PreImplantation Factor (PIF) peptide selected from SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a pharmaceutical composition comprising a therapeutically effective amount of a PIF peptide selected from SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof, may be used for the treatment of acute radiation syndrome.

In an embodiment, a pharmaceutical composition comprising a therapeutically effective amount of a PIF peptide selected from SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof, may be used for the manufacture of a medicament for treating acute radiation syndrome.

In an embodiment, a method of treating acute radiation syndrome following radiation exposure may comprise transplanting one or a plurality of bone marrow cells into a subject in need thereof, wherein the bone marrow is pre-exposed to a therapeutically effective amount of PIF peptide prior to transplantation, and wherein the PIF peptide selected from SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a method of treating and/or preventing a heart disorder or heart failure may comprise transplanting one or a plurality of heart cells into a subject in need thereof, wherein the heart cells are pre-exposed to a therapeutically effective amount of a PIF peptide prior to transplantation, and wherein the PIF peptide selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a method of treating and/or preventing an adrenal cell disorder may comprise transplanting one or a plurality of adrenal cells into a subject in need thereof, wherein the adrenal cells are pre-exposed to a therapeutically effective amount of a PIF peptide prior to transplantation, and wherein the PIF peptide selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a method of treating and/or preventing a blood disorder may comprise transplanting one or a plurality of hematopoietic cells into a subject in need thereof, wherein the hematopoietic cells are pre-exposed to a therapeutically effective amount of a PIF peptide prior to transplantation, and wherein the PIF peptide selected from one or a combination of 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a method of increasing the viability of an organ, tissue, or cell prior to its transplantation into a subject in need of transplantation may comprise treating the organ, tissue or cell with a therapeutically effective amount of PIF peptide prior to transplantation, wherein the PIF peptide is selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In an embodiment, a method of increasing the likelihood of acceptance of a transplant of a donor organ, tissue, or cell into a subject may comprise exposing the organ, tissue or cell to one or more compositions comprising at least one PIF peptide or a mutant thereof or a pharmaceutically acceptable salt thereof prior to transplanting the organ, tissue, or cell into the subject, wherein the PIF peptide is selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

A method of reducing the likelihood of rejection of an engrafted tissue may comprise exposing the engrafted tissue to one or more pharmaceutical compositions comprising a therapeutically effective amount of at least one PIF peptide or a mutant thereof or a pharmaceutically acceptable salt thereof prior to transplanting the tissue into a subject, wherein the PIF peptide is selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

A method of increasing production of hematopoietic cells in a subject may comprise administering one or more pharmaceutical compositions comprising a therapeutically effective amount of at least one PIF peptide or a mutant thereof or a pharmaceutically acceptable salt thereof, wherein the PIF peptide is selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

A method of increasing the likelihood of successful engraftment of a transplanted organ, tissue, or cells may comprise transplanting an organ, tissue, or cell into a subject in need thereof, wherein the organ, tissue, or cell is pre-exposed to a PIF peptide prior to transplantation, wherein the PIF peptide is selected from one or a combination of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

A method of treating and/or preventing adult or juvenile type I or type II diabetes may comprise transplanting one or a plurality of pancreatic islet cells into a subject in need thereof, wherein the islet cells are pre-exposed to a therapeutically effective amount of PIF peptide prior to transplantation, and wherein the PIF peptide is selected from one or a combination of 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, and combinations thereof.

In any of the above-described embodiments, the subject may or may not receive a bone marrow transplant (BMT). In any of the above-described embodiments, the acute radiation syndrome may be caused by exposure to lethal or sub-lethal radiation. In any of the above-described embodiments, the acute radiation syndrome may be caused by exposure to a radiation dose of from about 100 rads to about 6000 rads. In any of the above-described embodiments, the acute radiation syndrome may or may not comprise delayed effects of acute radiation exposure, including damage to any organ, tissue, or cell.

In an embodiment, a method of increasing the likelihood of a transplant recipient's acceptance of donor tissue may comprise exposing the donor tissue to one or more compositions comprising a PIF peptide or a mutant thereof prior to transplanting the tissue into the recipient.

In an embodiment, a method of reducing the likelihood of rejection of engrafted tissue may comprise exposing the tissue to one or more pharmaceutical compositions comprising a therapeutically effective amount of a PIF peptide or a mutant thereof prior to transplanting the tissue.

In an embodiment, a method of increasing the production of hematopoietic cells in a subject with a depleted number of hematopoietic cells may comprise administering one or more pharmaceutical compositions comprising a therapeutically effective amount of a PIF peptide or a mutant thereof. In some embodiments, the hematopoietic cells may be red blood cells. In some embodiments, the hematopoietic cells may be platelets.

In some embodiments, the step of administering to the subject at least one PIF peptide, an analog thereof, or a pharmaceutically acceptable salt thereof comprises administering a therapeutically effective dose of the at least one PIF molecule, an analog thereof, or a pharmaceutically acceptable salt thereof.

In some embodiments, the step of administering to the subject at least one PIF peptide, an analog thereof, or a pharmaceutically acceptable salt thereof comprises administering a therapeutically effective dose of the PIF peptide, an analog thereof, or pharmaceutically acceptable salt thereof from about 0.001 mg/kg to about 200 mg/kg.

In some embodiments, the step of administering to the subject at least one PIF peptide, an analog thereof, or a pharmaceutically acceptable salt thereof comprises administering a therapeutically effective dose of the PIF peptide, an analog thereof, or pharmaceutically acceptable salt thereof from about 0.5 mg/kg to about 5 mg/kg.

In some embodiments, the PIF peptide, analog thereof, or pharmaceutically acceptable salt thereof comprises a chemical targeting moiety and/or a radioactive moiety.

In some embodiments, the at least one inhibitor of nuclear translocation of beta-catenin or pharmaceutically acceptable salt thereof comprises at least one radioactive moiety comprising at least one or a combination of the following isotopes: $^2$H, $^3$H, $^{13}$C, $^{14}$C, $^{15}$N, $^{16}$O, $^{17}$O, $^{31}$P, $^{32}$P, $^{35}$S, $^{18}$F, and $^{36}$Cl.

In some embodiments, the method further comprises administering at least one analgesic and/or one anti-inflammatory compound.

In some embodiments, the method further comprises administering at least one analgesic and or one anti-inflammatory compound before, after, or simultaneously with the administration of a therapeutically effective dose of at least one PIF peptide, an analog thereof or pharmaceutically acceptable salt thereof.

In some embodiments, the therapeutically effective dose is from about 1.0 mg/kg to about 5.5 mg/kg, wherein kg is kilograms of the subject and mg is milligrams of the therapeutically effective dose.

In some embodiments, the PIF peptide comprises SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, mimetics thereof, or pharmaceutically acceptable salts thereof, and/or combinations thereof. In some embodiments, the PIF peptide comprises SEQ ID NO: 1, mimetics thereof, or pharmaceutically acceptable salts thereof, and/or combinations thereof. In some embodiments, the PIF peptide comprises SEQ ID NO: 2, mimetics thereof, or pharmaceutically acceptable salts thereof, and/or combinations thereof. In some embodiments, the PIF peptide comprises SEQ ID NO: 3, mimetics thereof, or pharmaceutically acceptable salts thereof, and/or combinations thereof. In some embodiments, the PIF peptide comprises SEQ ID NO: 4, mimetics thereof, or pharmaceutically acceptable salts thereof, and/or combinations thereof. In some embodiments, the PIF peptide comprises SEQ ID NO: 5, mimetics thereof, or pharmaceutically acceptable salts thereof, and/or combinations thereof. In some embodiments, the PIF peptide comprises SEQ ID NO: 6, mimetics thereof, or pharmaceutically acceptable salts thereof, and/or combinations thereof. In some embodiments, the PIF peptide comprises SEQ ID NO: 7, mimetics thereof, or pharmaceutically acceptable salts thereof, and/or combinations thereof. In some embodiments, the PIF peptide comprises SEQ ID NO: 8, mimetics thereof, or pharmaceutically acceptable salts thereof, and/or combinations thereof. In some embodiments, the PIF peptide comprises SEQ ID NO: 9, mimetics thereof, or pharmaceutically acceptable salts thereof, and/or combinations thereof. In some embodiments, the PIF peptide comprises SEQ ID NO: 10, mimetics thereof, or pharmaceutically acceptable salts thereof, and/or combinations thereof. In some embodiments, the PIF peptide comprises SEQ ID NO: 11, mimetics thereof, or pharmaceutically acceptable salts thereof, and/or combinations thereof. In some embodiments, the PIF peptide comprises SEQ ID NO: 12, mimetics thereof, or pharmaceutically acceptable salts thereof, and/or combinations thereof. In some embodiments, the PIF peptide comprises SEQ ID NO: 13, mimetics thereof, or pharmaceutically acceptable salts thereof, and/or combinations thereof. In some embodiments, the PIF peptide comprises SEQ ID NO: 14, mimetics thereof, or pharmaceutically acceptable salts thereof, and/or combinations thereof. In some embodiments, the PIF peptide comprises SEQ ID NO: 15, mimetics thereof, or pharmaceutically acceptable salts thereof, and/or combinations thereof. In some embodiments, the PIF peptide comprises SEQ ID NO: 16, mimetics thereof, or pharmaceutically acceptable salts thereof, and/or combinations thereof. In some embodiments, the PIF peptide comprises SEQ ID NO: 17, mimetics thereof, or pharmaceutically acceptable salts thereof, and/or combinations thereof. In some embodiments, the PIF peptide comprises SEQ ID NO: 18, mimetics thereof, or pharmaceutically acceptable salts thereof, and/or combinations thereof. In some embodiments, the PIF peptide comprises SEQ ID NO: 19, mimetics thereof, or pharmaceutically acceptable salts thereof, and/or combinations thereof. In some embodiments, the PIF peptide comprises SEQ ID NO: 20, mimetics thereof, or pharmaceutically acceptable salts thereof, and/or combinations thereof. In some embodiments, the PIF peptide comprises SEQ ID NO: 21, mimetics thereof, or pharmaceutically acceptable salts thereof, and/or combinations thereof. In some embodiments, the PIF peptide comprises SEQ ID NO: 21, mimetics thereof, or pharmaceutically acceptable salts thereof, and/or combinations thereof. In some embodiments, the PIF peptide comprises SEQ ID NO: 22, mimetics thereof, or pharmaceutically acceptable salts thereof, and/or combinations thereof. In some embodiments, the PIF peptide comprises SEQ ID NO: 23, mimetics thereof, or pharmaceutically acceptable salts thereof, and/or combinations thereof. In some embodiments, the PIF peptide comprises SEQ ID NO: 24, mimetics thereof, or pharmaceutically acceptable salts thereof, and/or combinations thereof. In some embodiments, the PIF peptide comprises SEQ ID NO: 25, mimetics thereof, or pharmaceutically acceptable salts thereof, and/or combinations thereof. In some embodiments, the PIF peptide comprises SEQ ID NO: 26, mimetics thereof, or pharmaceutically acceptable salts thereof, and/or combinations thereof. In some embodiments, the PIF peptide comprises SEQ ID NO: 27, mimetics thereof, or pharmaceutically acceptable salts thereof, and/or combinations thereof. In some embodiments, the PIF peptide comprises SEQ ID NO: 28, mimetics thereof, or pharmaceutically acceptable salts thereof, and/or combinations thereof. In some embodiments, the PIF peptide comprises SEQ ID NO: 29, mimetics thereof, or pharmaceutically acceptable salts thereof, and/or combinations thereof.

The present disclosure also relates to a method of treating or preventing acute radiation syndrome in a subject in need thereof, the method comprising administering to the subject at least one pharmaceutical composition comprising: pre-implantation factor (PIF) peptide, an analog thereof, or a pharmaceutically acceptable salt thereof; and a pharmaceutically acceptable carrier.

In some embodiments, the pharmaceutically acceptable carrier is sterile and pyrogen-free water.

In some embodiments, the therapeutically effective dose of one or a combination of PIF peptide or analogs thereof or pharmaceutically acceptable salts thereof is about 0.2 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.3 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.4 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.5 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.6 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.7 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.75 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.8 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 0.9 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 1.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 1.5 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 2.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 3.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 4.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 5.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 6.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 7.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 8.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 9.0 mg/kg, wherein kg is kilograms of the subject and mg is milligrams of the therapeutically effective dose. In some embodiments, the therapeutically effective dose of one or a combination of PIF peptide or analogs thereof or pharmaceutically acceptable salts thereof is about 10.0 mg/kg, wherein kg is kilograms of the subject and mg is milligrams of the therapeutically effective dose.

In some embodiments, a PIF peptide, mimetics thereof, or combinations thereof may be administered within about 24 hours after exposure to radiation. In some embodiments, a PIF peptide, mimetics thereof, or combinations thereof may be administered intermittently or continuously for about 2-14 days. In some embodiments, a PIF peptide, mimetics thereof, or combinations thereof may be administered intermittently or continuously for about 2 days. In some embodiments, a PIF peptide, mimetics thereof, or combinations thereof may be administered intermittently or continuously for about 3 days. In some embodiments, a PIF peptide, mimetics thereof, or combinations thereof may be administered intermittently or continuously for about 4 days. In some embodiments, a PIF peptide, mimetics thereof, or combinations thereof may be administered intermittently or continuously for about 5 days. In some embodiments, a PIF peptide, mimetics thereof, or combinations thereof may be administered intermittently or continuously for about 6 days. In some embodiments, a PIF peptide, mimetics thereof, or combinations thereof may be administered intermittently or continuously for about 7 days. In some embodiments, a PIF peptide, mimetics thereof, or combinations thereof may be administered intermittently or continuously for about 8 days. In some embodiments, a PIF peptide, mimetics thereof, or combinations thereof may be administered intermittently or continuously for about 9 days. In some embodiments, a PIF peptide, mimetics thereof, or combinations thereof may be administered intermittently or continuously for about 10 days. In some embodiments, a PIF peptide, mimetics thereof, or combinations thereof may be administered intermittently or continuously for about 11 days. In some embodiments, a PIF peptide, mimetics thereof, or combinations thereof may be administered intermittently or continuously for about 12 days. In some embodiments, a PIF peptide, mimetics thereof, or combinations thereof may be administered intermittently or continuously for about 13 days. In some embodiments, a PIF peptide, mimetics thereof, or combinations thereof may be administered intermittently or continuously for about 14 days. In some embodiments, a PIF peptide, mimetics thereof, or combinations thereof may be administered intermittently, the dosing regimen comprising about 1 dose per day or about 1 dose every 2 days for at least about 12 weeks.

The present disclosure also relates to a pharmaceutical composition comprising (i) a therapeutically effective dose of one or a combination of PIF peptide or analogs thereof or pharmaceutically acceptable salts thereof; and (ii) a pharmaceutically acceptable carrier.

In some embodiments, the pharmaceutically acceptable carrier is sterile and pyrogen-free water or Lactated Ringer's solution.

In some embodiments, the composition further comprises a therapeutically effective dose of one or a plurality of active agents.

In some embodiments, the one or plurality of active agents is one or a combination of compounds chosen from: an anti-inflammatory compound, alpha-adrenergic agonist, antiarrhythmic compound, analgesic compound, and an aesthetic compound.

In some embodiments, the composition further comprises one or a plurality of stem cells.

In some embodiments, the stem cell is an autologous stem cell.

In some embodiments, the pharmaceutical composition is administered via parenteral injection, subcutaneous injection, intramuscular injection, intraperitoneal injection, transdermally, orally, buccally, ocular routes, intravaginally, by inhalation, by depot injections, or by implants.

In some embodiments, the compositions further comprise one or a combination of active agents chosen from: an anti-inflammatory compound, alpha-adrenergic agonist, antiarrhythmic compound, analgesic compound, and an anesthetic compound.

BRIEF DESCRIPTION OF THE DRAWINGS

FIG. 1A: mice (C57BL/6, n=36) treated with PIF 2×/day for 14 days starting 2 hours after 8 Gy radiation exposure had 100% survival. Control mice (n=14) received radiation (PBS, vehicle) but no treatment, and developed ARS and died by day 23. FIG. 1B: female mice (n=18, similar results in males) were treated with PIF 2×/day (low, high dose: 0.75, 1.25 mg/kg) for 14 days starting 2 hours after 8 Gy radiation exposure. Importantly, the PIF-treated group exhibited normal hematological indices, indicating PIF's protective effect on hematopoiesis and immune function. Immune protection was evidenced by maintenance of lymphocyte and neutrophil numbers. In addition, both hematocrit levels and platelet numbers were preserved in the PIF-treated group. FIGS. 1C, 1D, and 1E: effects of control, low-dose, and high-dose PIF treatments, respectively, are shown on immune phenotype, RBCs, and platelets from day 0-19. Relevant figure abbreviations: WBC=white blood cells; NE=neutrophils; LY=lymphocytes; MO=monocytes; EO=eosinophils; BA=basophils; RBC=red blood cells; HB=hemoglobin; HCT=hematocrit; MCV=mean corpuscular volume; MCH=mean corpuscular hemoglobin; MCHC=mean corpuscular hemoglobin concentration; PLT=platelets; MPV=mean platelet volume.

FIG. 5C illustrates that as compared with PBS, the effect of sPIF at the two-time point crypt depth was significantly restored to that seen in the normal colon.

FIG. 7D illustrates the femur bone. FIGS. 7E, 7F, and 7G illustrate that PIF enhances mesenchymal stem cells' (MSCs') regulatory function. CFSE stained murine splenocytes activated with anti-CD3 antibodies were cultured for four days (in a 50:1 ratio) with MSCs previously incubated (2 h) with PIF or control. Cell proliferation was analyzed using flow cytometry. The graph in FIG. 7G shows % proliferating cells compared to control (activated splenocytes without MSCs), a summary of 3 experiments. H PIF promotes weight recovery after the transplant as compared to PBS, *P<0.05.

Control, start: n=12, end: n=12.
X-Ray, start: n=12, end: n=10.
PIF, start: n=10, end: n=9.

Figure 16:
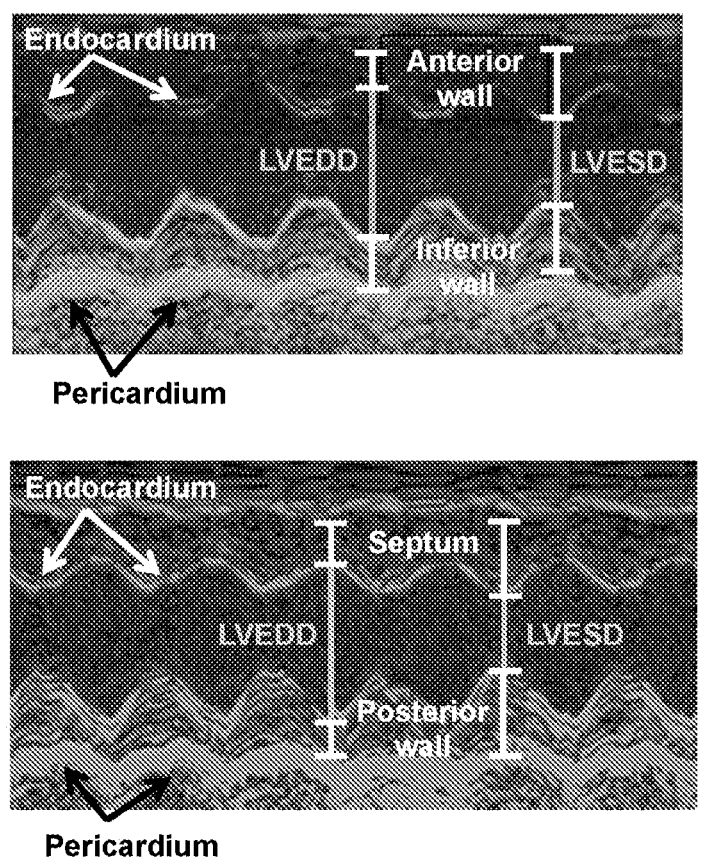

FIG. 16 depicts left ventricular wall thicknesses and diameters in mice. It depicts an image of cardiac function as examined by echography.

Figure 17:
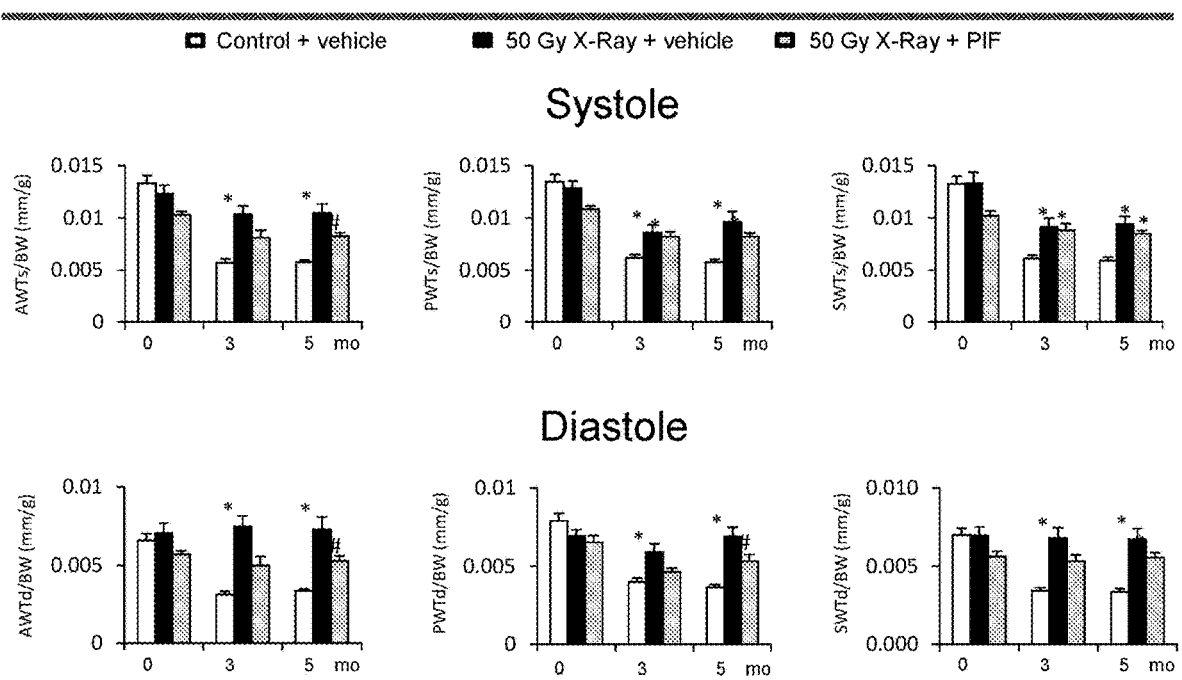

FIG. 17 depicts echocardiography results: left ventricular morphology normalized to body weight. The results show that PIF ameliorates left ventricular hypertrophy at month 5. BW: body weight; AWTs: anterior wall thickness—systole; AWTd: anterior wall thickness—diastole, PWTs: posterior wall thickness—systole; PWTd: posterior wall thickness—diastole; SWTs: septal wall thickness—systole, SWTd: septal wall thickness—diastole. Two Way Repeated Measures ANOVA all pairwise multiple comparison. Holm Sidak post hoc test; vs control, p<0.05, #vs X-ray, p<0.05 significant interaction between group and time factors (n=9-12). It shows PIF effect of cardiac indices following lethal radiation. PIF improves both systolic and diastolic function as compared to PBS wall thickness.

Figure 18:
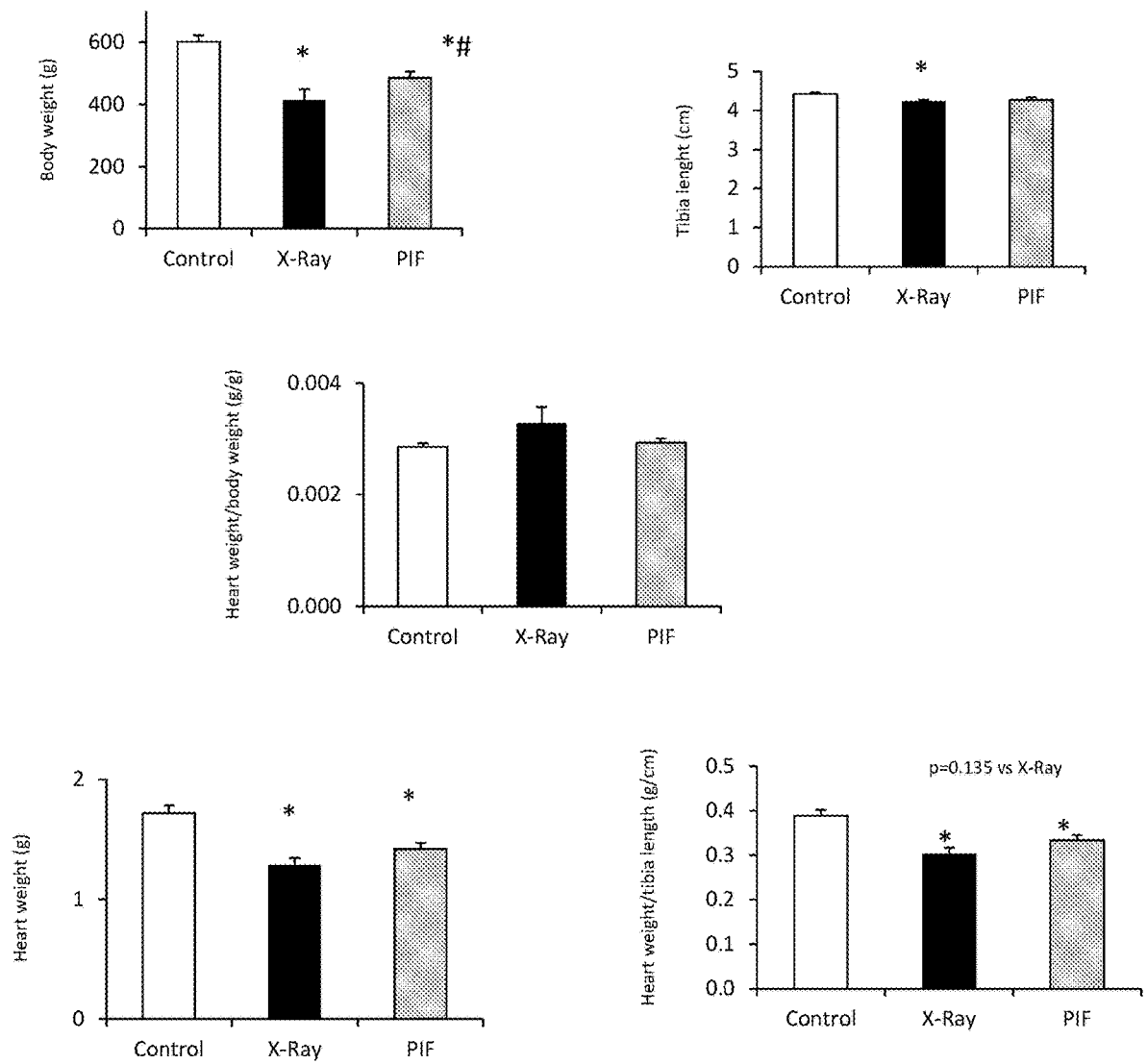

FIG. 18 depicts organ weights and lengths at month 5—body weight, heart weight, tibia length. One Way ANOVA on ranks, all pairwise. Holm Sidak post hoc test. * vs control, p<0.05 #vs X-ray, p<0.05 n=9-12. It shows PIF effect on rat weight indices following lethal radiation demonstrating increasing rats' weight vs PBS.

Figure 19:
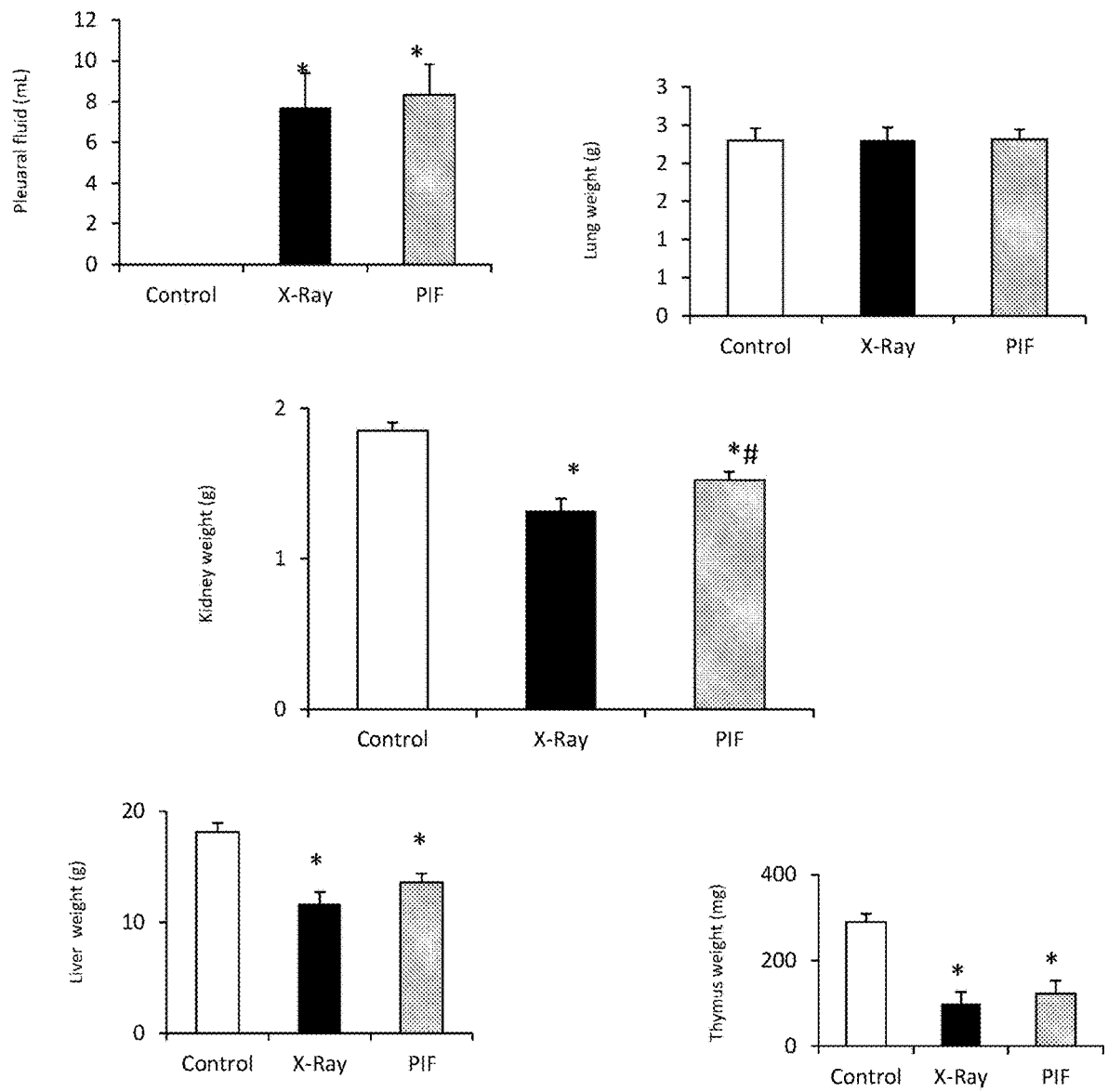

FIG. 19 depicts organ weights at month 5—pleural fluid, lung, kidney, liver, and thymus weight One Way ANOVA on ranks, all pairwise. Holm Sidak post hoc test, * vs control, p<0.05 #vs X-ray, p<0.05, n=9-12. It shows PIF effect on rat organ weight following lethal radiation. PIF promotes kidney growth.

Figure 20:
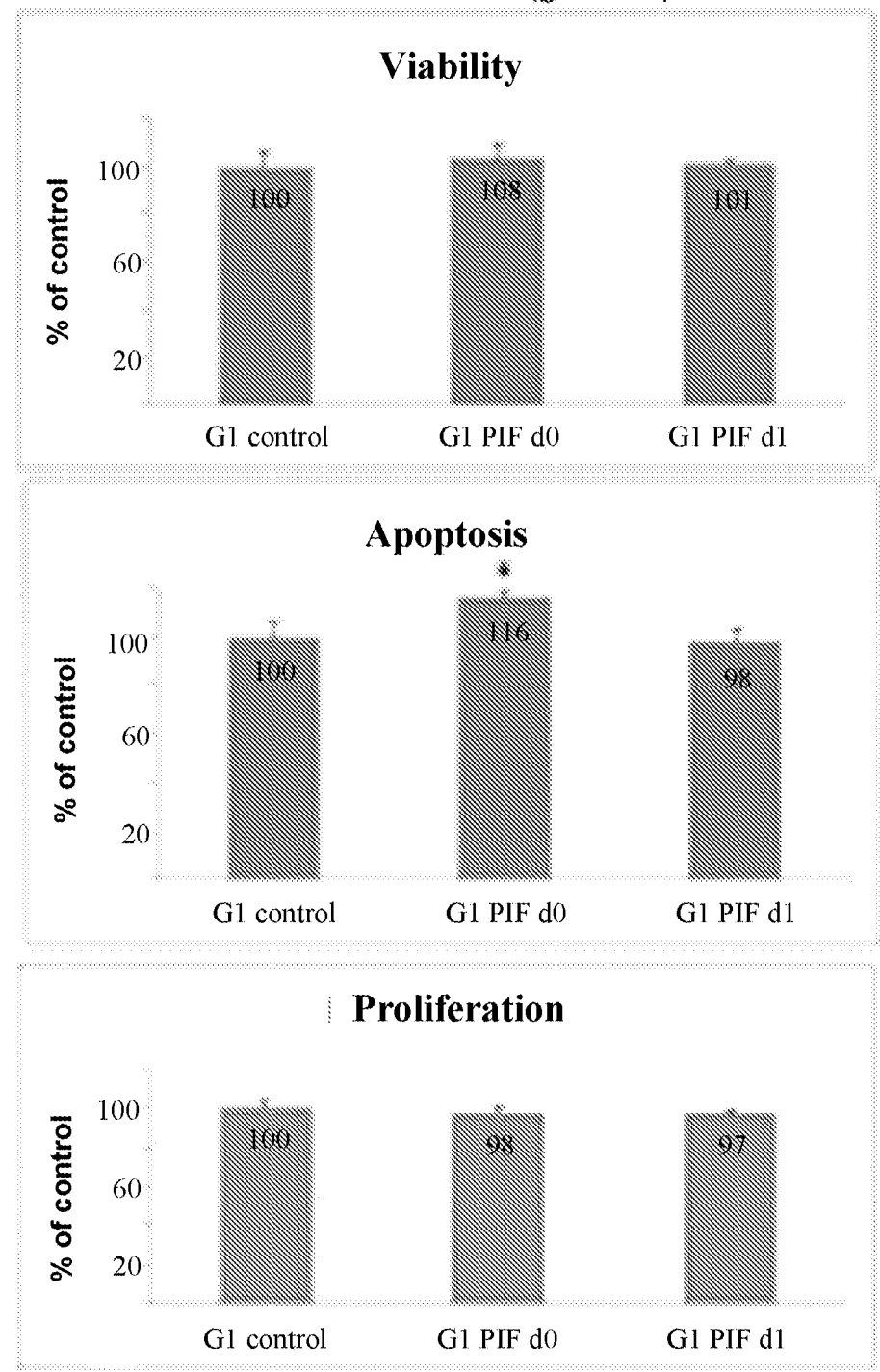

FIG. 20 depicts the effects of PIF on adrenal cell cultures as compared to untreated cells. BAC cells treated with PIF have an increased viability in culture when pre-exposed to PIF. shows PIF effect on bovine adrenal cells (primary) viability, apoptosis, and proliferation.

Figure 21:
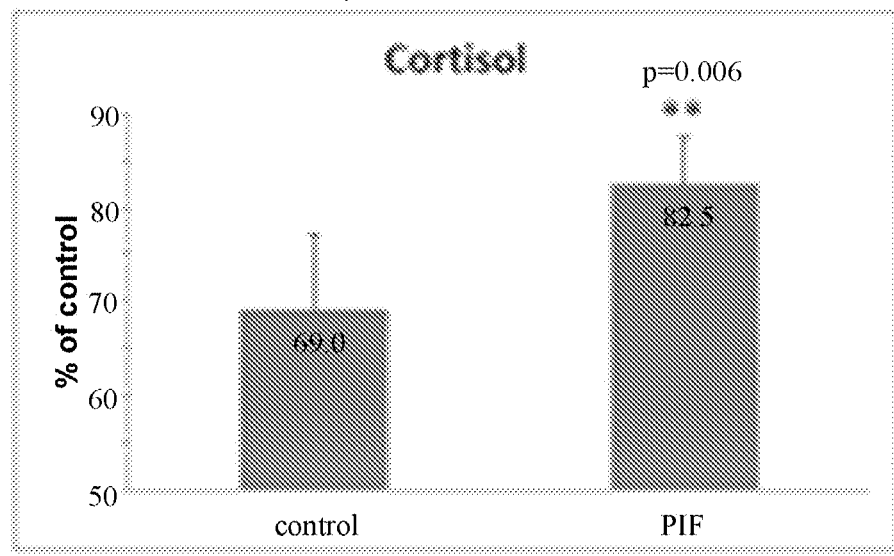

FIG. 21 shows the PIF effect on cortisol secretion by bovine adrenal cells (primary); the effect of PIF on BAC adrenal cells as it relates to basal cortisol secretion. Cortisol levels increase when PIF is exposed to cells in culture.

Figure 22:
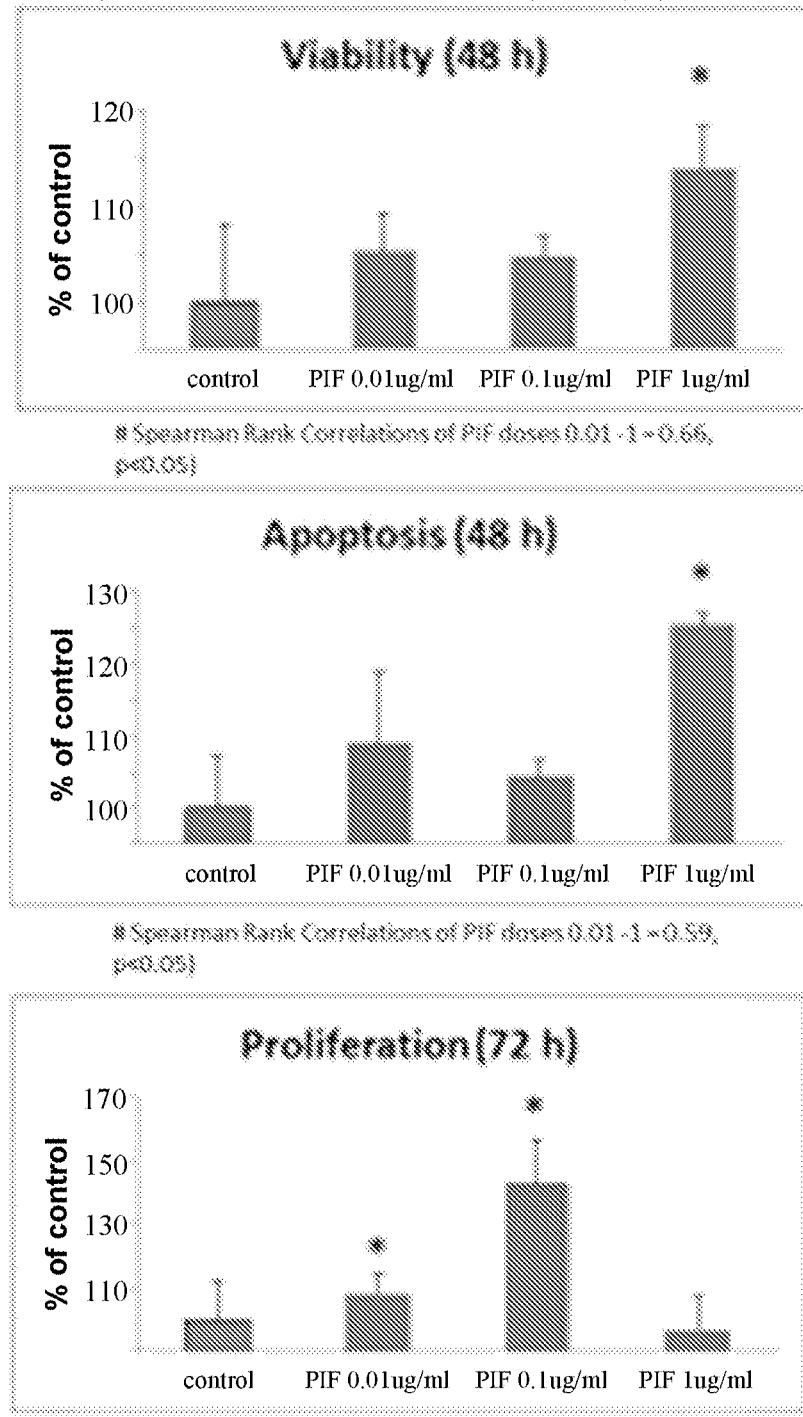

FIG. 22 shows effect of PIF on INS-1 (rat islet insulin producing cells) in culture. Cell viability is increased in culture as compared to INS-1 cells left untreated. Doses of PIF at 0.01, 0.1, and 1.0 micrograms/mL of culture medium were used in the treatment. It shows that PIF promotes insulinoma cells viability, as well as viability.

DETAILED DESCRIPTION

Acute radiation syndrome (ARS), also known as radiation sickness, develops after whole-body or partial-body high-dose irradiation. Radiation may cause complete destruction of the bone marrow, damage to the mucosal barrier and crypts of the gastrointestinal (GI) tract, skin burns, and central nervous system injury leading to irreversible neurologic and cardiovascular damage, and ultimately to death. Radiation is particular harmful to rapid turnover cells-such as hematopoietic cells—with lymphocytes being the first sub-lineage to be depleted. Although individual organ damage can be monitored, a more suitable view for ARS is the concept of multiple organ dysfunction syndrome caused by a systemic inflammatory response. A number of reports show that radiation-induced production of proinflammatory cytokines contributes to radiotherapy-associated disorders in the blood and peripheral lymphoid tissues.

Given the complexity of ionizing radiation-induced injury, effective ARS therapies are lacking. The current clinical approach for treatment is to inhibit the production of inflammatory mediators and suppress the initiation of the inflammatory response. Current management includes blood transfusion, fluid and electrolytes administration, antibiotics, and antiviral therapy. These treatments cause generalized immunosuppression and place patients in danger of opportunistic infections. Patients with cytopenia receive granulocyte colony-stimulating factor or granulocyte macrophage colony-stimulating factor to re-populate the immune system from residual hematopoietic progenitor cells effectively following low grade radiation. Non-responders and following lethal radiation require hematopoietic stem-cells transplantation (HSCT). However, such transplantation frequently leads to deleterious graft vs host disease (GVHD) coupled with impaired graft vs. leukemia (GVL) effect due to under or over use of immune suppressive drugs. ARS currently has only limited countermeasures.

Bone marrow transplantation (BMT) may be used as a treatment for hematological malignancies and inherited blood cell disorders, such as, but not limited to, lymphomas, lymphocytic leukemias, myeloma, leukemia, anemia, hemophilia, thalassemias, sickle cell disease, multiple sclerosis, scleroderma, myelodysplastic syndromes, and myeloproliferative diseases. There are two types of bone marrow transplantation: autologous (self) and allogeneic (donor).

The transplantation of organs, tissue, or cells other than bone marrow may also be used to treat various physiological deficiencies of the transplant recipient, including the dysfunction of multiple organs that may occur with ARS. Such organs, tissue, or cells may include, but are not limited to, the skin, brain, heart, lungs, kidneys, gastrointestinal tract, spleen, liver, pancreas, pancreatic islet cells, adrenal glands, and combinations thereof.

Autologous transplantation, allogeneic transplantation, semi-allogeneic transplantation, or xenotransplantation may be used if the subject requires transplantation. In the case of xenotransplantation, for example, islet cells or other cells, organs, or tissues from a porcine donor may be transplanted due to the current major shortage of human organs available for transplantation. The perfect matching of organs, tissue, or cells for transplantation is a major quest to prevent transplant rejection or, in the case of bone marrow, failure to engraft or, conversely, the development of graft-versus-host disease (GVHD). However, current therapies are limited, and the failure of the graft and other major complications still occur. The introduction of immunosuppressive agents has significantly advanced the field of transplantation, allowing patients to recover long-term; the patients, however, require life-long immunosuppressive therapy, which is associated with toxic side effects.

An autologous transplant may be possible if the disease afflicting the target organ, tissue, or cell is in remission, or if the condition being treated does not involve the target organ, tissue, or cell. In autologous transplantation, including BMT, the tissue is extracted from the patient prior to transplantation and may be "purged" to remove lingering malignant cells (if the disease has afflicted the target organ, tissue, or cell). After the patient undergoes chemotherapy or radiation, the stem cells are transplanted back into the patient. Autologous transplant allows the patient to receive high doses of chemotherapy and radiation. High doses of chemotherapy or radiation therapy with bone marrow or peripheral blood transplants, for example, have improved cure rates for leukemia and lymphoma. Once the patient has undergone chemotherapy or radiation, the patient may have a limited ability to produce blood cells. An autologous transplant would allow the patient to "jump start" the production of blood cells and platelets.

Mammalian pregnancy is a unique physiological event in which the maternal immune system interacts with the fetus in a very efficient manner that is beneficial for both parties. Pregnancy is an immune paradox, displaying no graft vs. host or host vs. graft effect. The factors involved in this phenomenon are not yet fully elucidated, although they have been extensively studied. The novel embryo-derived factor, Preimplantation Factor (PIF-1), may cause immune tolerance of pregnancy by creating maternal recognition of pregnancy shortly after fertilization.

To transpose PIF therapeutic utility outside pregnancy, a synthetic PIF analog (sPIF) of 15 amino acids (MVRIKPGSANKPSDD; SEQ ID NO: 13) mimicking the native peptide activity was generated (and upgraded to cGMP grade). This enabled detailed examination of sPIF effect in preclinical models of autoimmunity, transplant and acute radiation syndrome showing an integrated local and systemic efficacy. Studies examining sPIF's effect on human immune cells and determining crucial elements of its local and systemic mechanism of action were successful. sPIF efficacy to prevent and reverse in semi-allogenic graft vs. host model while preserving beneficial graft vs. leukemia was documented. FDA-mandated comprehensive toxicology studies demonstrated a high safety profile (mice and dogs) at (supra-physiologic (400-4000× human) doses coupled with short circulating half-life (Covance). The FDA has granted FAST TRACK designation to sPIF to conduct University-sponsored clinical trials for an immune orphan disorder. Synthetic PIF-1 (sPIF) replicated the native peptide's effect and exerted potent immune modulatory effects on activated peripheral blood mononuclear cell (PBMC) proliferation and cytokine secretion, acting through novel sites on PBMC and having an effect which is distinct from known immunosuppressive drugs. Therefore, PIF may prevent the development of GVHD while allowing graft vs. leukemia to be effective. Without wishing to be bound by theory, PIF may bind to transplanted bone marrow stem cells and help them become integrated quickly and start producing the normal blood cells and platelets.

A transplant is ideally conducted with a donor organ, tissue, or cell that perfectly matches the recipient; still, about 70% of patients develop GVHD of various intensities. Therefore, transplant patients receive immunosuppressive therapy post-transplant, and possibly for the remainder of their lives. Beyond acute GVHD, chronic GVHD and rejection are additional serious complications. Those conditions, however, are more difficult to treat and have high morbidity and mortality when compared to acute GVHD. Therefore, the use of PIF may enable autologous transplantation, allogeneic transplantation, semi-allogeneic transplantation, or xenotransplantation, thereby improving engraftment, preventing GVHD or organ rejection in the long-term.

Clinically, the major problem in transplantation occurs during the long period of time until the transplanted cells become functional. During that time, the patient often gets serious infections and may die. PIF addresses the fundamentals of inflammation regardless of the origin of injury or which organ is targeted. PIF administration may reduce the engraftment time period and engraftment-associated inflammation following transplant. PIF may lead to successful transplant engraftment. Without wishing to be bound by theory, it is believed that similar to PIF's activity in pregnancy, PIF outside pregnancy facilitates engraftment and allows the newly incorporated organ, tissue, or cells to become functional. Furthermore, administration of PIF may allow for full weight recovery in mice receiving an autologous transplant, which is comparable to that of naive mice.

sPIF may prevent deleterious GVHD development while preserving the beneficial GVL effect, as shown in a murine allogeneic bone marrow transplantation (BMT) model. In that model, short-term sPIF therapy led to four-month efficacy protection against dermatitis, hepatitis, and colon ulceration coupled with decreased pro-inflammatory hepatic cytokines and chemokines genes and circulating pro-inflammatory IL17a levels. sPIF has also been shown to promote syngeneic BMT.

sPIF regulates global immunity, and targets naive monocytes/macrophages acting on activated immunity to block mixed lymphocyte reaction (MLR), proliferation leading to a preferential TH2 cytokine bias while preserving the necessary TH1 response. In murine macrophages, increased B7H1 (ligated to PD-1 on T-cells) and decreased iNOS gene (NOS2, nitric oxide synthase) expression have been noted (Azar et al., 2013). sPIF targets protein-di-isomerase/Thioredoxin (PDI/T) and heat shock proteins (HSPs) to reduce oxidative stress and prevent protein misfolding, thereby providing important insight into the observed PIF protection in preclinical models. Observations both in vitro and in preclinical models support the view that sPIF may be effective in protecting against ARS.

Before the present compositions and methods are described, it is to be understood that this invention is not limited to the particular processes, compositions, or methodologies described, as these may vary. It is also to be understood that the terminology used in the description is for the purpose of describing the particular versions or embodiments only and is not intended to limit the scope of the present invention which will be limited only by the appended claims. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to a "peptide" is a reference to one or more peptides and equivalents thereof known to those skilled in the art, and so forth.

As used herein, the term "about" means plus or minus 10% of the numerical value of the number with which it is being used. Therefore, about 50% means in the range of 40%-60%.

"Administering" when used in conjunction with a therapeutic means to administer a therapeutic directly into or onto a target organ, tissue, or cell or to administer a therapeutic to a patient, whereby the therapeutic positively impacts the organ, tissue, or cell to which it is targeted. Thus, as used herein, the term "administering", when used in conjunction with pre-implantation factor (PIF), can include, but is not limited to, providing PIF into or onto the target organ, tissue or cell; providing PIF systemically to a patient by, e.g., intravenous injection whereby the therapeutic reaches the target organ, tissue or cell; providing PIF in the form of the encoding sequence thereof to the target tissue (e.g., by so-called gene-therapy techniques). "Administering" may be accomplished by parenteral, oral, or topical administration, or by such methods in combination with other known techniques.

The terms "animal," "patient," and "subject" as used herein include, but are not limited to, humans and non-human vertebrates such as wild, domestic and farm animals. In some embodiments, the terms "animal," "patient," and "subject" may refer to humans. In some embodiments, the terms "animal," "patient," and "subject" may refer to non-human mammals. In some embodiments, the terms "animal," "patient," and "subject" may refer to any or combination of: dogs, cats, pigs, cows, horses, goats, sheep, or other domesticated non-human mammals. In some embodiments, the subject is a human patient that has been diagnosed or is suspected of having a malignant form of cancer. In some embodiments, the subject is a human patient that has been diagnosed or is suspected of having organ failure. In some embodiments, the subject is a human patient that has been diagnosed or is suspected of having liver failure, kidney failure, any disease associated with an imbalance of cortisol levels, juvenile or adult diabetes (type I or II), or heart failure. In some embodiments, the subject is a human patient that has been identified as requiring or suspected of requiring an Islet cell transplant, a kidney transplant, or adrenal cell transplant, a blood cell transplant, a bone marrow transplant, or a heart transplant.

"Immune-modulating" refers to the ability of a compound of the present invention to alter (modulate) one or more aspects of the immune system. The immune system functions to protect the organism from infection and from foreign antigens by cellular and humoral mechanisms involving lymphocytes, macrophages, and other antigen-presenting cells that regulate each other by means of multiple cell-cell interactions and by elaborating soluble factors, including lymphokines and antibodies, that have autocrine, paracrine, and endocrine effects on immune cells.

The term "improves" is used to convey that the present invention changes either the appearance, form, characteristics and/or the physical attributes of the subject, organ, tissue, or cell to which it is being provided, applied, or administered. For example, the change in form may be demonstrated by any of the following alone or in combination: a decrease in one or more symptoms of ARS; increased engraftment of transplanted organs, tissues, or cells; increased acceptance of transplanted organs, tissues, or cells; reduction of host immune response to graft associated with autologous transplant, allogeneic transplant, semi-allogeneic transplant, or xenotransplant; increased graft v. leukemia; increase in graft v. leukemia with no or with minimal graft v. host disease; reduction or elimination of the need for immune suppressive agents; and faster recovery from chemotherapy and radiation therapy.

The term "inhibiting" includes the administration of a compound of the present invention to prevent the onset of the symptoms, alleviating the symptoms, or eliminating the disease, condition, or disorder.

As used herein, the terms "peptide," "polypeptide" and "protein" are used interchangeably and refer to two or more amino acids covalently linked by an amide bond or non-amide equivalent. The peptides of the invention can be of any length. For example, the peptides can have from about two to about 100 or more residues, such as, 5 to 12, 12 to 15, 15 to 18, 18 to 25, 25 to 50, 50 to 75, 75 to 100, or more in length. Preferably, peptides are from about 2 to about 18 residues. The peptides of the invention include l- and d-isomers, and combinations of l- and d-isomers. The peptides can include modifications typically associated with posttranslational processing of proteins, for example, cyclization (e.g., disulfide or amide bond), phosphorylation, glycosylation, carboxylation, ubiquitination, myristylation, or lipidation.

By "pharmaceutically acceptable," it is meant the carrier, diluent or excipient must be compatible with the other ingredients of the formulation or composition and not deleterious to the recipient thereof.

Unless otherwise indicated, the term "bone marrow" means that flexible tissue found in the hollow interior of bones, consisting of the red marrow and yellow marrow, and containing stem cells.

As used herein, the term "therapeutic" means an agent utilized to treat, combat, ameliorate, prevent, or improve an unwanted condition or disease of a patient. In part, embodiments of the present invention are directed to decreasing one or more symptoms of ARS, an increase in acceptance of transplanted organs, tissues, or cells in autologous transplants, allogeneic transplants, semi-allogeneic transplants, or xenotransplants, and/or a decrease in the rejection of organs, tissues, or cells in autologous transplants, allogeneic transplants, semi-allogeneic transplants, or xenotransplants.

A "therapeutically effective amount" or "effective amount" of a composition (e.g., a PIF peptide) is a predetermined amount calculated to achieve the desired effect, i.e., to improve, increase, or allow the acceptance of organs, tissues, or cells in autologous transplantation, allogeneic transplantation, semi-allogeneic transplantation, or xenotransplantation, and/or to decrease one or more symptoms of ARS or increase the viability of donor organs, tissues, or cell before they are transplanted. The activity contemplated by the present methods includes both medical therapeutic and/or prophylactic treatment, as appropriate. The specific dose of a compound administered according to this invention to obtain therapeutic and/or prophylactic effects will, of course, be determined by the particular circumstances surrounding the case, including, for example, the compound administered, the route of administration, and the condition being treated. The compounds are effective over a wide dosage range and, for example, dosages per day will normally fall within the range of from 0.001 to 10 mg/kg, more usually in the range of from 0.01 to 1 mg/kg. In some embodiments, the therapeutically effective dose of PIF or PIF analog or peptide is about 0.1 mg/kg, 0.2 mg/kg, 0.3 mg/kg, 0.4 mg/kg, 0.5 mg/kg, 0.6 mg/kg, 0.7 mg/kg, 0.8 mg/kg, 0.9 mg/kg, and 1 mg/kg. However, it will be understood that the effective amount administered will be determined by the physician in the light of the relevant circumstances including the condition to be treated, the choice of compound to be administered, and the chosen route of administration, and therefore the above dosage ranges are not intended to limit the scope of the invention in any way. A therapeutically effective amount of compound of embodiments of this invention is typically an amount such that when it is administered in a physiologically tolerable excipient composition, it is sufficient to achieve an effective systemic concentration or local concentration in the tissue.

The terms "treat," "treated," or "treating" as used herein refers to both therapeutic treatment and prophylactic or preventative measures, wherein the object is to prevent or slow down (lessen) an undesired physiological condition, disorder, or disease, or to obtain beneficial or desired clinical results. For the purposes of this invention, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment includes eliciting a clinically significant response without excessive levels of side effects. Treatment also includes prolonging survival as compared to expected survival if not receiving treatment.

Generally speaking, the term "tissue" refers to any aggregation of similarly specialized cells which are united in the performance of a particular function.

This application describes compounds. Without being bound by any particular theory, the compounds described herein act as agonists of PIF-mediated signal transduction via the receptor or receptors of PIF. Thus, these compounds modulate signaling pathways that provide significant therapeutic benefit in the treatment of, but not limited to, acute radiation syndrome and delayed effects of acute radiation exposure. The compounds of the present disclosure may exist in unsolvated forms as well as solvated forms, including hydrated forms. The compounds of the present disclosure also are capable of forming both pharmaceutically acceptable salts, including but not limited to acid addition and/or base addition salts. Furthermore, compounds of the present disclosure may exist in various solid states including an amorphous form (non-crystalline form), and in the form of clathrates, prodrugs, polymorphs, bio-hydrolyzable esters, racemic mixtures, non-racemic mixtures, or as purified stereoisomers including, but not limited to, optically pure enantiomers and diastereomers. In general, all of these forms can be used as an alternative form to the free base or free acid forms of the compounds, as described above and are intended to be encompassed within the scope of the present disclosure.

A "polymorph" refers to solid crystalline forms of a compound. Different polymorphs of the same compound can exhibit different physical, chemical and/or spectroscopic properties. Different physical properties include, but are not limited to stability (e.g., to heat or light), compressibility and density (important in formulation and product manufacturing), and dissolution rates (which can affect bioavailability). Different physical properties of polymorphs can affect their processing. In some embodiments, the pharmaceutical composition comprises at least one polymorph of any of the compositions disclosed herein.

As noted above, the compounds of the present disclosure can be administered, inter alia, as pharmaceutically acceptable salts, esters, amides, or prodrugs. The term "salts" refers to inorganic and organic salts of compounds of the present disclosure. The salts can be prepared in situ during the final isolation and purification of a compound, or by separately reacting a purified compound in its free base or acid form with a suitable organic or inorganic base or acid and isolating the salt thus formed. Representative salts include the hydrobromide, hydrochloride, sulfate, bisulfate, nitrate, acetate, oxalate, palmitinate, stearate, laurate, borate, benzoate, lactate, phosphate, tosylate, citrate, maleate, fumarate, succinate, tartrate, naphthylate, mesylate, glucoheptonate, lactobionate, and laurylsulphonate salts, and the like. The salts may include cations based on the alkali and alkaline earth metals, such as sodium, lithium, potassium, calcium, magnesium, and the like, as well as non-toxic ammonium, quaternary ammonium, and amine cations including, but not limited to, ammonium, tetramethylammonium, tetraethyl ammonium, methyl amine, dimethyl amine, trimethylamine, triethylamine, ethylamine, and the like. See, for example, S. M. Berge, et al., "Pharmaceutical Salts," J Pharm Sci, 66:1-19 (1977). The term "salt" refers to acidic salts formed with inorganic and/or organic acids, as well as basic salts formed with inorganic and/or organic bases. Examples of these acids and bases are well known to those of ordinary skill in the art. Such acid addition salts will normally be pharmaceutically acceptable although salts of non-pharmaceutically acceptable acids may be of utility in the preparation and purification of the compound in question. Salts include those formed from hydrochloric, hydrobromic, sulphuric, phosphoric, citric, tartaric, lactic, pyruvic, acetic, succinic, fumaric, maleic, methanesulphonic and benzenesulphonic acids.

In some embodiments, salts of the compositions comprising either a PIF or PIF analog or PIF mutant may be formed by reacting to the free base, or a salt, enantiomer or racemate thereof, with one or more equivalents of the appropriate acid. In some embodiments, pharmaceutical acceptable salts of the present disclosure refer to analogs having at least one basic group or at least one basic radical. In some embodiments, pharmaceutical acceptable salts of the present disclosure comprise a free amino group, a free guanidino group, a pyrazinyl radical, or a pyridyl radical that forms acid addition salts. In some embodiments, the pharmaceutical acceptable salts of the present disclosure refer to analogs that are acid addition salts of the subject compounds with (for example) inorganic acids, such as hydrochloric acid, sulfuric acid or a phosphoric acid, or with suitable organic carboxylic or sulfonic acids, for example aliphatic mono- or di-carboxylic acids, such as trifluoroacetic acid, acetic acid, propionic acid, glycolic acid, succinic acid, maleic acid, fumaric acid, hydroxymaleic acid, malic acid, tartaric acid, citric acid or oxalic acid, or amino acids such as arginine or lysine, aromatic carboxylic acids, such as benzoic acid, 2-phenoxy-benzoic acid, 2-acetoxybenzoic acid, salicylic acid, 4-aminosalicylic acid, aromatic-aliphatic carboxylic acids, such as mandelic acid or cinnamic acid, heteroaromatic carboxylic acids, such as nicotinic acid or isonicotinic acid, aliphatic sulfonic acids, such as methane-, ethane- or 2-hydroxyethane-sulfonic acid, or aromatic sulfonic acids, for example benzene-, p-toluene- or naphthalene-2-sulfonic acid. When several basic groups are present mono- or poly-acid addition salts may be formed. The reaction may be carried out in a solvent or medium in which the salt is insoluble or in a solvent in which the salt is soluble, for example, water, dioxane, ethanol, tetrahydrofuran or diethyl ether, or a mixture of solvents, which may be removed in vacuo or by freeze drying. The reaction may also be a metathetical process or it may be carried out on an ion exchange resin. In some embodiments, the salts may be those that are physiologically tolerated by a patient. Salts according to the present disclosure may be found in their anhydrous form or as in hydrated crystalline form (i.e., complexed or crystallized with one or more molecules of water).

Examples of pharmaceutically acceptable esters of the compounds of the present disclosure include $C_1$-$C_8$ alkyl esters. Acceptable esters also include $C_5$-$C_7$cycloalkyl esters, as well as arylalkyl esters such as benzyl. $C_1$-$C_4$ alkyl esters are commonly used. Esters of compounds of the present disclosure may be prepared according to methods that are well known in the art. Examples of pharmaceutically acceptable amides of the compounds of the present disclosure include amides derived from ammonia, primary $C_1$-$C_8$ alkyl amines, and secondary $C_1$-$C_8$ dialkyl amines. In the case of secondary amines, the amine may also be in the form of a 5 or 6 membered heterocycloalkyl group containing at least one nitrogen atom. Amides derived from ammonia, $C_1$-$C_3$ primary alkyl amines and $C_1$-$C_2$ dialkyl secondary amines are commonly used. Amides of the compounds of the present disclosure may be prepared according to methods well known to those skilled in the art.

As used herein, "conservative" amino acid substitutions may be defined as set out in Tables A, B, or C below. The PIF compounds of the disclosure include those wherein conservative substitutions (from either nucleic acid or amino acid sequences) have been introduced by modification of polynucleotides encoding polypeptides of the disclosure. Amino acids can be classified according to physical properties and contribution to secondary and tertiary protein structure. A conservative substitution is recognized in the art as a substitution of one amino acid for another amino acid that has similar properties. In some embodiments, the conservative substitution is recognized in the art as a substitution of one nucleic acid for another nucleic acid that has similar properties, or, when encoded, has similar binding affinities. Exemplary conservative substitutions are set out in Table 1.

TABLE 1

Conservative Substitutions I

| Side Chain Characteristics | Amino Acid |
| --- | --- |
| Aliphatic | |
| Non-polar | G A P I L V F |
| Polar - uncharged | C S T M N Q |
| Polar - charged | D E K R |
| Aromatic | H F W Y |
| Other | N Q D E |

Alternately, conservative amino acids can be grouped as described in Lehninger, (Biochemistry. Second Edition; Worth Publishers, Inc. NY. N. Y. (1975), pp. 71-77) as set forth in Table 2.

TABLE 2

Conservative Substitutions II

| Side Chain Characteristic | Amino Acid |
| --- | --- |
| Non-polar (hydrophobic) | |
| Aliphatic: | A L I V P |
| Aromatic: | F W Y |
| Sulfur-containing: | M |
| Borderline: | G Y |

TABLE 2-continued

Conservative Substitutions II

| Side Chain Characteristic | Amino Acid |
|---|---|
| Uncharged-polar | |
| Hydroxyl: | S T Y |
| Amides: | N Q |
| Sulfhydryl: | C |
| Borderline: | G Y |
| Positively Charged (Basic): | K R H |
| Negatively Charged (Acidic): | D E |

Alternately, exemplary conservative substitutions are set out in Table 3.

TABLE 3

Conservative Substitutions III

| Original Residue | Exemplary Substitution |
|---|---|
| Ala (A) | Val Leu Ile Met |
| Arg (R) | Lys His |
| Asn (N) | Gln |
| Asp (D) | Glu |
| Cys (C) | Ser Thr |
| Gln (Q) | Asn |
| Glu (E) | Asp |
| Gly (G) | Ala Val Leu Pro |
| His (H) | Lys Arg |
| Ile (I) | Leu Val Met Ala Phe |
| Leu (L) | Ile Val Met Ala Phe |
| Lys (K) | Arg His |
| Met (M) | Leu Ile Val Ala |
| Phe (F) | Trp Tyr Ile |
| Pro (P) | Gly Ala Val Leu Ile |
| Ser (S) | Thr |
| Thr (T) | Ser |
| Trp (W) | Tyr Phe Ile |
| Tyr (Y) | Trp Phe Thr Ser |
| Val (V) | Ile Leu Met Ala |

As used herein, the terms "peptide," "polypeptide" and "protein" are used interchangeably and refer to two or more amino acids covalently linked by an amide bond or non-amide equivalent. The peptides of the disclosure can be of any length. For example, the peptides can have from about two to about 100 or more residues, such as, 5 to 12, 12 to 15, 15 to 18, 18 to 25, 25 to 50, 50 to 75, 75 to 100, or more in length. Preferably, peptides are from about 2 to about 18 residues in length. The peptides of the disclosure also include l- and d-isomers, and combinations of l- and d-isomers. The peptides can include modifications typically associated with posttranslational processing of proteins, for example, cyclization (e.g., disulfide or amide bond), phosphorylation, glycosylation, carboxylation, ubiquitination, myristylation, or lipidation. In some embodiments, the compositions or pharmaceutical compositions of the disclosure relate to analogs of any PIF sequence set forth in Table 1 that share no less than about 70%, about 75%, about 79%, about 80%, about 85%, about 86%, about 87%, about 90%, about 93%, about 94% about 95%, about 96%, about 97%, about 98%, about 99% homology with any one or combination of PIF sequences set forth in Table 1. In some embodiments, PIF or PIF peptide may refer to an amino acid sequence selected from SEQ ID NOs: 1, 2, 3, 4, 5, 6, 7, 8, 9, 10, 11, 12, 13, 14, 15, 16, 17, 18, 19, 20, 21, 22, 23, 24, 25, 26, 27, 28, 29 or a functional fragment thereof that is at least 70%, 75%, 80%, 85%, 90%, 91%, 92%, 93%, 94%, 95%, 96%, 97%, 98%, or 99% homologous to any such amino acid sequence. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 20. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 21. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 22. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 23. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 24. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 25. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 26. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 27. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 28. In some embodiments, PIF may refer to an amino acid sequence comprising, consisting essentially of, or consisting of a sequence that is at least 70%, 75%, 80%, 85%, 86%, 87%, 90%, 91%, 92%, 93%, 94%, 95%, 96%, 97%, 98%, or 99% homologous to SEQ ID. NO: 29. In some embodiments, the PIF mutant comprises a sequence selected from: XVZIKPGSANKPSD (SEQ ID NO: 30), XVZIKPGSANKPS (SEQ ID NO: 31), XVZIKPGSANKP (SEQ ID NO: 32), XVZIKPGSANK (SEQ ID NO: 33) XVZIKPGSAN (SEQ ID NO: 34), XVZIKPGSA (SEQ ID NO: 35), XVZIKPGS (SEQ ID NO: 36), XVZIKPG (SEQ ID NO: 37), XVZIKP (SEQ ID NO: 38), XVZIK (SEQ ID NO: 39), XVZI (SEQ ID NO: 40), XVZ wherein X is a non-natural amino acid or a naturally occurring amino acid. In some embodiments, the PIF mutant comprises a sequence selected from: XVZIKPGSANKPSD (SEQ ID NO: 30), XVZIKPGSANKPS (SEQ ID NO: 31), XVZIKPGSANKP (SEQ ID NO: 32), XVZIKPGSANK (SEQ ID NO: 33), XVZIKPGSAN (SEQ ID NO: 34), XVZIKPGSA (SEQ ID NO: 35), XVZIKPGS (SEQ ID NO: 36), XVZIKPG (SEQ ID NO: 37), XVZIKP (SEQ ID NO: 38), XVZIK (SEQ ID NO: 39), XVZI (SEQ ID NO: 40), XVZ wherein X is a non-natural amino acid or a naturally occurring amino acid except that X is not methionine if Z is arginine, and Z is not arginine if X is methionine. In some embodiments, the PIF analog or mutant is synthetic or synthetically made.

Peptides disclosed herein further include compounds having amino acid structural and functional analogs, for example, peptidomimetics having synthetic or non-natural amino acids (such as a norleucine) or amino acid analogues or non-natural side chains, so long as the mimetic shares one or more functions or activities of compounds of the disclosure. The compounds of the disclosure therefore include "mimetic" and "peptidomimetic" forms. As used herein, a "non-natural side chain" is a modified or synthetic chain of atoms joined by covalent bond to the a-carbon atom, I3-carbon atom, or y-carbon atom which does not make up the backbone of the polypeptide chain of amino acids. The peptide analogs may comprise one or a combination of non-natural amino-acids chosen from: norvaline, tert-butylglycine, phenylglycine, He, 7-azatryptophan, 4-fluoro-phenylalanine, N-methyl-methionine, N-methyl-valine, N-methyl-alanine, sarcosine, N-methyl-tert-butylglycine, N-methyl-leucine, N-methyl-phenylglycine, N-methyl-iso-leucine, N-methyl-tryptophan, N-methyl-7-azatryptophan, N-methyl-phenylalanine, N-methyl-4-fluorophenylalanine, N-methyl-threonine, N-methyl-tyrosine, N-methyl-valine, N-methyl-lysine, homocysteine, and Tyr; Xaa2 is absent, or an amino acid selected from the group consisting of Ala, D-Ala, N-methyl-alanine, Glu, N-methyl-glutamate, D-Glu, Gly, sarcosine, norleucine, Lys, D-Lys, Asn, D-Asn, D-Glu, Arg, D-Arg, Phe, D-Phe, N-methyl-phenylalanine, Gin, D-Gln, Asp, D-Asp, Ser, D-Ser, N-methyl-serine, Thr, D-Thr, N-methyl-threonine, D-Pro D-Leu, N-methyl-leu-cine, D-Ile, N-methyl-isoleucine, D-Val, N-methyl-valine, tert-butylglycine, D-tert-butylglycine, N-methyl-tert-butylglycine, Trp, D-Trp, N-methyl-tryptophan, D-Tyr, N-methyl-tyrosine, 1-aminocyclopropanecarboxylic acid, 1-aminocyclobutanecarboxylic acid, 1-aminocyclopentan-ecarboxylic acid, 1-aminocyclohexanecarboxylic acid, 4-aminotetrahydro-2H-pyran-4-carboxylic acid, ami-noisobutyric acid, (5)-2-amino-3-(1H-tetrazol-5-yl)pro-panoic acid, Glu, Gly, N-methyl-glutamate, 2-amino pen-tanoic acid, 2-amino hexanoic acid, 2-amino heptanoic acid, 2-amino octanoic acid, 2-amino nonanoic acid, 2-amino decanoic acid, 2-amino undecanoic acid, 2-amino dode-canoic acid, octylglycine, tranexamic acid, aminovaleric acid, and 2-(2-aminoethoxy) acetic acid. The natural side chain, or R group, of an alanine is a methyl group. In some embodiments, the non-natural side chain of the composition is a methyl group in which one or more of the hydrogen atoms is replaced by a deuterium atom. Non-natural side chains are disclosed in the art in the following publications: WO/2013/172954, WO2013123267, WO/2014/071241, WO/2014/138429, WO/2013/050615, WO/2013/050616, WO/2012/166559, U.S. application No. 20150094457, Ma, Z., and Hartman, M. C. (2012). In Vitro Selection of Unnatural Cyclic Peptide Libraries via mRNA Display. In J. A. Douthwaite & R. H. Jackson (Eds.), Ribosome Display and Related Technologies: Methods and Protocols (pp. 367-390). Springer New York, all of which are incorporated by reference in their entireties.

The terms "mimetic," "peptide mimetic" and "peptido-mimetic" are used interchangeably herein, and generally refer to a peptide, partial peptide or non-peptide molecule that mimics the tertiary binding structure or activity of a selected native peptide or protein functional domain (e.g., binding motif or active site). These peptide mimetics include recombinantly or chemically modified peptides, as well as non-peptide agents such as small molecule drug mimetics, as further described below. The term "analog" refers to any polypeptide comprising at least one a-amino acid and at least one non-native amino acid residue, wherein the polypeptide is structurally similar to a naturally occurring full-length PIF protein and shares the biochemical or biological activity of the naturally occurring full-length protein upon which the analog is based. In some embodiments, the compositions, pharmaceutical compositions and kits comprise a peptide or peptidomimetic sharing share no less than about 70%, about 75%, about 79%, about 80%, about 85%, about 86%, about 87%, about 90%, about 93%, about 94% about 95%, about 96%, about 97%, about 98%, about 99% homology with any one or combination of PIF sequences set forth in Table 4; and wherein one or a plurality of amino acid residues is a non-natural amino acid residue or an amino acid residue with a non-natural sidechain. In some embodiments, peptide or peptide mimetics are provided, wherein a loop is formed between two cysteine residues. In some embodiments, the peptidomimetic may have many similarities to natural peptides, such as: amino acid side chains that are not found among the known 20 proteinogenic amino acids, non-peptide-based linkers used to effect cyclization between the ends or internal portions of the molecule, substitutions of the amide bond hydrogen moiety by methyl groups (N-methyl-ation) or other alkyl groups, replacement of a peptide bond with a chemical group or bond that is resistant to chemical or enzymatic treatments, N- and C-terminal modifications, and conjugation with a non-peptidic extension (such as polyethylene glycol, lipids, carbohydrates, nucleosides, nucleotides, nucleoside bases, various small molecules, or phosphate or sulfate groups). As used herein, the term "cyclic peptide mimetic" or "cyclic polypeptide mimetic" refers to a peptide mimetic that has as part of its structure one or more cyclic features such as a loop, bridging moiety, and/or an internal linkage. As used herein, the term "bridging moiety" refers to a chemical moiety that chemically links one or a combination of atoms on an amino acid to any other atoms outside of the amino acid residue. For instance, in the case of an amino acid tertiary structure, a bridging moiety may be a chemical moiety that chemically links one amino acid side chain with another sequential or non-sequential amino acid side chain.

In some embodiments, peptide or peptide mimetics are provided, wherein the loop comprises a bridging moiety selected from the group consisting of:

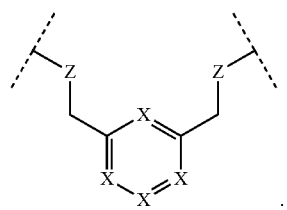

I

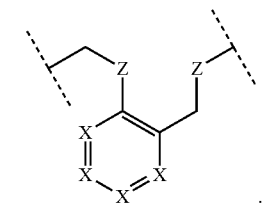

II

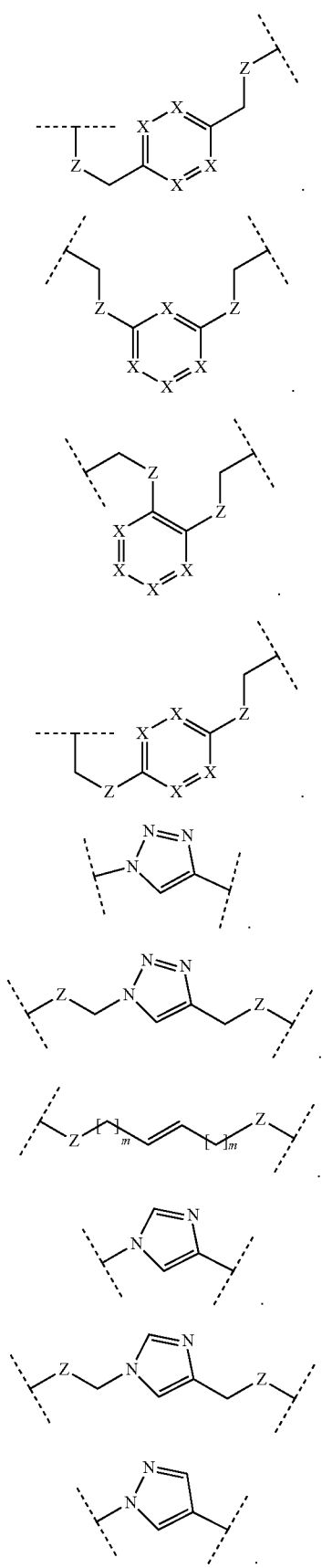
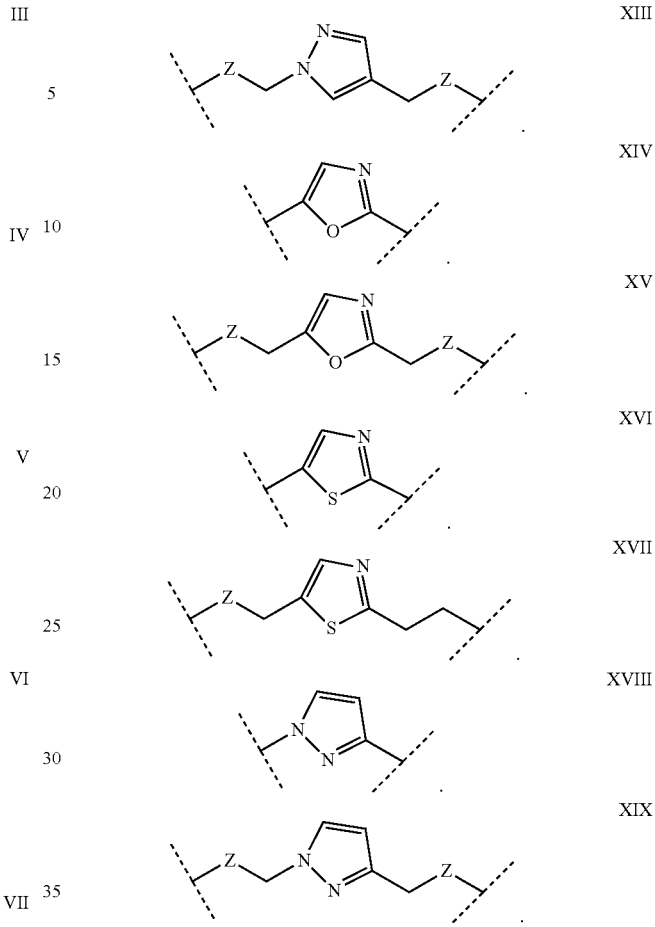

wherein each X is independently N or CH, such that no ring contains more than 2 N; each Z is independently a bond, NR, O, S, CH2, C(O)NR, NRC(O), S(O)vNR, NRS(O)v; each m is independently selected from 0, 1, 2, and 3; each v is independently selected from 1 and 2; each R is independently selected from H and $C_1$-$C_6$; and each bridging moiety is connected to the peptide by independently selected $C_0$-$C_6$ spacers.

In some embodiments, the PIF peptides of the disclosure are modified to produce peptide mimetics by replacement of one or more naturally occurring side chains of the 20 genetically encoded amino acids (or D amino acids) with other side chains, for instance with groups such as alkyl, lower alkyl, cyclic 4-, 5-, 6-, to 7 membered alkyl, amide, amide lower alkyl, amide di(lower alkyl), lower alkoxy, hydroxy, carboxy and the lower ester derivatives thereof, and with 4-, 5-, 6-, to 7 membered heterocyclics. For example, proline analogs can be made in which the ring size of the proline residue is changed from 5 members to 4, 6, or 7 members. Cyclic groups can be saturated or unsaturated, and if unsaturated, can be aromatic or nonaromatic. Heterocyclic groups can contain one or more nitrogen, oxygen, and/or sulphur heteroatoms. Examples of such groups include the furazanyl, furyl, imidazolidinyl, imidazolyl, imidazolinyl, isothiazolyl, isoxazolyl, morpholinyl (e.g. morpholino), oxazolyl, piperazinyl (e.g. 1-piperazinyl), piperidyl (e.g. 1-piperidyl, piperidino), pyranyl, pyrazinyl, pyrazolidinyl, pyrazolinyl, pyrazolyl, pyridazinyl, pyridyl, pyrimidinyl, pyrrolidinyl (e.g. 1-pyrrolidinyl), pyrrolinyl, pyrrolyl, thiadiazolyl, thiazolyl, thienyl, thiomorpholinyl (e.g. thiomorpholino), and triazolyl. These heterocyclic groups can be substituted or unsubstituted. Where a group is substituted, the substituent can be alkyl, alkoxy, halogen, oxygen, or substituted or unsubstituted phenyl. Peptidomimetics may also have amino acid residues that have been chemically modified by phosphorylation, sulfonation, biotinylation, or the addition or removal of other moieties.

In a further embodiment a compound of the formula $R_1$-$R_2$-$R_3$-$R_4$-$R_5$-$R_6$-$R_7$-$R_8$-$R_9$-$R_{10}$-$R_{11}$-$R_{12}$-$R_{13}$-$R_{14}$-$R_{15}$, wherein Riis Met or a mimetic of Met, $R_2$ is Val or a mimetic of Val, $R_3$ is Arg or a mimetic of Arg, or any amino acid, $R_4$ is Ile or a mimetic of Ile, $R_5$ is Lys or a mimetic of Lys, $R_6$ is Pro or a mimetic of Pro, $R_7$ is Gly or a mimetic of Gly, $R_5$ is Ser or a mimetic of Ser, $R_9$ is Ala or a mimetic of Ala, $R_{10}$ is Asn or a mimetic of Asn, $R_{11}$ is Lys or a mimetic of Lys, $R_{12}$ is Pro or a mimetic of Pro, $R_{13}$ is Ser or a mimetic of Ser, $R_{14}$ is Asp or a mimetic of Asp and $R_{15}$ is Asp or a mimetic of Asp is provided. In a further embodiment, a compound comprising the formula $R_1$-$R_2$-$R_3$-$R_4$-$R_5$-$R_6$-$R_7$-$R_8$-$R_9$-$R_{10}$, wherein $R_1$ is Ser or a mimetic of Ser, $R_2$ is Gln or a mimetic of Gln, $R_3$ is Ala or a mimetic of Ala, $R_4$ is Val or a mimetic of Val, $R_5$ is Gln or a mimetic of Gln, $R_6$ is Glu or a mimetic of Glu, $R_7$ is His or a mimetic of His, $R_8$ is Ala or a mimetic of Ala, $R_9$ is Ser or a mimetic of Ser, and $R_{10}$ is Thr or a mimetic of Thr; a compound comprising the formula $R_1$-$R_2$-$R_3$-$R_4$-$R_5$-$R_6$-$R_7$-$R_8$-$R_9$-$R_{10}$-$R_{11}$-$R_{12}$-$R_{13}$-$R_{14}$-$R_{15}$-$R_{16}$-$R_{17}$-Rig, wherein $R_1$ is Ser or a mimetic of Ser, $R_2$ is Gly or a mimetic of Gly, $R_3$ is Ile or a mimetic of Ile, $R_4$ is Val or a mimetic of Val, $R_5$ is Ile or a mimetic of Ile, $R_6$ is Tyr or a mimetic of Tyr, $R_7$ is Gln or a mimetic of Gln, $R_8$ is Tyr or a mimetic of Tyr, $R_9$ is Met or a mimetic of Met, $R_{10}$ is Asp or a mimetic of Asp, Ru is Asp or a mimetic of Asp, $R_{12}$ is Arg or a mimetic of Arg, $R_{13}$ is Tyr or a mimetic of Tyr, $R_{14}$ is Val or a mimetic of Val, $R_{15}$ is Gly or a mimetic of Gly, Rib is Ser or a mimetic of Ser, $R_{17}$ is Asp or a mimetic of Asp and $R_{18}$ is Leu or a mimetic of Leu; and a compound comprising the formula $R_1$-$R_2$-$R_3$-$R_4$-$R_5$-$R_6$-$R_7$-$R_8$-$R_9$, wherein Riis Val or a mimetic of Val, $R_2$ is Ile or a mimetic of Ile, $R_3$ is Ile or a mimetic of Ile, $R_4$ is Ile or a mimetic of Ile, $R_5$ is Ala or a mimetic of Ala, $R_6$ is Gln or a mimetic of Gln, $R_7$ is Tyr or a mimetic of Tyr, $R_8$ is Met or a mimetic of Met, and $R_9$ is Asp or a mimetic of Asp is provided. In some embodiments, $R_3$ is not Arg or a mimetic of Arg.

A variety of techniques are available for constructing peptide mimetics with the same or similar desired biological activity as the corresponding native but with more favorable activity than the peptide with respect to solubility, stability, and/or susceptibility to hydrolysis or proteolysis (see, e.g., Morgan & Gainor, Ann. Rep. Med. Chern. 24, 243-252, 1989). Certain peptidomimetic compounds are based upon the amino acid sequence of the peptides of the disclosure. Often, peptidomimetic compounds are synthetic compounds having a three-dimensional structure (i.e., a "peptide motif") based upon the three-dimensional structure of a selected peptide. The peptide motif provides the peptidomimetic compound with the desired biological activity, i.e., binding to PIF receptors, wherein the binding activity of the mimetic compound is not substantially reduced and is often the same as or greater than the activity of the native peptide on which the mimetic is modeled. Peptidomimetic compounds can have additional characteristics that enhance their therapeutic application, such as increased cell permeability, greater affinity and/or avidity and prolonged biological half-life.

Peptidomimetic design strategies are readily available in the art (see, e.g., Ripka & Rich, Curr. Op. Chern. Bioi. 2,441-452, 1998; Hruby et al., Curr. Op. Chem. Bioi. 1, 114119, 1997; Hruby & Baise, Curr. Med. Chern. 9, 945-970, 2000). One class of peptidomimetics is a backbone that is partially or completely non-peptide but mimics the peptide backbone atom-for atom and comprises side groups that likewise mimic the functionality of the side groups of the native amino acid residues. Several types of chemical bonds, e.g., ester, thioester, thioamide, retroamide, reduced carbonyl, dimethylene and ketomethylene bonds, are known in the art to be generally useful substitutes for peptide bonds in the construction of protease-resistant peptidomimetics. Another class of peptidomimetics comprises a small non-peptide molecule that binds to another peptide or protein, but which is not necessarily a structural mimetic of the native peptide. Yet another class of peptidomimetics has arisen from combinatorial chemistry and the generation of massive chemical libraries. These generally comprise novel templates which, though structurally unrelated to the native peptide, possess necessary functional groups positioned on a nonpeptide scaffold to serve as "topographical" mimetics of the original peptide (Ripka & Rich, 1998, supra).

The first natural PIF compound identified, termed nPIF (SEQ ID NO: 1), is a 15 amino acid peptide. A synthetic version of this peptide, sPIF (SEQ ID NO:13), showed activity that was similar to the native peptide, nPIF (SEQ ID NO: I). This peptide is homologous to a small region of the Circumsporozoite protein, a malaria parasite. The second PIF peptide (SEQ ID NO: 7), includes 13 amino acids and shares homology with a short portion of a large protein named thyroid and retinoic acid transcription co-repressor, which is identified as a receptor-interacting factor, (SMRT); the synthetic version is sPIF-2 (SEQ ID NO:14). The third distinct peptide, nPIF-3 (SEQ ID NO:10), consists of 18 amino acids and matches a small portion of reverse transcriptase; the synthetic version of this peptide sPIF-3 is (SEQ ID NO:15). nPIF-4 (SEQ ID NO:12) shares homology with a small portion of reverse transcriptase.

A list of PIF peptides, both natural and synthetic, are provided below in Table 4. Antibodies to various PIF peptides and scrambled PIF peptides are also provided.

TABLE 4

| PIF Peptides | | |
|---|---|---|
| (SEQ ID NO) | Peptide | Amino Acid Sequence |
| SEQ ID NO: 1<br>isolated native, matches region of Circumsporozoite protein (Malaria) | nPIF-$1_{15}$ | MVRIKPGSANKPSDD |
| SEQ ID NO: 2<br>isolated native, matches region of Circumsporozoite protein (Malaria) | nPIF-$1_{(15\text{-}alter)}$ | MVRIKYGSYNNKPSD |

TABLE 4-continued PIF Peptides

| (SEQ ID NO) | Peptide | Amino Acid Sequence |
|---|---|---|
| SEQ ID NO: 3 isolated native, matches region of Circumsporozoite protein (Malaria) | nPIF-1$_{(13)}$ | MVRIKPGSANKPS |
| SEQ ID NO: 4 isolated native, matches region of Circumsporozoite protein (Malaria) | nPIF-1$_{(9)}$ | MVRIKPGSA |
| SEQ ID NO: 5 synthetic, scrambled amino acid sequence from region of Circumsporozoite protein Malaria | scrPIF-1$_{15}$ | GRVDPSNKSMPKDIA |
| SEQ ID NO: 6 isolated native, matches region of human retinoid and thyroid hormone receptor-SMRT | nPIF-2$_{(10)}$ | SQAVQEHAST |
| SEQ ID NO: 7 isolated native, matches region of human retinoid and thyroid hormone receptor (SMRT) | nPIF-2$_{(13)}$ | SQAVQEHASTNMG |
| SEQ ID NO: 8 synthetic, scrambled amino acid sequence from region of human retinoid and thyroid hormone receptor SMRT | scrPIF-2$_{(13)}$ | EVAQHSQASTMNG |
| SEQ ID NO: 9 | scrPIF-2$_{(14)}$ | GQASSAQMNSTGVH |
| SEQ ID NO: 10 isolated native, matches region of Rev Trans | nPIF-3$_{(18)}$ | SGIVIYQYMDDRYVGSDL |
| SEQ ID NO: 11 synthetic, scrambled amino acid sequence from region of Circumsporozoite protein Malaria | Neg control for negPIF-1$_{(15)}$ | GMRELQRSANK |
| SEQ ID NO: 12 isolated native, matches region of Rev Trans antibody of native isolated nPIF-115 | nPIF-4$_{(9)}$ AbPIF-1$_{(15)}$ | VIIIAQYMD |
| (SEQ ID NO: 13) synthetic, amino acid sequence from region of Circumsporozoite protein Malaria | sPIF4$_{(15)}$ | MVRIKPGSANKPSDD |
| (SEQ ID NO: 14) synthetic, amino acid sequence from of human retinoid and thyroid hormone receptor SMRT | sPIF-2$_{(13)}$ | SQAVQEHASTNMG |
| (SEQ ID NO: 15) synthetic, amino acid sequence from region of Circumsporozoite protein Malaria | sPIF-3$_{(18)}$ | SGIVIYQYMDDRYVGSDL |
| (SEQ ID NO: 16) synthetic, amino acid sequence from region of Circumsporozoite protein Malaria | sPIF-1$_{(9)}$ | MVRIKPGSA |
| antibody of native isolated nPIF-2(13) | AbPIF-2$_{(13)}$ | |
| antibody of native isolated nPIF -3$_{(18)}$ | AbPIF-3$_{(18)}$ | |
| (SEQ ID NO: 17) Synthetic | sPIF-4$_{(9)}$ | VIIIAQYMD |
| SEQ ID NO: 18 Synthetic | sP1F-1$_{(5)}$ | MVRIK |
| SEQ ID NO: 19 Synthetic | sP1F-1$_{(4)}$ | PGSA |
| SEQ ID NO: 20 | PIF (-3) | MVXIKPGSANKPSDD |
| SEQ ID NO: 21 | PIF (-1) | XVRIKPGSANKPSDD |
| SEQ ID NO: 22 | PIF (-1, -3) | XVXIKPGSANKPSDD |
| SEQ ID NO: 23 | PIF (-6) | MVRIKXGSANKPSDD |

TABLE 4-continued

PIF Peptides

| (SEQ ID NO) | Peptide | Amino Acid Sequence |
|---|---|---|
| SEQ ID NO: 24 | PIF (-4) | MVRXKPGSANKPSDD |
| SEQ ID NO: 25 | PIF (-2) | MXRIKPGSANKPSDD |
| SEQ ID NO: 26 | mut1 | MVRIKEGSANKPSDD |
| SEQ ID NO: 27 | mut3 | MVRGKPGSANKPSDD |
| SEQ ID NO: 28 | mut4 | MERIKPGSANKPSDD |
| SEQ ID NO: 29 | mut5 | AVRIKPGSANKPSDD | n = native, s = synthetic, scr = scrambled, same AA, O = number of AA, Ab = antibody, X = any amino acid, except arginine In some embodiments of the present disclosure, a PIF peptide is provided. Such PIF peptides may be useful for acute radiation syndrome (ARS), delayed effects of acute radiation exposure, or conditions related thereto.

In another embodiment, a pharmaceutical composition comprising a PIF peptide is provided. In some embodiments, the pharmaceutical composition comprises a therapeutically effective amount of a PIF peptide or a pharmaceutically acceptable salt thereof. In some embodiments, the pharmaceutical compositions are free of a peptide comprising any one or more of the sequence identifiers of Table 4. In some embodiments, the pharmaceutical compositions are free of a peptide comprising or consisting of SEQ ID NO:1.

In another embodiment, methods of treating acute radiation syndrome, delayed effects of acute radiation exposure, or conditions related thereto are provided. In a preferred embodiment, the method comprises administering an effective amount of a PIF peptide to a subject in need thereof.

In a further embodiment, a method for treating ARS comprising administering an effective amount of a PIF peptide in combination with one or more immunotherapeutic, anti-epileptic, diuretic, or antihypertensive drugs or compounds to a subject in need thereof is provided. Such a combination may enhance the effectiveness of the treatment of either component alone or may provide less side effects and/or enable a lower dose of either component.

PIF-1's action appears to be independent of TCR, calcium-channels or PKC pathways, mechanisms through which most immunosuppressive agents act, and CD4+/CD25+ cells (T reg) cells that are of relevance in various autoimmune diseases. On the other hand, PIF-1's action may involve NFAT-1 suppression.

Ultimately, a novel embryo-derived peptide, PIF, creates a tolerogenic state at low doses following short-term treatment leading to long-term protection in several distinct severe autoimmune models. This effect is exerted without apparent toxicity.

For therapeutic treatment of the specified indications, a PIF peptide may be administered as such, or can be compounded and formulated into pharmaceutical compositions in unit dosage form for parenteral, transdermal, rectal, nasal, local intravenous administration, or, preferably, oral administration. Such pharmaceutical compositions are prepared in a manner well known in the art and comprise at least one active PIF peptide associated with a pharmaceutical carrier. The term "active compound," as used throughout this specification, refers to at least one compound selected from compounds of the formulas or pharmaceutically acceptable salts thereof.

In such a composition, the active compound is known as the "active ingredient." In making the compositions, the active ingredient will usually be mixed with a carrier, or diluted by a carrier, or enclosed within a carrier that may be in the form of a capsule, sachet, paper, or other container. When the carrier serves as a diluent, it may be a solid, semisolid, or liquid material that acts as a vehicle, excipient of medium for the active ingredient. Thus, the composition can be in the form of tablets, pills, powders, lozenges, sachets, cachets, elixirs, emulsion, solutions, syrups, suspensions, soft and hard gelatin capsules, sterile injectable solutions, and sterile packaged powders.

The terms "pharmaceutical preparation" and "pharmaceutical composition" include preparations suitable for administration to mammals, e.g., humans. When the compounds of the present disclosure are administered as pharmaceuticals to mammals, e.g., humans, they can be given per se or as a pharmaceutical composition containing, for example, from about 0.1 to about 99.5% of active ingredient in combination with a pharmaceutically acceptable carrier.

The phrase "pharmaceutically acceptable" refers to molecular entities and compositions that are physiologically tolerable and do not typically produce an allergic or similar untoward reaction, such as gastric upset, dizziness, and the like, when administered to a human. Preferably, as used herein, the term "pharmaceutically acceptable" means approved by a regulatory agency of the Federal or a state government or listed in the U.S. Pharmacopeia or other generally recognized pharmacopeia for use in animals, and more particularly in humans. In some embodiments, the pharmaceutical compositions comprising a PIF peptide, mimetic or pharmaceutically acceptable salt thereof and at least one pharmaceutically acceptable carrier.

The phrase "pharmaceutically acceptable carrier" is art recognized and includes a pharmaceutically acceptable material, composition, or vehicle, suitable for administering compounds of the present disclosure to mammals. The carriers include liquid or solid filler, diluent, excipient, solvent, or encapsulating material, involved in carrying or transporting the subject agent from one organ, or portion of the body, to another organ, or portion of the body. Each carrier must be "acceptable" in the sense of being compatible with the other ingredients of the formulation and not injurious to the patient. Some examples of materials which can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Suitable pharmaceutical carriers are described in "Remington's Pharmaceutical Sciences" by E. W. Martin, which is incorporated herein by reference in its entirety. In some embodiments, the pharmaceutically acceptable carrier is sterile and pyrogen-free water. In some embodiments, the pharmaceutically acceptable carrier is Ringer's Lactate, sometimes known as lactated Ringer's solution.

Wetting agents, emulsifiers, and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: water soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, alpha-tocopherol, and the like; and metal chelating agents, such as citric acid, ethylenediamine tetraacetic acid (EDTA), sorbitol, tartaric acid, phosphoric acid, and the like.

Formulations of the present disclosure include those suitable for oral, nasal, topical, buccal, sublingual, rectal, vaginal and/or parenteral administration. The formulations may conveniently be presented in unit dosage form and may be prepared by any methods well known in the art of pharmacy. The amount of active ingredient that can be combined with a carrier material to produce a single dosage form will generally be that amount of the compound that produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Some examples of suitable carriers, excipients, and diluents include lactose, dextrose, sucrose, sorbitol, mannitol, starches, gum acacia, calcium phosphate alginates, calcium salicate, microcrystalline cellulose, polyvinylpyrrolidone, cellulose, tragacanth, gelatin, syrup, methyl cellulose, methyl- and propylhydroxybenzoates, talc, magnesium stearate, water, and mineral oil. The formulations can additionally include lubricating agents, wetting agents, emulsifying, and suspending agents, preserving agents, sweetening agents, or flavoring agents. The compositions may be formulated so as to provide quick, sustained, or delayed release of the active ingredient after administration to the patient by employing procedures well known in the art.

For oral administration, a compound can be admixed with carriers and diluents, molded into tablets, or enclosed in gelatin capsules. The mixtures can alternatively be dissolved in liquids such as 10% aqueous glucose solution, isotonic saline, sterile water, or the like, and administered intravenously or by injection.

The local delivery of inhibitory amounts of active compound for the treatment of immune disorders can be by a variety of techniques that administer the compound at or near the targeted site. Examples of local delivery techniques are not intended to be limiting but to be illustrative of the techniques available. Examples include local delivery catheters, site specific carriers, implants, direct injection, or direct applications, such as topical application.

Local delivery by an implant describes the surgical placement of a matrix that contains the pharmaceutical agent into the affected site. The implanted matrix releases the pharmaceutical agent by diffusion, chemical reaction, or solvent activators.

For example, in some aspects, the disclosure is directed to a pharmaceutical composition comprising a PIF peptide, and a pharmaceutically acceptable carrier or diluent, or an effective amount of pharmaceutical composition comprising a PIF peptide.

Specific modes of administration will depend on the indication. The selection of the specific route of administration and the dose regimen is to be adjusted or titrated by the clinician according to methods known to the clinician in order to obtain the optimal clinical response. The amount of compound to be administered is that amount which is therapeutically effective. The dosage to be administered will depend on the characteristics of the subject being treated, e.g., the particular mammal or human treated, age, weight, health, types of concurrent treatment, if any, and frequency of treatments, and can be easily determined by one of skill in the art (e.g., by the clinician).

Pharmaceutical formulations containing the compounds of the present disclosure and a suitable carrier can be solid dosage forms which include, but are not limited to, tablets, capsules, cachets, pellets, pills, powders and granules; topical dosage forms which include, but are not limited to, solutions, powders, fluid emulsions, fluid suspensions, semi-solids, ointments, pastes, creams, gels, jellies, and foams; and parenteral dosage forms which include, but are not limited to, solutions, suspensions, emulsions, and dry powder; comprising an effective amount of a polymer or copolymer of the present disclosure. It is also known in the art that the active ingredients can be contained in such formulations with pharmaceutically acceptable diluents, fillers, disintegrants, binders, lubricants, surfactants, hydrophobic vehicles, water soluble vehicles, emulsifiers, buffers, humectants, moisturizers, solubilizers, preservatives and the like. The means and methods for administration are known in the art and an artisan can refer to various pharmacologic references for guidance. For example, Modern Pharmaceutics, Banker & Rhodes, Marcel Dekker, Inc. (1979); and *Goodman & Gilman's The Pharmaceutical Basis of Therapeutics,* 6th Edition, MacMillan Publishing Co., New York (1980) can be consulted.

The compounds of the present disclosure can be formulated for parenteral administration by injection, e.g., by bolus injection or continuous infusion. The compounds can be administered by continuous infusion subcutaneously over a predetermined period of time. Formulations for injection can be presented in unit dosage form, e.g., in ampoules or in multi-dose containers, with an added preservative. The compositions can take such forms as suspensions, solutions, or emulsions in oily or aqueous vehicles, and can contain formulatory agents such as suspending, stabilizing and/or dispersing agents.

For oral administration, the compounds can be formulated readily by combining these compounds with pharmaceutically acceptable carriers well known in the art. Such carriers enable the compounds of the disclosure to be formulated as tablets, pills, dragees, capsules, liquids, gels, syrups, slurries, suspensions, and the like, for oral ingestion by a patient to be treated. Pharmaceutical preparations for oral use can be obtained by adding a solid excipient, optionally grinding the resulting mixture, and processing the mixture of granules, alter adding suitable auxiliaries, if desired, to obtain tablets or dragee cores. Suitable excipients include, but are not limited to, fillers such as sugars, including, but not limited to, lactose, sucrose, mannitol, and sorbitol; cellulose preparations such as, but not limited to, maize starch, wheat starch, rice starch, potato starch, gelatin, gum tragacanth, methyl cellulose, hydroxypropylmethyl-cellulose, sodium carboxymethylcellulose, and polyvinylpyrrolidone (PVP). If desired, disintegrating agents can be added, such as, but not limited to, the cross-linked polyvinyl pyrrolidone, agar, or alginic acid or a salt thereof such as sodium alginate.

Dragee cores can be provided with suitable coatings. For this purpose, concentrated sugar solutions can be used, which can optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments can be added to the tablets or dragee coatings for identification or to characterize different combinations of active compound doses.

Pharmaceutical preparations which can be used orally include, but are not limited to, push-fit capsules made of gelatin, as well as soft, scaled capsules made of gelatin and a plasticizer, such as glycerol or sorbitol. The push-fit capsules can contain the active ingredients in admixture with filler such as, e.g., lactose, binders such as, e.g., starches, and/or lubricants such as, e.g., talc or magnesium stearate and, optionally, stabilizers. In soft capsules, the active compounds can be dissolved or suspended in suitable liquids, such as fatty oils, liquid paraffin, or liquid polyethylene glycols. In addition, stabilizers can be added. All formulations for oral administration should be in dosages suitable for such administration.

For buccal administration, the compositions can take the form of, e.g., tablets or lozenges formulated in a conventional manner.

For administration by inhalation, the compounds for use according to the present disclosure are conveniently delivered in the form of an aerosol spray presentation from pressurized packs or a nebulizer, with the use of a suitable propellant, e.g., di chlorodifluoromethane, trichlorofluoromethane, dichlorotetrafluoroethane, carbon dioxide or other suitable gas. In the case of a pressurized aerosol the dosage unit can be determined by providing a valve to deliver a metered amount. Capsules and cartridges of, e.g., gelatin for use in an inhaler or insufflator can be formulated containing a powder mix of the compound and a suitable powder base such as lactose or starch.

The compounds of the present disclosure can also be formulated in rectal compositions such as suppositories or retention enemas, e.g., containing conventional suppository bases such as cocoa butter or other glycerides.

In addition to the formulations described previously, the compounds of the present disclosure can also be formulated as a depot preparation. Such long-acting formulations can be administered by implantation (for example subcutaneously or intramuscularly) or by intramuscular injection.

Depot injections can be administered at about 1 to about 6 months or longer intervals. Thus, for example, the compounds can be formulated with suitable polymeric or hydrophobic materials (for example as an emulsion in an acceptable oil) or ion exchange resins, or as sparingly soluble derivatives, for example, as a sparingly soluble salt.

In transdermal administration, the compounds of the present disclosure, for example, can be applied to a plaster, or can be applied by transdermal, therapeutic systems that are consequently supplied to the organism.

Pharmaceutical compositions of the compounds also can comprise suitable solid or gel phase carriers or excipients. Examples of such carriers or excipients include but are not limited to calcium carbonate, calcium phosphate, various sugars, starches, cellulose derivatives, gelatin, and polymers such as, e.g., polyethylene glycols.

For parenteral administration, analog can be, for example, formulated as a solution, suspension, emulsion, or lyophilized powder in association with a pharmaceutically acceptable parenteral vehicle. Examples of such vehicles are water, saline, Ringer's solution, dextrose solution, and 5% human serum albumin. Liposomes and nonaqueous vehicles such as fixed oils may also be used. The vehicle or lyophilized powder may contain additives that maintain isotonicity (e.g., sodium chloride, mannitol) and chemical stability (e.g., buffers and preservatives). The formulation is sterilized by commonly used techniques. For example, a parenteral composition suitable for administration by injection is prepared by dissolving 1.5% by weight of analog in 0.9% sodium chloride solution.

The present disclosure relates to routes of administration include intramuscular, sublingual, intravenous, intraperitoneal, intrathecal, intravaginal, intraurethral, intradermal, intrabuccal, via inhalation, via nebulizer and via subcutaneous injection. Alternatively, the pharmaceutical composition may be introduced by various means into cells that are removed from the individual. Such means include, for example, microprojectile bombardment and liposome or other nanoparticle device.

Solid dosage forms for oral administration include capsules, tablets, pills, powders, and granules. In solid dosage forms, the analogs are generally admixed with at least one inert pharmaceutically acceptable carrier such as sucrose, lactose, starch, or other generally regarded as safe (GRAS) additives. Such dosage forms can also comprise, as is normal practice, an additional substance other than an inert diluent, e.g., lubricating agent such as magnesium state. With capsules, tablets, and pills, the dosage forms may also comprise a buffering agent. Tablets and pills can additionally be prepared with enteric coatings, or in a controlled release form, using techniques known in the art.

Liquid dosage forms for oral administration include pharmaceutically acceptable emulsions, solutions, suspensions, and syrups, with the elixirs containing an inert diluent commonly used in the art, such as water. These compositions can also include one or more adjuvants, such as wetting agent, an emulsifying agent, a suspending agent, a sweetening agent, a flavoring agent, or a perfuming agent.

In another embodiment of the invention the composition of the invention is used to treat a patient suffering from, or susceptible to, Type I adult or juvenile diabetes, multiple sclerosis, Crohn's, or autoimmune hepatitis.

One of skill in the art will recognize that the appropriate dosage of the compositions and pharmaceutical compositions may vary depending on the individual being treated and the purpose. For example, the age, body weight, and medical history of the individual patient may affect the therapeutic efficacy of the therapy. Further, a lower dosage of the composition may be needed to produce a transient cessation of symptoms, while a larger dose may be needed to produce a complete cessation of symptoms associated with the disease, disorder, or indication. A competent physician can consider these factors and adjust the dosing regimen to ensure the dose is achieving the desired therapeutic outcome without undue experimentation. It is also noted that the clinician and/or treating physician will know how and when to interrupt, adjust, and/or terminate therapy in conjunction with individual patient response. Dosages may also depend on the strength of the particular analog chosen for the pharmaceutical composition.

The dose of the composition or pharmaceutical compositions may vary. The dose of the composition may be once per day. In some embodiments, multiple doses may be administered to the subject per day. In some embodiments, the total dosage is administered in at least two application periods. In some embodiments, the period can be an hour, a day, a month, a year, a week, or a two-week period. In an additional embodiment of the invention, the total dosage is administered in two or more separate application periods, or separate doses over the course of an hour, a day, a month, a year, a week, or a two-week period.

In some embodiments, subjects can be administered the composition in which the composition is provided in a daily dose range of about 0.0001 mg/kg to about 5000 mg/kg of the weight of the subject. The dose administered to the subject can also be measured in terms of total amount of PIF peptide or PIF analog or pharmaceutically acceptable salt thereof administered per day. In some embodiments, a subject is administered from about 0.001 to about 3000 milligrams of PIF peptide or PIF analog or pharmaceutically acceptable salt thereof per day. In some embodiments, a subject is administered up to about 2000 milligrams of PIF peptide or PIF analog or pharmaceutically acceptable salt thereof per day. In some embodiments, a subject is administered up to about 1800 milligrams of PIF peptide or PIF analog or pharmaceutically acceptable salt thereof per day. In some embodiments, a subject is administered up to about 1600 milligrams of PIF peptide or PIF analog or pharmaceutically acceptable salt thereof per day. In some embodiments, a subject is administered up to about 1400 milligrams of PIF peptide or PIF analog or pharmaceutically acceptable salt thereof per day. In some embodiments, a subject is administered up to about 1200 milligrams of PIF peptide or PIF analog or pharmaceutically acceptable salt thereof per day. In some embodiments, a subject is administered up to about 1000 milligrams of PIF peptide or PIF analog or pharmaceutically acceptable salt thereof per day. In some embodiments, a subject is administered up to about 800 milligrams of PIF peptide or PIF analog or pharmaceutically acceptable salt thereof per day. In some embodiments, a subject is administered from about 0.001 milligrams to about 700 milligrams of PIF peptide or PIF analog or pharmaceutically acceptable salt thereof per dose. In some embodiments, a subject is administered up to about 700 milligrams of PIF peptide or PIF analog per dose. In some embodiments, a subject is administered up to about 600 milligrams of PIF peptide or PIF analog or pharmaceutically acceptable salt thereof per dose. In some embodiments, a subject is administered up to about 500 milligrams of PIF peptide or PIF analog or pharmaceutically acceptable salt thereof per dose. In some embodiments, a subject is administered up to about 400 milligrams of PIF peptide or PIF analog or pharmaceutically acceptable salt thereof per dose. In some embodiments, a subject is administered up to about 300 milligrams of PIF peptide or PIF analog or pharmaceutically acceptable salt thereof per dose. In some embodiments, a subject is administered up to about 200 milligrams of PIF peptide or PIF analog or pharmaceutically acceptable salt thereof per dose. In some embodiments, a subject is administered up to about 100 milligrams of PIF peptide or PIF analog or pharmaceutically acceptable salt thereof per dose. In some embodiments, a subject is administered up to about 50 milligrams of PIF peptide or PIF analog or pharmaceutically acceptable salt thereof per dose.

In some embodiments, subjects can be administered the composition in which the composition comprising a PIF peptide or PIF analog or pharmaceutically acceptable salt thereof is administered in a daily dose range of about 0.0001 mg/kg to about 5000 mg/kg of the weight of the subject. In some embodiments, the composition comprising a PIF analog, or pharmaceutically acceptable salt thereof is administered in a daily dosage of up to about 450 mg/kg of the weight of the subject. In some embodiments, the composition comprising a PIF peptide or PIF analog or pharmaceutically acceptable salt thereof is administered in a daily dosage of up to about 400 mg/kg of the weight of the subject. In some embodiments, the composition comprising a PIF peptide or PIF analog or pharmaceutically acceptable salt thereof is administered in a daily dosage of up to about 350 mg/kg of the weight of the subject. In some embodiments, the composition comprising a PIF peptide or PIF analog or pharmaceutically acceptable salt thereof is administered in a daily dosage of up to about 300 mg/kg of the weight of the subject. In some embodiments, the composition comprising a PIF peptide or PIF analog or pharmaceutically acceptable salt thereof is administered in a daily dosage of up to about 250 mg/kg of the weight of the subject. In some embodiments, the composition comprising PIF peptide or a PIF analog or pharmaceutically acceptable salt thereof is administered in a daily dosage of up to about 200 mg/kg of the weight of the subject. In some embodiments, the composition comprising PIF peptide or a PIF analog or pharmaceutically acceptable salt thereof is administered in a daily dosage of up to about 150 mg/kg of the weight of the subject. In some embodiments, the composition comprising a PIF peptide or a PIF analog or pharmaceutically acceptable salt thereof is administered in a daily dosage of up to about 100 mg/kg of the weight of the subject. In some embodiments, the composition comprising a PIF peptide or a PIF analog or pharmaceutically acceptable salt thereof is administered in a daily dosage of up to about 50 mg/kg of the weight of the subject. In some embodiments, the composition comprising PIF peptide or a PIF analog or pharmaceutically acceptable salt thereof is administered in a daily dosage of up to about 25 mg/kg of the weight of the subject.

In some embodiments, the composition comprising a PIF peptide or a PIF analog or pharmaceutically acceptable salt thereof is administered in a daily dosage of up to about 10 mg/kg of the weight of the subject. In some embodiments, the composition comprising PIF peptide or a PIF analog or pharmaceutically acceptable salt thereof is administered in a daily dosage of up to about 5 mg/kg of the weight of the subject. In some embodiments, the composition comprising PIF peptide or a PIF analog or pharmaceutically acceptable salt thereof is administered in a daily dosage of up to about 1 mg/kg of the weight of the subject. In some embodiments, the composition comprising a PIF peptide or a PIF analog or pharmaceutically acceptable salt thereof is administered in a daily dosage of up to about 0.1 mg/kg of the weight of the subject.

In some embodiments, the composition comprising a PIF analog, or pharmaceutically acceptable salt thereof is administered in a daily dosage of up to about 0.01 mg/kg of the weight of the subject. In some embodiments, the composition comprising a PIF analog, or pharmaceutically acceptable salt thereof is administered in a daily dosage of up to about 0.001 mg/kg of the weight of the subject. The dose administered to the subject can also be measured in terms of total amount of a PIF peptide or PIF analog administered per day.

In some embodiments, a subject in need thereof is administered from about 1 ng to about 500 µg of analog or pharmaceutically salt thereof per day. In some embodiments, a subject in need thereof is administered from about 1 ng to about 10 ng of analog or pharmaceutically salt thereof per day. In some embodiments, a subject in need thereof is administered from about 10 ng to about 20 ng of analog or pharmaceutically salt thereof per day. In some embodiments, a subject in need thereof is administered from about 10 ng to about 100 ng of analog or pharmaceutically salt thereof per day. In some embodiments, a subject in need thereof is administered from about 100 ng to about 200 ng of analog or pharmaceutically salt thereof per day. In some embodiments, a subject in need thereof is administered from about 200 ng to about 300 ng of analog or pharmaceutically salt thereof per day. In some embodiments, a subject in need thereof is administered from about 300 ng to about 400 ng of analog or pharmaceutically salt thereof per day. In some embodiments, a subject in need thereof is administered from about 400 ng to about 500 ng of analog or pharmaceutically salt thereof per day. In some embodiments, a subject in need thereof is administered from about 500 ng to about 600 ng of analog or pharmaceutically salt thereof per day. In some embodiments, a subject in need thereof is administered from about 600 ng to about 700 ng of analog or pharmaceutically salt thereof per day. In some embodiments, a subject in need thereof is administered from about 800 ng to about 900 ng of analog or pharmaceutically salt thereof per day. In some embodiments, a subject in need thereof is administered from about 900 ng to about 1 µg of analog or pharmaceutically salt thereof per day. In some embodiments, a subject in need thereof is administered from about 1 µg to about 100 µg of analog or pharmaceutically salt thereof per day. In some embodiments, a subject in need thereof is administered from about 100 µg to about 200 of analog or pharmaceutically salt thereof per day. In some embodiments, a subject in need thereof is administered from about 200 µg to about 300 µg of analog or pharmaceutically salt thereof per day. In some embodiments, a subject in need thereof is administered from about 300 to about 400 µg of analog or pharmaceutically salt thereof per day. In some embodiments, a subject in need thereof is administered from about 400 µg to about 500 µg of analog or pharmaceutically salt thereof per day. In some embodiments, a subject in need thereof is administered from about 500 µg to about 600 µg of analog or pharmaceutically salt thereof per day. In some embodiments, a subject in need thereof is administered from about 600 µg to about 700 µg of analog or pharmaceutically salt thereof per day. In some embodiments, a subject in need thereof is administered from about 800 µg to about 900 µg of analog or pharmaceutically salt thereof per day. In some embodiments, a subject in need thereof is administered from about 900 µg to about 1 mg of analog or pharmaceutically salt thereof per day.

In some embodiments, a subject in need thereof is administered from about 0.0001 to about 3000 milligrams of a PIF peptide or PIF analog or pharmaceutically salt thereof per day. In some embodiments, a subject is administered up to about 2000 milligrams of a PIF peptide or PIF analog or pharmaceutically salt thereof day. In some embodiments, a subject is administered up to about 1800 milligrams of a PIF peptide or PIF analog or pharmaceutically salt thereof per day. In some embodiments, a subject is administered up to about 1600 milligrams of a PIF peptide or PIF analog or pharmaceutically salt thereof per day. In some embodiments, a subject is administered up to about 1400 milligrams of a PIF peptide or PIF analog or pharmaceutically salt thereof per day. In some embodiments, a subject is administered up to about 1200 milligrams of a PIF peptide or PIF analog or pharmaceutically salt thereof per day. In some embodiments, a subject is administered up to about 1000 milligrams of a PIF peptide or PIF analog or pharmaceutically salt thereof per day. In some embodiments, a subject is administered up to about 800 milligrams of a PIF peptide or PIF analog or pharmaceutically salt thereof per day. In some embodiments, a subject is administered from about 0.0001 milligrams to about 700 milligrams of a PIF peptide or PIF analog or pharmaceutically salt thereof per dose. In some embodiments, a subject is administered up to about 700 milligrams of a PIF peptide or PIF analog or pharmaceutically salt thereof per dose. In some embodiments, a subject is administered up to about 600 milligrams of a PIF peptide or PIF analog or pharmaceutically salt thereof per dose. In some embodiments, a subject is administered up to about 500 milligrams of a PIF peptide or PIF analog or pharmaceutically salt thereof per dose. In some embodiments, a subject is administered up to about 400 milligrams of a PIF peptide or PIF analog or pharmaceutically salt thereof per dose. In some embodiments, a subject is administered up to about 300 milligrams of a PIF peptide or PIF analog or pharmaceutically salt thereof per dose. In some embodiments, a subject is administered up to about 200 milligrams of a PIF peptide or PIF analog or pharmaceutically salt thereof per dose. In some embodiments, a subject is administered up to about 100 milligrams of a PIF peptide or PIF analog or pharmaceutically salt thereof per dose. In some embodiments, a subject is administered up to about 50 milligrams of a PIF peptide or PIF analog or pharmaceutically salt thereof per dose. In some embodiments, a subject is administered up to about 25 milligrams of a PIF peptide or PIF analog or pharmaceutically salt thereof per dose. In some embodiments, a subject is administered up to about 15 milligrams of a PIF peptide or PIF analog or pharmaceutically salt thereof per dose.

In some embodiments, a subject is administered up to about 10 milligrams of a PIF peptide or PIF analog or pharmaceutically salt thereof per dose. In some embodiments, a subject is administered up to about 5 milligrams of a PIF peptide or PIF analog or pharmaceutically salt thereof per dose. In some embodiments, a subject is administered up to about 1 milligram of a PIF peptide or PIF analog or pharmaceutically salt thereof per dose. In some embodiments, a subject is administered up to about 0.1 milligrams of a PIF peptide or PIF analog or pharmaceutically salt thereof per dose. In some embodiments, a subject is administered up to about 0.001 milligrams of a PIF peptide or PIF analog or pharmaceutically salt thereof per dose.

The dose administered to the subject can also be measured in terms of total amount of a PIF peptide or PIF analog or pharmaceutically salt thereof administered per ounce of liquid prepared. In some embodiments, the PIF peptide or PIF analog or pharmaceutically salt thereof is at a concentration of about 2.5 grams per ounce of solution. In some embodiments, the PIF peptide or PIF analog or pharmaceutically salt thereof is at a concentration of about 2.25 grams per ounce of solution. In some embodiments, the PIF peptide or PIF analog or pharmaceutically salt thereof is at a concentration of about 2.25 grams per ounce of solution. In some embodiments, the PIF peptide or PIF analog or pharmaceutically salt thereof is at a concentration of about 2.0 grams per ounce of solution. In some embodiments, the PIF peptide or PIF analog or pharmaceutically salt thereof is at a concentration of about 1.9 grams per ounce of solution. In some embodiments, the PIF peptide or PIF analog or pharmaceutically salt thereof is at a concentration of about 1.8 grams per ounce of solution. In some embodiments, the PIF analog or pharmaceutically salt thereof is at a concentration of about 1.7 grams per ounce of solution. In some embodiments, the PIF peptide or PIF analog or pharmaceutically salt thereof is at a concentration of about 1.6 grams per ounce of solution. In some embodiments, the PIF peptide or PIF analog or pharmaceutically salt thereof is at a concentration of about 1.5 grams per ounce of solution. In some embodiments, the PIF peptide or PIF analog or pharmaceutically salt thereof is at a concentration of about 1.4 grams per ounce of solution. In some embodiments, the PIF peptide or PIF analog or pharmaceutically salt thereof is at a concentration of about 1.3 grams per ounce of solution. In some embodiments, the PIF peptide or PIF analog or pharmaceutically salt thereof is at a concentration of about 1.2 grams per ounce of solution. In some embodiments, the PIF peptide or PIF analog or pharmaceutically salt thereof is at a concentration of about 1.1 grams per ounce of solution. In some embodiments, the PIF peptide or PIF analog or pharmaceutically salt thereof is at a concentration of about 1.0 grams per ounce of solution.

In some embodiments, the PIF peptide or PIF analog or pharmaceutically salt thereof is at a concentration of about 0.9 grams per ounce of solution. In some embodiments, the PIF peptide or PIF analog or pharmaceutically salt thereof is at a concentration of about 0.8 grams per ounce of solution. In some embodiments, the PIF peptide or PIF analog or pharmaceutically salt thereof is at a concentration of about 0.7 grams per ounce of solution. In some embodiments, the PIF peptide or PIF analog or pharmaceutically salt thereof is at a concentration of about 0.6 grams per ounce of solution. In some embodiments, the PIF peptide or PIF analog or pharmaceutically salt thereof is at a concentration of about 0.5 grams per ounce of solution. In some embodiments, the PIF peptide or PIF analog or pharmaceutically salt thereof is at a concentration of about 0.4 grams per ounce of solution. In some embodiments, the PIF peptide or PIF analog or pharmaceutically salt thereof is at a concentration of about 0.3 grams per ounce of solution. In some embodiments, the PIF peptide or PIF analog or pharmaceutically salt thereof is at a concentration of about 0.2 grams per ounce of solution. In some embodiments, the PIF peptide or PIF analog or pharmaceutically salt thereof is at a concentration of about 0.1 grams per ounce of solution. In some embodiments, the PIF peptide or PIF analog or pharmaceutically salt thereof is at a concentration of about 0.01 grams per ounce of solution. In some embodiments, the PIF peptide or PIF analog or pharmaceutically salt thereof is at a concentration of about 0.001 grams per ounce of solution prepared. In some embodiments, the PIF peptide or PIF analog or pharmaceutically salt thereof is at a concentration of about 0.0001 grams per ounce of solution prepared. In some embodiments, the PIF peptide or PIF analog or pharmaceutically salt thereof is at a concentration of about 0.00001 grams per ounce of solution prepared. In some embodiments, the PIF peptide or PIF analog or pharmaceutically salt thereof is at a concentration of about 0.000001 grams per ounce of solution prepared.

Dosage may be measured in terms of mass amount of analog per liter of liquid formulation prepared. One skilled in the art can increase or decrease the concentration of the analog in the dose depending upon the strength of biological activity desired to treat or prevent any above-mentioned disorders associated with the treatment of subjects in need thereof. For instance, some embodiments of the invention can include up to 0.00001 grams of analog per 5 mL of liquid formulation and up to about 10 grams of analog per 5 mL of liquid formulation.

In some embodiments the pharmaceutical compositions of the claimed invention comprise at least one or a plurality of active agents other than the PIF peptide, analog of pharmaceutically acceptable salt thereof. In some embodiments the active agent is covalently linked to the PIF peptide or PIF analog disclosed herein optionally by a protease cleavable linker (including by not limited to Pro-Pro or Citruline-Valine di-a-amino acid linkers). In some embodiments, the one or plurality of active agents is one or a combination of compounds chosen from: an anti-inflammatory compound, alpha-adrenergic agonist, antiarrhythmic compound, analgesic compound, and an anesthetic compound.

TABLE 5

Examples of anti-inflammatory compounds include:

aspirin
celecoxib
diclofenac
diflunisal
etodolac
ibuprofen
indomethacin
ketoprofen
ketorolac nabumetone
naproxen
oxaprozin
piroxicam
salsalate
sulindac
tolmetin Examples of alpha-adrenergic agonists include:

Methoxamine
Methylnorepinephrine
Midodrine
Oxymetazoline
Metaraminol
Phenylephrine
Clonidine (mixed alpha2-adrenergic and imidazoline-I1 receptor agonist)
Guanfacine, (preference for alpha2A-subtype of adrenoceptor)
Guanabenz (most selective agonist for alpha2-adrenergic as opposed to imidazoline-I1)
Guanoxabenz (metabolite of guanabenz)
Guanethidine (peripheral alpha2-receptor agonist)
Xylazine,
Tizanidine
Medetomidine
Methyldopa
Fadolmidine
Dexmedetomidine Examples of antiarrhythmic compounds include:

Amiodarone (Cordarone, Pacerone)
Bepridil Hydrochloride (Vascor)
Disopyramide (Norpace)
Dofetilide (Tikosyn)
Dronedarone (Multaq)
Flecainide (Tambocor)
Ibutilide (Corvert)
Lidocaine (Xylocaine)
Procainamide (Procan, Procanbid)
Propafenone (Rythmol)
Propranolol (Inderal)
Quinidine (many trade names)
Sotalol (Betapace)
Tocainide (Tonocarid)

TABLE 5-continued

Examples of analgesic compound include:

codeine
hydrocodone (Zohydro ER),
oxycodone (OxyContin, Roxicodone),
methadone
hydromorphone (Dilaudid, Exalgo),
morphine (Avinza, Kadian, MSIR, MS Contin), and
fentanyl (Actiq, Duragesic)

Examples of anesthetic compounds include:

Desflurane
Isoflurane
Nitrous oxide
Sevoflurane
Xenon

The compounds of the present disclosure can also be administered in combination with other active ingredients, such as, for example, adjuvants, or other compatible drugs or compounds where such combination is seen to be desirable or advantageous in achieving the desired effects of the methods described herein. When exposing the PIF peptide to any cells, tissue, or organ prior to transplantation, exposure may be anywhere from about 1 to about 12 hours. In some embodiments, the step of exposing PIF to pre-condition cells prior to transplant is from about 2 to about 4 hours. In some embodiments, the step of exposing PIF to pre-condition cells prior to transplant is about 1, 2, 3, 4, 5, 6, 7, 8, 9, 10, 11, or 12 or more hours. In some embodiments, the step of exposing PIF to the organ, tissue, or cells prior to transplant occurs anywhere from about 1 to about 48 hours before transplant. In some embodiments, the step of exposing PIF to the organ, tissue, or cells prior to transplant occurs is about 1, 2, 3, 4, 5, 6, 7, 8, 9, 10, 11, 12, 15, 20, 25, 35, 45, or about 50 hours before transplant occurs. In some embodiments, the PIF peptide is exposed to the organ, tissue, or cells for a time and under conditions sufficient to increase the viability of the organ, tissue, or cells, increase the likelihood of successful transplantation, reduce recipient acceptance. In some embodiments, the organ, tissue, or cells is exposed to one or a combination of pharmaceutical compositions disclosed herein for no less than 1, 2, 3, 4, 5, 6, 7, 8, 9, 10 hours and/or at about room temperature. In some embodiments, the organ, tissue, or cells is exposed to one or a combination of pharmaceutical compositions disclosed herein for no less than 1, 2, 3, 4, 5, 6, 7, 8, 9 10 hours and/or at about 4 degree Celsius. In some embodiments, the organ, tissue, or cells are exposed to one or a combination of pharmaceutical compositions disclosed herein at from about 4 degree Celsius to about 40 degrees Celsius.

As used herein, the terms "acute radiation syndrome" and "acute radiation sickness" may be used interchangeably to refer to any acute or chronic symptom associated with lethal or sub-lethal exposure to radiation.

As used herein, the term "islet cells" refers to cells from any hormone-producing region of the pancreas.

As used herein, the term "hematopoietic cells" refers to any cell that may give rise to any type of blood cell within an organism. In some embodiments, the hematopoietic cell is a hematopoietic stem cell. In some embodiments, the hematopoietic cell is a pluripotent precursor cell capable of being differentiated into a blood cell. In some embodiments, the hematopoietic cell is a bone marrow cell. In some embodiments, the hematopoietic cell is a blood cell that was differentiated from an induced pluripotent stem cell, an embryonic cell, or a mesenchymal cell.

As used herein, the term "adrenal cells" refers to any cell from any hormone-producing region of the adrenal gland.

As used herein, the term "heart cells" refers to any cell from any portion of the heart or blood vessels. In some embodiments, the hematopoietic cell is a heart cell that was differentiated from an induced pluripotent stem cell, an embryonic stem cell, or a mesenchymal stem cell.

As used herein, the term "pre-condition" refers to the process of treating an organ, tissue, or cell prior to its transplantation or use. Any organ, tissue, or cell may be pre-conditioned one or more times.

As used herein, the term "adrenal cell disorder" refers to any dysfunction of any adrenal cell, and/or symptoms associated with such dysfunction. In some embodiments, the adrenal cell disorder is Cushing's disease requiring an adrenal cell transplant. In some embodiments, the disorder is any disease requiring an adrenal cell transplant.

As used herein, the term "blood disorder" refers to any dysfunction of any blood or blood component, and/or symptoms associated with such dysfunction. In some embodiments, the blood disorder is a blood cancer, such as leukemia. In some embodiments, the subject may have or suspected of having an immune disorder such as multiple sclerosis or Crohn's disease such that transplantation of the bone marrow or circulating immune cell population may treat or prevent progression of the disease.

As used herein, the term "heart disorder" refers to any dysfunction of any heart or heart component, and/or symptoms associated with such dysfunction. In some embodiments, the heart disorder is congestive heart failure.

Embodiments of the invention are directed to the use of PIF to treat acute radiation syndrome (ARS). In certain embodiments, methods of treating ARS comprise administering a PIF peptide to a subject, tissue, organ, or cells in need thereof. In some embodiments, ARS may be from intentional exposure to radiation, for example, in the case of radiation therapy for the treatment of cancer. In some embodiments, PIF may be administered before, after or in conjunction with radiation therapy or a combination thereof. In some embodiments, ARS may be from unintentional exposure to radiation. In some embodiments, a method of treating ARS following exposure to radiation may comprise administering PIF to a subject tissue, organ, or cells in need thereof. In some embodiments, a method of treating radiation-induced organ damage may comprise administering PIF to a subject tissue, organ, or cells in need thereof. In some embodiments, the organ damage may be to any organ in the body. In some embodiments, the organ damage may be to a vital organ of the body. In some embodiments, the organ damage may be damage to the skin, brain, heart, lungs, kidneys, spleen, liver, gastrointestinal tract, or pancreas. In some embodiments, a method of treating delayed effects of acute radiation exposure (DEARE) may comprise administering PIF to a subject, tissue, organ, or cells in need thereof. In some embodiments, a method of inhibiting or preventing the development of ARS after exposure to radiation may comprise administering PIF to a subject tissue, organ, or cells in need thereof. In some embodiments, a method of treating ARS may comprise transplanting bone marrow into a subject in need thereof, wherein the bone marrow is exposed to PIF prior to transplantation. In some embodiments, the subject does not receive an organ, tissue, or cell transplant. In some embodiments, the subject does not receive a bone marrow transplant.

Some embodiments are directed to the use of PIF as an immune modulatory agent for the improved acceptance of bone marrow or any other organ, tissue, or cell in autologous transplants, allogeneic transplants, semi-allogeneic transplants, or xenotransplants. An improved acceptance of bone marrow or any other organ, tissue, or cell may allow an enhanced survival of transplant patients and a wider use of autologous transplantation, allogeneic transplantation, semi-allogeneic transplantation, and xenotransplantation. Some embodiments are directed to a method of increasing engraftment of the transplanted organ, tissue, or cells comprising administering a PIF peptide to a subject in need thereof. Some embodiments are directed to a method of increasing engraftment of the transplanted organ, tissue, or cells comprising pre-exposing the organ, tissue, or cells to the PIF peptide prior to transplantation. In some embodiments, the subject may need the organ, tissue, or cell transplantation to treat ARS.

In some embodiments, a method of treating ARS in subjects with cancer following exposure to radiation comprises administering PIF to the subject. In some embodiments, the subject's exposure to radiation may have been intentional, such as when radiation therapy is used for the treatment of cancer. In some embodiments, the subject with cancer will not receive a transplant of bone marrow or any other organ before, during, or following the administration of PIF.

In some embodiments, a method of preventing elevation in expression of chemokines and cytokines after exposure to radiation comprises administering PIF to a subject in need thereof. In some embodiments, a method of improving immune cell function following exposure to radiation comprises administering PIF to a subject in need thereof. In some embodiments, PIF may be self-administered. In some embodiments, a method of increasing hepatic function following exposure to radiation comprises administering PIF to a subject in need thereof. In some embodiments, a method of normalizing hepatic enzyme levels following exposure to radiation comprises administering PIF to a subject in need thereof. In some embodiments, a method of treating or preventing a stochastic effect of radiation may comprise administering PIF to a subject in need thereof. In some embodiments, stochastic effects of radiation may include cancer, tumors, genetic damage, or a combination thereof.

In some embodiments, PIF may be administered as a preventative, as a concomitant, shortly after exposure, after organ damage, or a combination thereof. In such embodiments, PIF may be an effective ARS/DEARE countermeasure covering the spectrum of damage from cases where there is no pre-event information, and extending to those cases where belated information may become available, and damage has occurred. In some embodiments, PIF may not only address the immune aspects such as those present in ARS but also the related pathological aspects that occur in general due to such exposure to radiation (organ damage) and even at later time post-transplant when PIF was shown to provide protection against graft vs host (GVHD) as well as graft vs. leukemia (GVL)—frequent delayed effects of acute radiation exposure (DEARE). In other instances, in case of a hoax or non-specific information, where PIF may be administered as a preventative, minimal or no adverse reaction may be expected, as it is believed that PIF is inherently nontoxic.

In the foregoing embodiments, exposure to radiation may include exposure to lethal doses of radiation. In the foregoing embodiments, exposure to radiation may include exposure to non-lethal doses of radiation. In the foregoing embodiments, the radiation dose may be from about 100 rads to about 3000 rads, from about 200 rads to about 3000 rads, from about 500 rads to about 3000 rads, from about 800 rads to about 3000 rads, from about 1000 rads to about 3000 rads, from about 100 rads to about 1000 rads, from about 200 rads to about 1000 rads, from about 500 rads to about 1000 rads, from about 100 rads to about 5000 rads or from about 100 rads to about 6000 rads, and any range between any of these values, including endpoints.

In the foregoing embodiments, the PIF peptide may be administered prior to, concurrently with or following exposure to radiation.

In some embodiments, the PIF peptide is administered or is pre-exposed in a therapeutically effective amount. In some embodiments, the PIF peptide is administered after the subject undergoes transplant, before the subject undergoes transplant, while the subject undergoes transplant, or a combination thereof. In some embodiments, the subject may receive secondary treatment, which may include secondary administration of a PIF peptide, before the subject undergoes transplant, while the subject undergoes transplant, or a combination thereof.

In the foregoing embodiments, the PIF peptide may be administered at a dose of about 0.01 mg/kg/day, about 0.1 mg/kg/day, about 0.5 mg/kg/day, 0.75 mg/kg/day, 1 mg/kg/day, 2 mg/kg/day, 4 mg/kg/day, 6 mg/kg/day, 8 mg/kg/day, 10 mg/kg/day, 20 mg/kg/day, or any range between any of these values, including endpoints. Such doses may be administered as a single dose or as divided doses in a single day.

In the foregoing embodiments, the PIF may be administered once, for a limited period of time or as a maintenance therapy (over an extended period of time until the condition is ameliorated, cured or for the life of the subject). A limited period of time may be for 1 week, 2 weeks, 3 weeks, 4 weeks and up to one year, including any period of time between such values, including endpoints. In some embodiments, the PIF peptide may be administered for about 1 day, for about 3 days, for about 1 week, for about 10 days, for about 2 weeks, for about 18 days, for about 3 weeks, or for any range between any of these values, including endpoints.

In the foregoing embodiments, the PIF may be administered once daily, twice daily, three times daily, four times daily or more.

In the foregoing embodiments, the PIF peptide may be administered before exposure to radiation, within about 6 hours of exposure to radiation, within about 12 hours of exposure to radiation, within about 18 hours of exposure to radiation, within about 24 hours of exposure to radiation, within about 30 hours of exposure to radiation, within about 36 hours of exposure to radiation, within about 42 hours of exposure to radiation, within about 48 hours of exposure to radiation, or within any range between any of these values, including endpoints.

In some embodiments, the PIF is administered or provided as a pharmaceutical composition comprising a PIF peptide, as defined above, and a pharmaceutically acceptable carrier or diluent, or an effective amount of a pharmaceutical composition comprising a compound as defined above.

The methods disclosed herein can be used with any of the compounds, compositions, preparations, and kits disclosed herein.

In some embodiments, the disclosure relates to methods for treating acute radiation syndrome comprising administering an effective amount of the compositions described herein to a subject in need thereof.

In some embodiments, the disclosure relates to methods for treating acute radiation syndrome following radiation exposure comprising transplanting bone marrow to a subject in need thereof, wherein the bone marrow is pre-exposed to an effective amount of the compositions described herein.

In some embodiments, the disclosure relates to methods for increasing engraftment of a transplanted organ, tissue, or cells comprising transplanting the organ, tissue, or cell into a subject in need thereof, wherein the organ, tissue, or cell is pre-exposed to an effective amount of the compositions described herein prior to transplantation.

In some embodiments, the disclosure relates to a method of increasing the likelihood of acceptance of a transplant of a donor organ, tissue, or cell into a subject, comprising exposing the organ, tissue, or cell to one or more compositions described herein prior to transplanting the organ, tissue, or cell into the subject.

In some embodiments, the disclosure relates to a method of reducing the likelihood of rejection of an engrafted tissue, comprising exposing the tissue to one or more of the compositions described herein prior to transplanting the tissue into a subject.

In some embodiments, the disclosure relates to a method of increasing production of hematopoietic cells in a subject having a depleted number of hematopoietic cells, comprising administering one or more pharmaceutical compositions described herein.

In an embodiment, the composition is administered once a day to a subject in need thereof. In another embodiment, the composition is administered every other day, every third day or once a week. In another embodiment, the composition is administered twice a day. In still another embodiment, the composition is administered three times a day or four times a day. In a further embodiment, the composition is administered at least once a day for at least 1, 2, 3, 4, 5, 6, 7, 8, 9, 10, 11 or 12 weeks. In still a further embodiment, the composition is administered at least once a day for a longer term such as at least 4, 6, 8, 10, 12 or 24 months. Administration in some embodiments includes but is not limited to a dosage of 10-50 mg of composition at a frequency of minimum 1, 2, 3 or 4 times per day. In some embodiments, the compositions are administered once a week, once every other week or once a month. Optionally, administration continues until all symptoms are resolved and cleared by medical personnel.

In some embodiments, the composition is administered within 1, 2, 3, 5 or 7 days of exposure to radiation. In other embodiments, the composition is administered within 1, 2, 3, 5 or 7 days of the appearance of symptoms of ARS.

In some embodiments, the composition is administered at least once a day until the condition has ameliorated to where further treatment is not necessary. In another embodiment, the composition is administered until all symptoms of the condition are resolved. In further embodiments, the composition is administered for at least 1, 2, 3, 6, 8, 10 or 12 or 24 months after the subject is asymptomatic.

The compositions of the present disclosure are useful and effective when administered to treat acute radiation syndrome, as well as to pre-condition organs, cells, or tissues prior to transplantation. The amount of each component present in the composition will be the amount that is therapeutically effective, i.e., an amount that will result in the effective treatment of the condition (e.g., ARS) when administered. The therapeutically effective amount will vary depending on the subject and the severity and nature of the injury and can be determined routinely by one of ordinary skill in the art.

In some embodiments, the disclosure relates to a method of treating or preventing any of the indications set forth in U.S. Pat. Nos. 7,723,289, 7,723,290, 8,222,211, 8,454,967, 9,097,725, (each of which are incorporated by reference in their entireties) comprising administering compositions or pharmaceutical compositions comprising any one or plurality of PIF peptides, analogs, or pharmaceutically acceptable salts thereof disclosed herein.

In some methods, the disclosure relates to a method of stimulating the differentiation and/or proliferation of stem cells in a subject in need thereof comprising administering compositions or pharmaceutical compositions comprising any one or plurality of PIF peptides, analogs, or pharmaceutically acceptable salts thereof disclosed herein.

In some embodiments, the disclosure relates to any of the methods disclosed in U.S. Pat. Nos. 7,273,708, 7,695,977, 7,670,852, 7,670,851, 7,678,582, 7,670,850, 8,012,700 (each of which are incorporated by reference in their entireties) comprising administering compositions or pharmaceutical compositions comprising any one or plurality of PIF peptides, analogs, or pharmaceutically acceptable salts thereof disclosed herein. This disclosure also incorporates by reference in their entireties U.S. Pat. Nos. 7,789,289, 7,723,290, 8,222,211, and 8,454,967.

In some embodiments, the disclosure relates to a pharmaceutical composition comprising a therapeutically effective amount or dose of at least one PIF peptide, an analog thereof, or a pharmaceutically acceptable salt thereof, and a pharmaceutically acceptable carrier for the treatment of acute radiation syndrome.

In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the pre-condition of organs, tissues, or cells prior to transplantation.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment acute radiation syndrome.

In some embodiments, the disclosure relates to a method of inducing an immunomodulation effect in a subject in need thereof, when subject has been or is suspected of having acute radiation syndrome.

In some embodiments, the disclosure relates to a method of treating acute radiation syndrome by administering at least one or a plurality of compositions disclosed herein comprising PIF peptide, an analog thereof, or a pharmaceutically acceptable salt thereof.

In some embodiments, the disclosure relates to a method of treating acute radiation syndrome by administering a therapeutically effective amount or dose of one or a plurality of compositions disclosed herein comprising at least one PIF peptide, an analog thereof, or a pharmaceutically acceptable salt thereof.

In some embodiments, the disclosure relates to a method of treating acute radiation syndrome by administration of a pharmaceutical composition comprising a therapeutically effective amount or dose of at least one PIF peptide, an analog thereof, or a pharmaceutically acceptable salt thereof, and a pharmaceutically acceptable carrier.

In some embodiments, the disclosure relates to a pharmaceutical composition comprising a therapeutically effective amount or dose of at least one PIF peptide, an analog thereof, or a pharmaceutically acceptable salt thereof, and a pharmaceutically acceptable carrier for the treatment of acute radiation syndrome In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the treatment of acute radiation syndrome.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment of acute radiation syndrome.

In some embodiments, the disclosure relates to a method of inducing an immunomodulation effect in a subject in need thereof, when subject has or is suspected of having acute radiation syndrome.

In some embodiments, the disclosure relates to a method of treating graft-versus-host disease by administering at least one or a plurality of compositions disclosed herein comprising PIF peptide, an analog thereof, or a pharmaceutically acceptable salt thereof.

In some embodiments, the disclosure relates to a method of treating graft-versus-host disease by administering a therapeutically effective amount or dose of one or a plurality of compositions disclosed herein comprising at least one PIF peptide, an analog thereof, or a pharmaceutically acceptable salt thereof.

In some embodiments, the disclosure relates to a method of treating graft-versus-host disease by administration of a pharmaceutical composition comprising a therapeutically effective amount or dose of at least one PIF peptide, an analog thereof, or a pharmaceutically acceptable salt thereof, and a pharmaceutically acceptable carrier.

In some embodiments, the disclosure relates to a pharmaceutical composition comprising a therapeutically effective amount or dose of at least one PIF peptide, an analog thereof, or a pharmaceutically acceptable salt thereof, and a pharmaceutically acceptable carrier for the treatment of graft-versus-host disease.

In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the treatment of graft-versus-host disease.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment of graft-versus-host disease.

In some embodiments, the disclosure relates to a method of inducing an immunomodulation effect in a subject in need thereof, when subject has or is suspected of having graft-versus-host disease.

In some embodiments, the disclosure relates to a method of treating inflammation by administering at least one or a plurality of compositions disclosed herein comprising PIF peptide, an analog thereof, or a pharmaceutically acceptable salt thereof.

In some embodiments, the disclosure relates to a method of treating inflammation by administering a therapeutically effective amount or dose of one or a plurality of compositions disclosed herein comprising at least one PIF peptide, an analog thereof, or a pharmaceutically acceptable salt thereof.

In some embodiments, the disclosure relates to a method of treating inflammation by administration of a pharmaceutical composition comprising a therapeutically effective amount or dose of at least one PIF peptide, an analog thereof, or a pharmaceutically acceptable salt thereof, and a pharmaceutically acceptable carrier.

In some embodiments, the disclosure relates to a pharmaceutical composition comprising a therapeutically effective amount or dose of at least one PIF peptide, an analog or mimetic thereof, or a pharmaceutically acceptable salt thereof, and a pharmaceutically acceptable carrier for the treatment of inflammation.

In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the treatment of inflammation.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment of inflammation.

In some embodiments, the disclosure relates to a method of inducing an immunomodulation effect in a subject in need thereof, when subject has been or is suspected of having inflammation.

In some embodiments, the disclosure relates to a method of treating auto-immune disease by administering at least one or a plurality of compositions disclosed herein comprising PIF peptide, an analog thereof, or a pharmaceutically acceptable salt thereof.

In some embodiments, the disclosure relates to a method of treating auto-immune disease by administering a therapeutically effective amount or dose of one or a plurality of compositions disclosed herein comprising at least one PIF peptide, an analog thereof, or a pharmaceutically acceptable salt thereof.

In some embodiments, the disclosure relates to a method of treating auto-immune disease by administration of a pharmaceutical composition comprising a therapeutically effective amount or dose of at least one PIF peptide, an analog thereof, or a pharmaceutically acceptable salt thereof, and a pharmaceutically acceptable carrier.

In some embodiments, the disclosure relates to a pharmaceutical composition comprising a therapeutically effective amount or dose of at least one PIF peptide, an analog thereof, or a pharmaceutically acceptable salt thereof, and a pharmaceutically acceptable carrier for the treatment of auto-immune disease.

In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the treatment of auto-immune disease.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment of auto-immune disease.

In some embodiments, the disclosure relates to a method of inducing an immunomodulation effect in a subject in need thereof, when subject has been or is suspected of having auto-immune disease.

In some embodiments, the disclosure relates to a method of treating inflammation disorders by administering at least one or a plurality of compositions disclosed herein comprising PIF peptide, an analog thereof, or a pharmaceutically acceptable salt thereof.

In some embodiments, the disclosure relates to a method of treating inflammation disorders by administering a therapeutically effective amount or dose of one or a plurality of compositions disclosed herein comprising at least one PIF peptide, an analog thereof, or a pharmaceutically acceptable salt thereof.

In some embodiments, the disclosure relates to a method of treating inflammation disorders by administration of a pharmaceutical composition comprising a therapeutically effective amount or dose of at least one PIF peptide, an analog thereof, or a pharmaceutically acceptable salt thereof, and a pharmaceutically acceptable carrier.

In some embodiments, the disclosure relates to a pharmaceutical composition comprising a therapeutically effective amount or dose of at least one PIF peptide, an analog thereof, or a pharmaceutically acceptable salt thereof, and a pharmaceutically acceptable carrier for the treatment of inflammation disorders.

In some embodiments, the disclosure relates to the use of a therapeutically effective amount or dose of any one or plurality of compositions disclosed herein comprising at least one PIF peptide, an analog thereof, or a pharmaceutically acceptable salt thereof, and a pharmaceutically acceptable carrier in the manufacture of a medicament for the treatment of inflammation disorders.

In some embodiments, the disclosure relates to the use of a pharmaceutical composition comprising a therapeutically effective amount or dose at least one PIF peptide, an analog thereof, or a pharmaceutically acceptable salt thereof, and a pharmaceutically acceptable carrier in the manufacture of a medicament for the treatment of inflammation disorders.

In some embodiments, the disclosure relates to a method of inducing an immunomodulation effect in a subject in need thereof, when subject has been or is suspected of having inflammation disorders.

In some embodiments, the disclosure relates to a method of treating repetitive strain injuries by administering at least one or a plurality of compositions disclosed herein comprising PIF peptide, an analog thereof, or a pharmaceutically acceptable salt thereof.

According to some embodiments of the invention, the formulation may be supplied as part of a kit. In some embodiments, the kit comprises comprising a PIF peptide and/or a PIF analog or pharmaceutically acceptable salt thereof, the PIF peptide and/or a PIF analog or pharmaceutically acceptable salt thereof comprises a non-natural amino acid or is at least 70% homologous to SEQ ID NO:20. In another embodiment, the kit comprises a pharmaceutically acceptable salt of an analog with a rehydration mixture. In another embodiment, the pharmaceutically acceptable salt of an analog is in one container while the rehydration mixture is in a second container. The rehydration mixture may be supplied in dry form, to which water or other liquid solvent may be added to form a suspension or solution prior to administration. Rehydration mixtures are mixtures designed to solubilize a lyophilized, insoluble salt of the invention prior to administration of the composition to a subject takes at least one dose of a purgative. In another embodiment, the kit comprises a pharmaceutically acceptable salt in orally available pill form.

The kit may contain two or more containers, packs, or dispensers together with instructions for preparation and administration. In some embodiments, the kit comprises at least one container comprising the pharmaceutical composition or compositions described herein and a second container comprising a means for delivery of the compositions such as a syringe. In some embodiments, the kit comprises a composition comprising an analog in solution or lyophilized or dried and accompanied by a rehydration mixture. In some embodiments, the analog and rehydration mixture may be in one or more additional containers.

The compositions included in the kit may be supplied in containers of any sort such that the shelf-life of the different components are preserved, and are not adsorbed or altered by the materials of the container. For example, suitable containers include simple bottles that may be fabricated from glass, organic polymers, such as polycarbonate, polystyrene, polypropylene, polyethylene, ceramic, metal, or any other material typically employed to hold reagents or food; envelopes, that may consist of foil-lined interiors, such as aluminum or an alloy. Other containers include test tubes, vials, flasks, and syringes. The containers may have two compartments that are separated by a readily removable membrane that upon removal permits the components of the compositions to mix. Removable membranes may be glass, plastic, rubber, or other inert material.

Kits may also be supplied with instructional materials. Instructions may be printed on paper or other substrates, and/or may be supplied as an electronic-readable medium, such as a floppy disc, CD-ROM, DVD-ROM, zip disc, videotape, audio tape, or other readable memory storage device. Detailed instructions may not be physically associated with the kit; instead, a user may be directed to an internet web site specified by the manufacturer or distributor of the kit or supplied as electronic mail.

In another embodiment, a packaged kit is provided that contains the pharmaceutical formulation to be administered, i.e., a pharmaceutical formulation containing PIF peptide and/or a PIF analog or pharmaceutically acceptable salt thereof, a container (e.g., a vial, a bottle, a pouch, an envelope, a can, a tube, an atomizer, an aerosol can, etc.), optionally sealed, for housing the formulation during storage and prior to use, and instructions for carrying out drug administration in a manner effective to treat any one or more of the indications disclosed herein. The instructions will typically be written instructions on a package insert, a label, and/or on other components of the kit.

Depending on the type of formulation and the intended mode of administration, the kit may also include a device for administering the formulation (e.g., a transdermal delivery device). The administration device may be a dropper, a swab, a stick, or the nozzle or outlet of an atomizer or aerosol can. The formulation may be any suitable formulation as described herein. For example, the formulation may be an oral dosage form containing a unit dosage of the active agent, or a gel or ointment contained within a tube. The kit may contain multiple formulations of different dosages of the same agent. The kit may also contain multiple formulations of different active agents.

The present kits will also typically include means for packaging the individual kit components, i.e., the pharmaceutical dosage forms, the administration device (if included), and the written instructions for use. Such packaging means may take the form of a cardboard or paper box, a plastic or foil pouch, etc.

This disclosure and embodiments illustrating the method and materials used may be further understood by reference to the following non-limiting examples.

EXAMPLES

Materials and Methods

The following materials and methods were used to conduct the experiments described herein.

ARS murine models: C57BL/6 mice (6-7- or 8-9-week-old females) and F1 (C57BL/6×Balb/c) mice (10-11-week-old females) were obtained from Harlan Laboratories Ltd (Israel). The study was conducted under ethical conditions approved by the Institutional Animal Welfare Committee of the Hebrew University of Jerusalem. Mice were kept and monitored in pathogen-free conditions. Mice from the C57BL/6 strain underwent whole-body irradiation by a single dose of sub-lethal (6 Gry) or lethal (10 Gry) whole-body irradiation at a dose rate (0.3 Gry/min), using a clinical 6MEV (Linear Varian CL-6), Varian medical systems, Palo Alto, Calif., USA.

sPIF *: Synthetic PIF (MVRIKPGSANKPSDD) (SEQ ID NO: 1) was obtained from Biosynthesis Lewisville, N.J. USA. The peptide was purified to >95% as documented by HPLC/mass spectrometry (sPIF proprietary).

Statistical analysis: Data from in vivo studies are represented as mean±SEM. Data from in vitro studies are represented as mean±SD. Single comparisons to control were made using two-tailed Student's t-test or Mann-Whitney test. One-way repeated measures ANOVA followed by Bonferroni's Multiple Comparison Test were used for multi-group design. P<0.05 was considered to be statistically significant. Data handling and statistical processing was performed using Microsoft Excel and GraphPad Prism Software. Gene expression was determined based on the AACt method and calculated by the qBASE+ software. Results are expressed as fold change from a standard reference sample included in each run. The analyses of gene expression were calculated via a non-parametric Mann-Whitney U Test. P<0.05 was considered significant. Colon global gene analysis was carried out using heat map followed by individual genes determining differences among the groups setting P<0.05 as significant.

Long-term sub-lethal sPIF experiments in ARS: Analysis of hematopoietic recovery: Mice underwent whole-body irradiation (6 Gry). After 24 hrs. PIF or PBS (1 mg/kg/day) was administered continuously (0.25 ml/hr.) to C57BL/6 mice for two weeks using subcutaneously implanted Alzet osmotic pumps (Model 1002, Durect Corp., CA). This was followed by two weeks of observation post-therapy without any added therapy.

No antibiotics were administered in any of the experiments. The hematopoietic profile of each mouse was examined weekly until sacrifice. Weekly up to four weeks at sacrifice, mice were tail-bled and 1000 blood was collected into EDTA coated capillary tubes. A CBC with differential was performed using a validated BC-2800 Vet Auto Hematology Analyzer (Mindray, Mahwah, N.J. USA). Results were compared with normal mice.

Short-term sub-lethal sPIF experiments in ARS: hematopoiesis colon and systemic cytokines: Mice were irradiated (6 or 7 Gry). 24 or 48 hrs. post-irradiation 0.75 mg/kg, sPIF was injected subcutaneously twice daily for three days. At the end of the experiment mice were sacrificed and colon tissue removed for histology, Illumina global genome analysis, and RTPCR. In addition, the serum was removed for cytokine analysis. Results were compared with normal mice. For sub-lethal long-term ARS experiments, sPIF (1 mg/kg/day: Alzet osmotic pump; Model 1002, Durect Corp., CA) or PBS was injected for 14 days followed by 14 days of observation post-therapy. Hematopoietic profiles were examined weekly by collecting 100 μl tail blood. CBC with differential was performed using a validated BC-2800 Vet Auto Hematology Analyzer (Mindray, Mahwah, N.J. USA).

sPIF induced long-term hematopoietic recovery post-lethal irradiation and semi-allogeneic BMT: CBC and tibia bone histology analysis: Mice were irradiated (10 Gry), lethal dose. One day post-irradiation, bone marrow (BM) mononuclear cells from donor mice F1 (C57BL/6×Balb/c) were collected by flushing the femur and tibia bone with PBS (Biological Industries). Mononuclear cells were isolated by using Lymphoprep method. A total of 8*106 BM cells were administered to the tail vein of irradiated recipient mice. Following BMT, mice were monitored daily for loss of weight, ruffled skin, and survival as previously described. Once a week mice up to four weeks at sacrifice were tail-bled and 100 μl blood was collected into EDTA coated capillary tubes. CBC with differential was performed using a validated BC-2800 Vet Auto Hematology Analyzer (Mindray, Mahwah, N.J. USA). Results were compared with normal mice.

sPIF preconditioned allogeneic BMT: Whether BM pre-conditioned with PIF can improve BMT engraftment without further therapy after BMT was determined. Mice underwent (10 Gry) whole body irradiation. After 24 hrs., BM cells were exposed to sPIF for only 2 hrs. before transplantation, followed by washing off the cells prior to inoculation to the tail vein of recipient mice. As control BM cells were exposed to PBS before transplant. After transplantation, mice were followed without any further therapy for up to 4 weeks. Following sacrifice total WBC count and lymphocytes concentrations were carried out. Results were compared to PBS-control.

sPIF effects MSC regulatory function: CFSE stained murine splenocytes were activated with anti-CD3 antibodies, were cultured for four days (in a 50:1 ratio) and were exposed to MSCs previously incubated (2 h) with sPIF or control. Cell proliferation was analyzed using Flow Cytometry. Data was analyzed the % proliferating cells by comparing the sPIF pre-treated MSCs as compared to control (activated splenocytes without MSCs).

sPIF-treated femur bone histological analysis: Mice were irradiated 10 Gry and after 24 hrs. sPIF treatment was initiated, lasting for 14 days (Alzet pump) following by 14 days post-therapy. sPIF-preconditioned BMT without further therapy was studied as well. At the end of the study WBC and femur bone samples were obtained from mice following sacrifice and fixed in 4% neutral-buffered formalin. Samples were decalcified then embedded in paraffin, cut into 10-micron thick sections, and stained with hematoxylin and eosin (H&E). Results were compared with PBS treated mice and with normal mice.

sPIF-treated serum cytokine evaluation: Circulating cytokine levels from peripheral blood were determined by using Mouse Th1/Th2 lOplex FlowCytomix Multiplex kit (Bioscience, San Diego, Calif., USA) according to the manufacturer's protocol.

sPIF-treated colon histology and crypt depth determination: Following sublethal irradiation (6 Gry) sPIF treatment started at 24 or 48 hrs. post-irradiation lasting 2 or 3.

Following sacrifice, the colon was harvested and washed extensively in PBS to remove intestinal contents. The jejunum was fixed in 10% neutral buffered formalin prior to paraffin embedding. Samples were processed into 5 mm sections for hematoxylin and eosin (Fisher Scientific, Pittsburgh, Pa.) routinely and crypt depth was determined. Notably, crypt depth was reported as a marker of recovery after radiation exposure. For this analysis, a BX51 microscope (Olympus, Tokyo, Japan) equipped with a digital camera was used and images acquired using a 10× objective. The images were analyzed using ImageJ software as previously reported. The effect of sPIF treatment after 24 and 48 hrs. post-therapy was compared with PBS and normal mice.

sPIF gene analysis: RT-qPCR analysis macrophages and colon tissue: sPIF targets macrophages and is effective in GVHD model reducing oxidative stress genes in the liver. Therefore, gene expression in colon samples from sub-lethal short-term mice after 24-48 post-radiation (6 Gry) was determined following exposure to sPIF compared to PBS and normal mice. This was carried out in two independent sets of experiments. In addition, a number of genes were determined also in macrophages following exposure for 24 h to sPIF in vitro determining macrophage polarity. Total RNA was extracted using RNeasy® Mini Kit columns (QIAGEN, Hilden, Germany) according to the manufacturer's protocols. 1 µg of total RNA was used to synthesize cDNA using High-Capacity cDNA kit (Applied Biosystems, Gran Island, N.Y., USA) according to manufacturer's instructions as reported previously. Detection of transcript levels of B7H1, NOS2, and Arg-1, was performed using the TaqMan Gene Expression Assay Kit (Applied (Applied Biosystems). HPRT-1 was used as a housekeeping gene transcript to normalized endogenous control. All primers were purchased from Applied Biosystems. Real-Time PCR reaction was carried out using the ABI Prism 7900 Sequence system (Applied Biosystems). Data was analyzed by StepOne Software version 2.2 (Applied Biosystems). DataAssist Software v3.01. Data sets p-values were adjusted using Benjamin-Hochberg method.

sPIF protective signaling pathway: Colon Illumina gene Array: To round-up elucidating sPIF's protective signaling pathways, a global gene array was performed. Following sub-lethal radiation (6 Gry), at 24 hrs. sPIF injection twice daily for 72 hrs. were administered. The effect of sPIF following radiation was compared with PBS-treated control. Normal mice without irradiation served as an additional control. Following sacrifice, 30 mg of colon tissue (N=4-5 treatment group) was excised and homogenized in a Fastprep 120 tissue homogenizer (30 s at 4.0 m/sec) in cell lysis buffer (Qiagen, Hombrechtikon, Switzerland). Total RNAs were extracted from cells using PureLink RNA Mini Kit (Ambion, catalog number 12183018A). Total RNA (250 ng) was amplified into cRNA using TotalPrep RNA amplification kit (AMIL1791, Ambion) following manufacture's instruction. After amplification, 1.5 µg of CRNA was mixed with the hybridization controls and it was hybridized to MouseRef-8 array (BD-202-0202, Illumina, USA). The array was hybridized for 16 hrs. in a hybridization oven with a rocking platform at 58° C. The array chip then went through a series of washes before it was stained with streptavidin-Cy3. After the staining, it went through a final wash and drying. The array was scanned using the Illumina HiScan Scanner.

sPIF-induced macrophage shift polarization: Cell isolation and in vitro macrophage differentiation: To determine the ability of sPIF to induce macrophage polarization shift from a pro-inflammatory to a regulatory phenotype, the following experiments were carried out. Peritoneal macrophages were harvested from C57BL/6 mice by injecting intra-peritoneally 1 ml of 3% Brewer thioglycolate medium (Sigma-Aldrich, St Louis, Mo., USA). Four days later, mice were sacrificed, and peritoneal cells were collected from the abdominal cavity by washing with 5 ml PBS. Cells ($1.4 \times 10^6$ cells/ml) were dispensed onto 6-well plates (Corning Costar, Corning, N.Y. USA) and incubated at 37° C. in 5% CO2 for 75 min. Non-adherent cells were discarded and RPMI-1640 (Gibco, Grand Island, N.Y., USA) containing 10% fetal calf serum (Biological Industries, Kibutz, Beit Haemek, Israel) was added. For M1 pro-inflammatory differentiation studies 10 ng/ml (GM-CSF) and 10 ng/ml Lipopolysaccharides (LPS) (PeprotTech, Rocky Hill, N.J., USA) were added to the culture medium followed by incubation at 37° C. in 5% CO2 for 20 hrs. Alternatively, for M2 regulatory differentiation 10 ng/ml XXXX (M-CSF) and 10 ng/ml IL-4 (PeprotTech) were added to media. sPIF was added to the medium together with the differentiation factors.

Flow cytometry differentiated macrophages analysis: To determine the effect of sPIF on M1 to M2 differentiation after 20 hrs. of culture differentiated macrophages by (IL4 and GMSCF) were harvested by using Trypsin-EDTA solution (Biological Industries, Israel). Cells were stained at 4° C. For intracellular staining, cells were fixed in 1% paraformaldehyde (Electron Microcopy Sciences Hatfield, Pa. USA) and then permeabilized by saponing (number SIGMA-Aldrich, St. Louis, Mo. USA). The following antibodies were used: anti-mouse CD11b APC (SouthernBiotech, Birmingham, Ala., USA), anti-mouse F4/80 Pacific Blue (BioLegend, San Diego, Calif., USA), anti-mouse CD206 FITC (AbD Serotec, Raleigh, N.C., USA) anti-mouse CD16/32 PE and anti-mouse CD23 eFluor 660 (eBioscience). Flow cytometry was performed using the MACSQuant® analyzer (Miltenyi Biotech, San Diego, Calif., USA).

Example 1

Figure 1A:
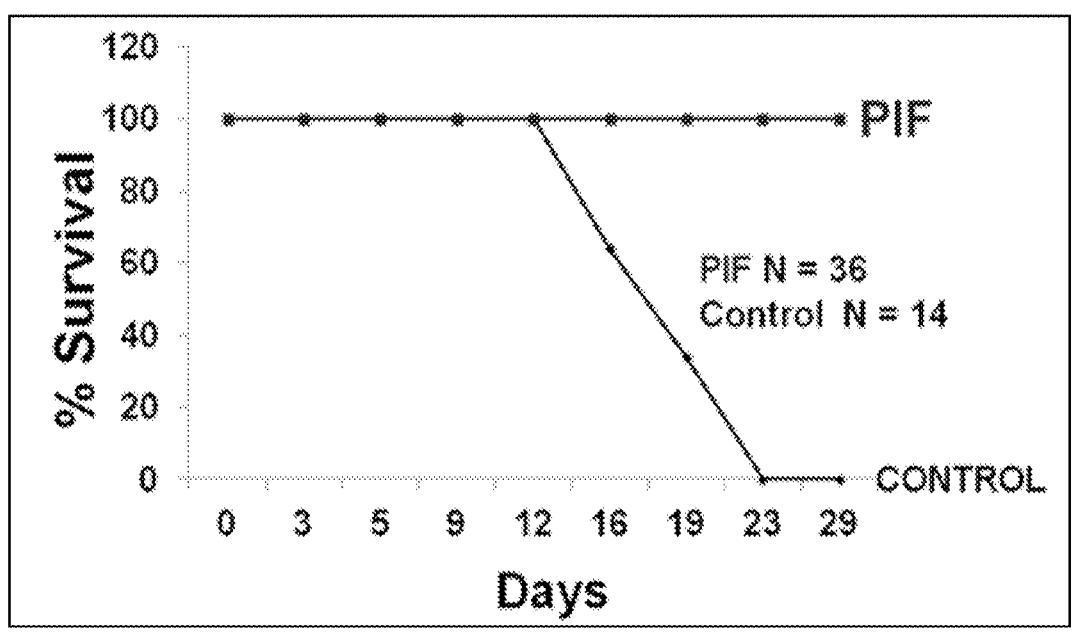
FIGS. 1A to 1D illustrate that PIF protects against lethal radiation.
Figure 1B:
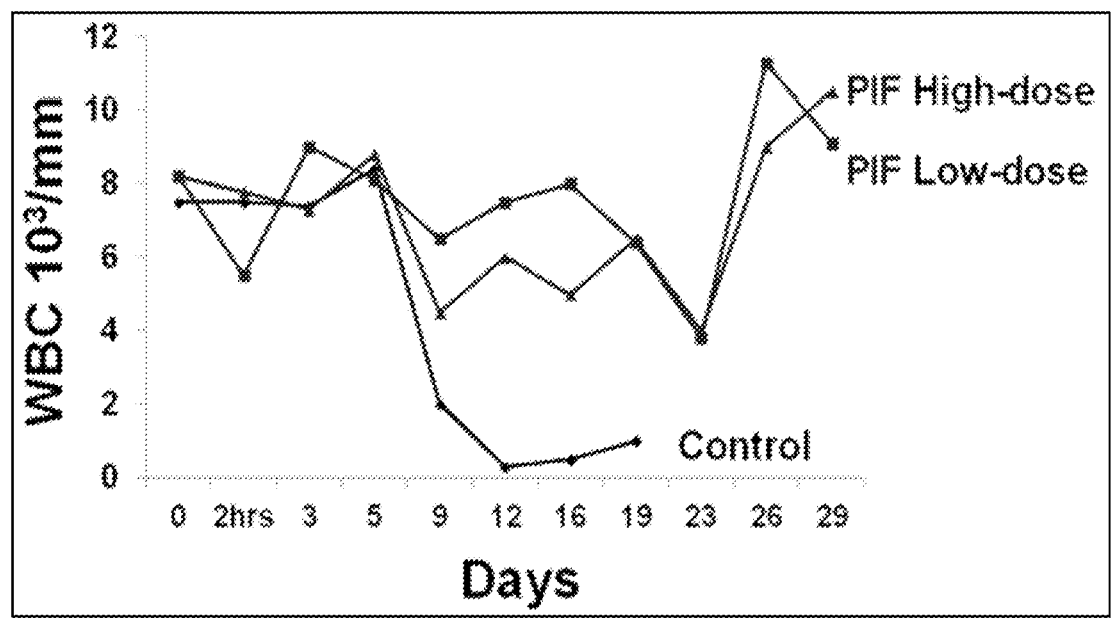
Figure 1C:
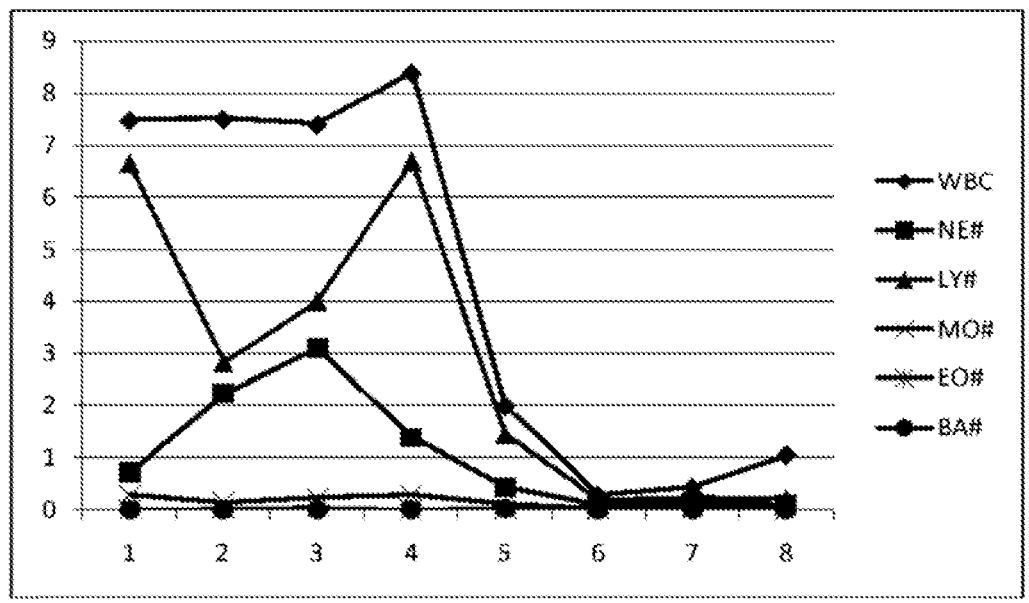
Figure 1C:
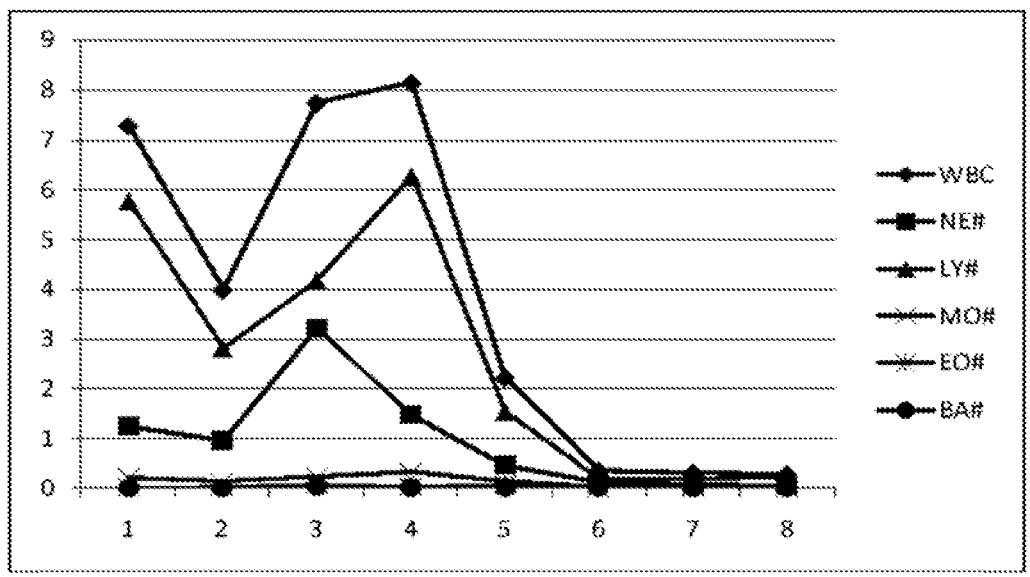
Figure 1C:
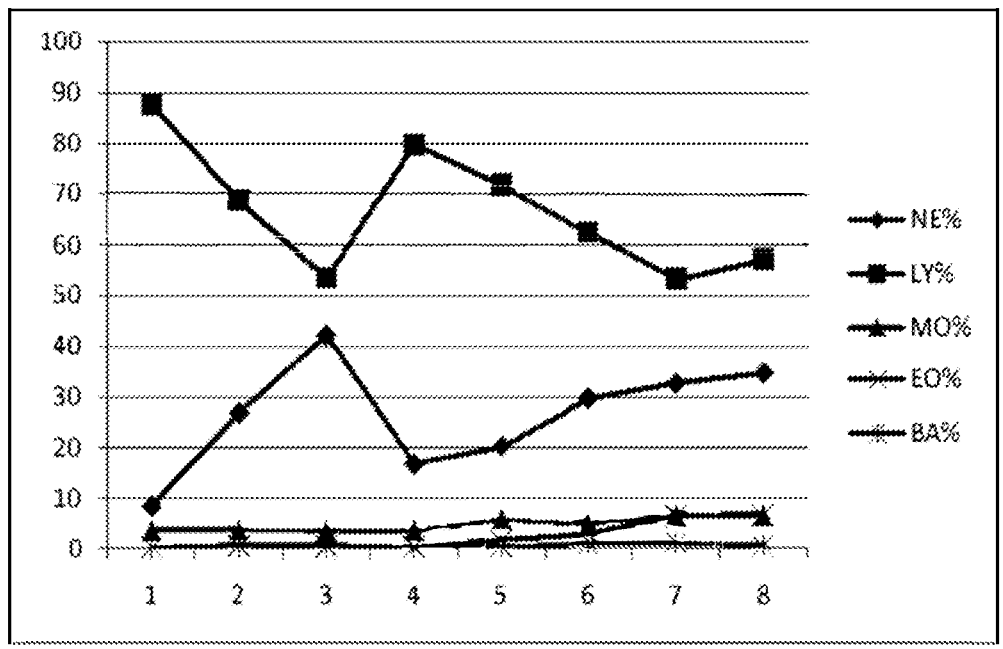
Figure 1C:
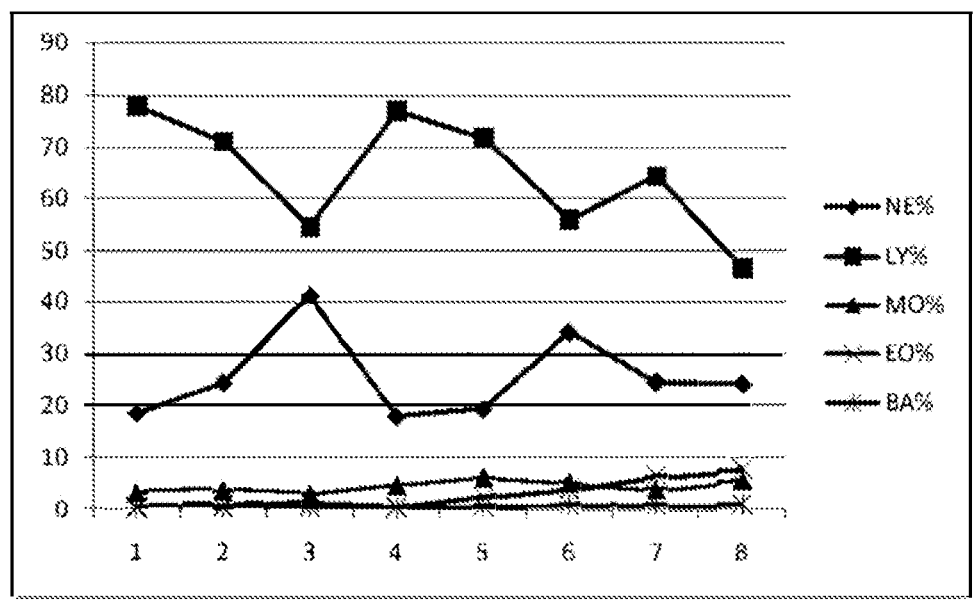
Figure 1C:
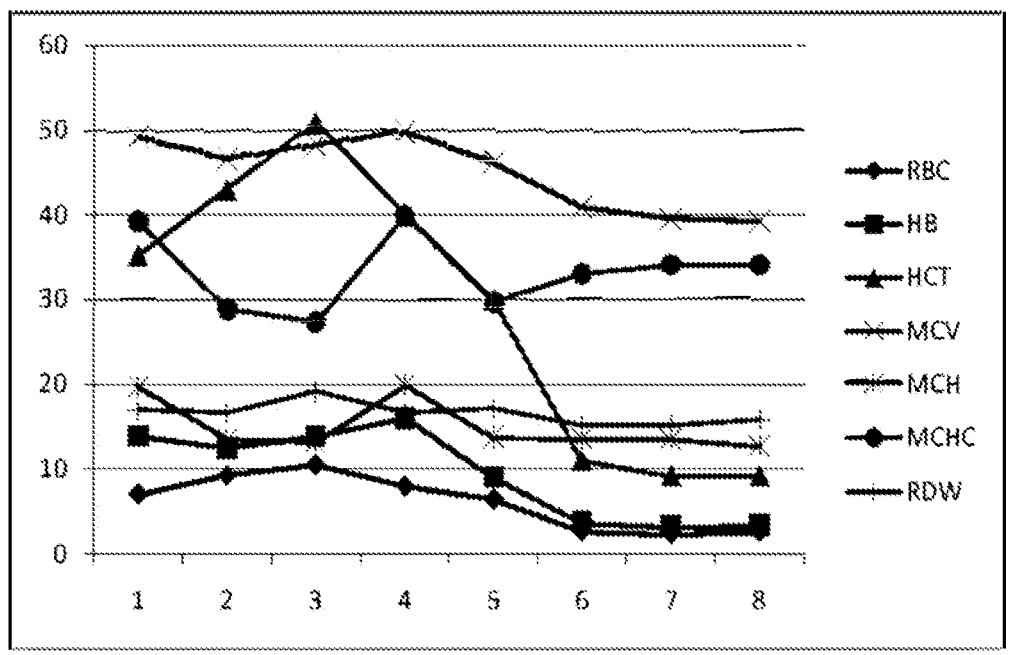
Figure 1C:
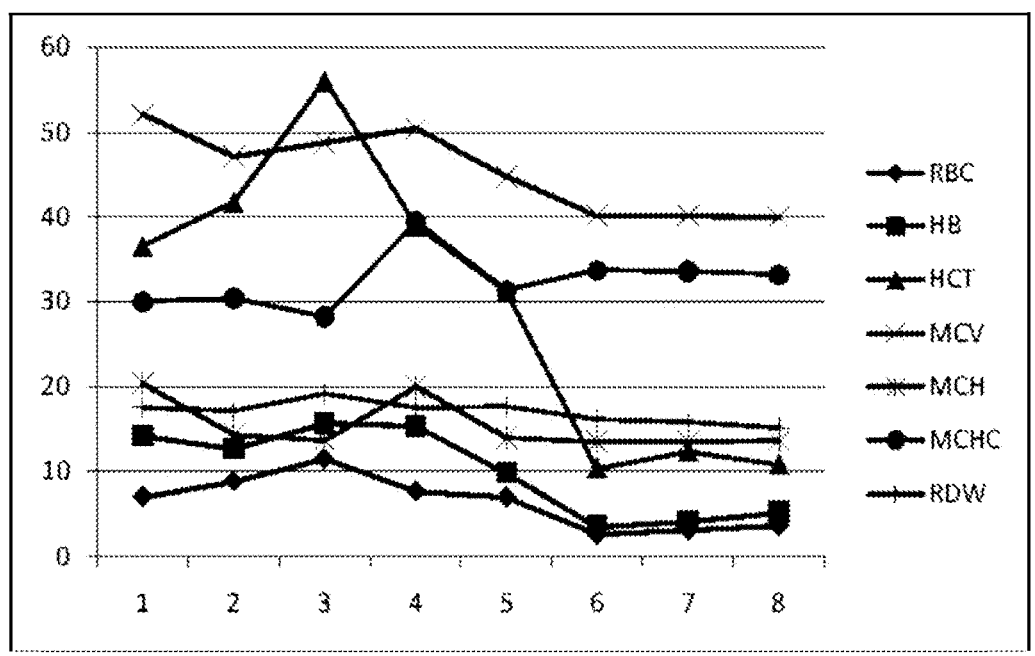
Figure 1C:
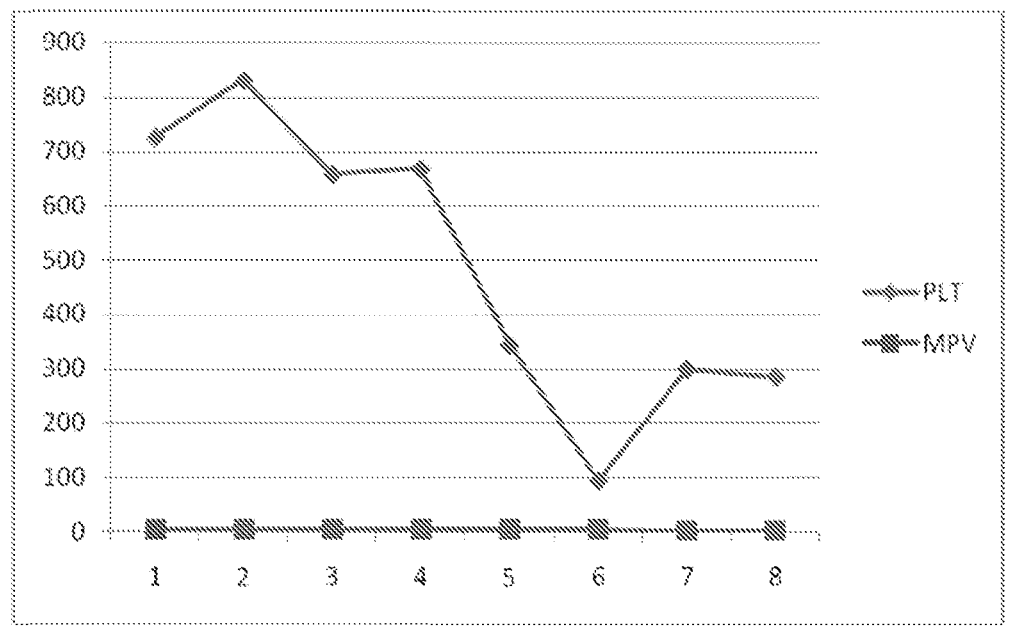
Figure 1C:
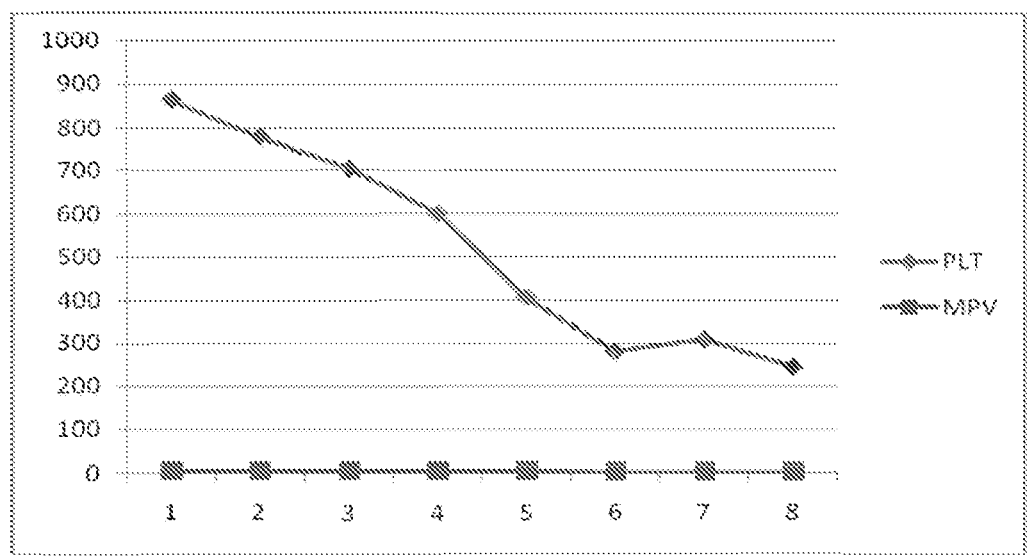
Figure 1D:
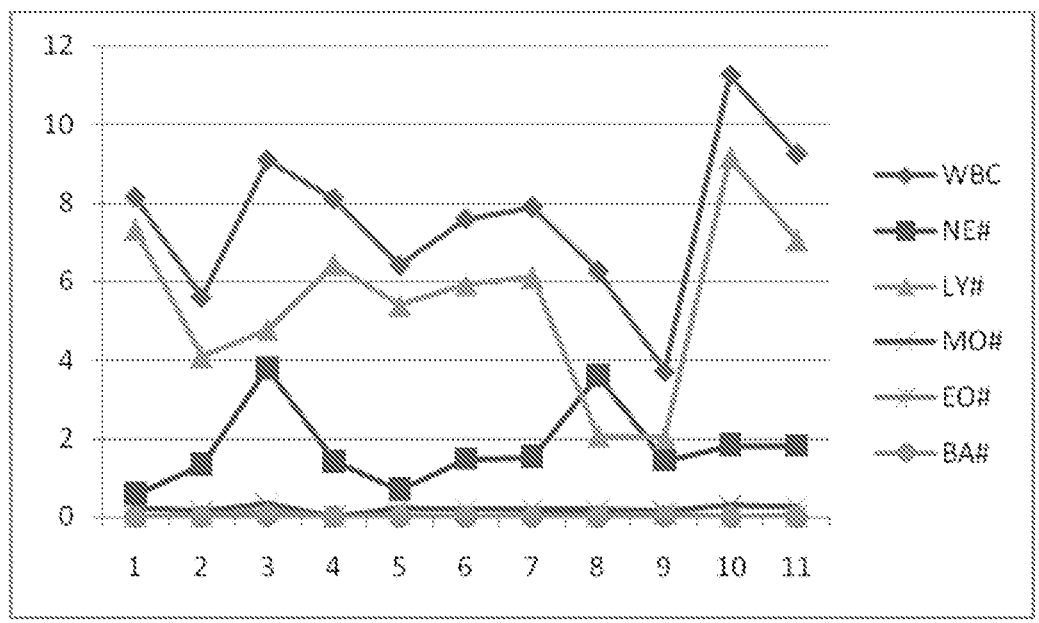
Figure 1D:
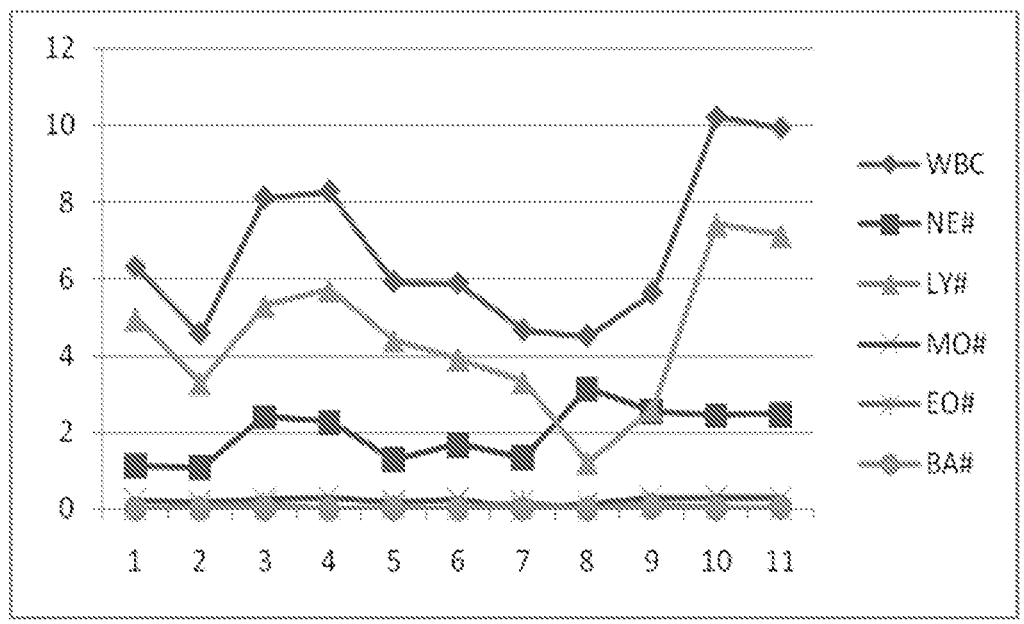
Figure 1D:
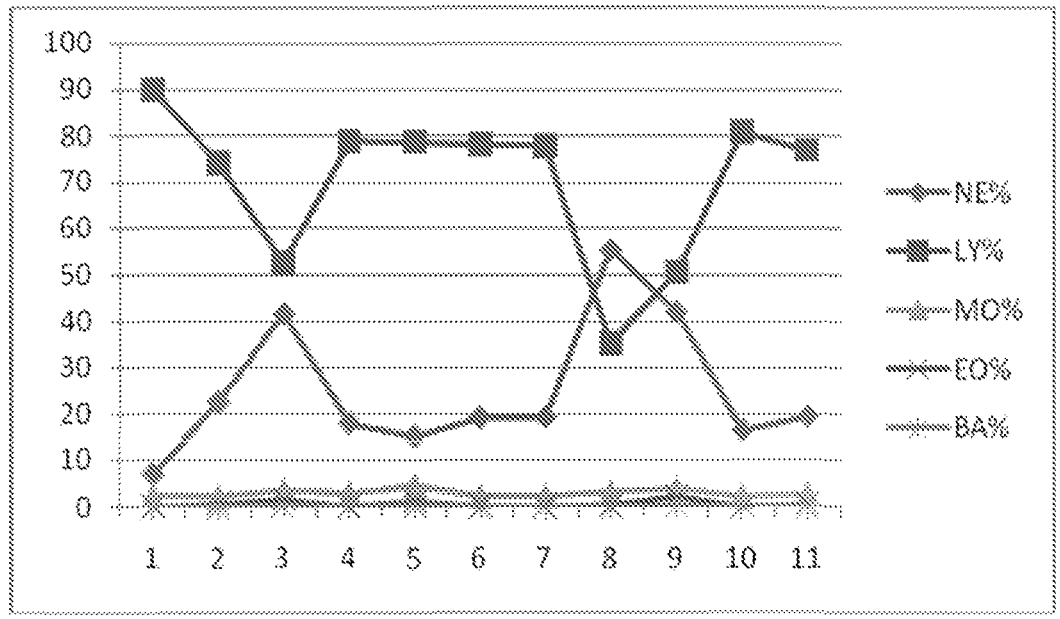
Figure 1D:
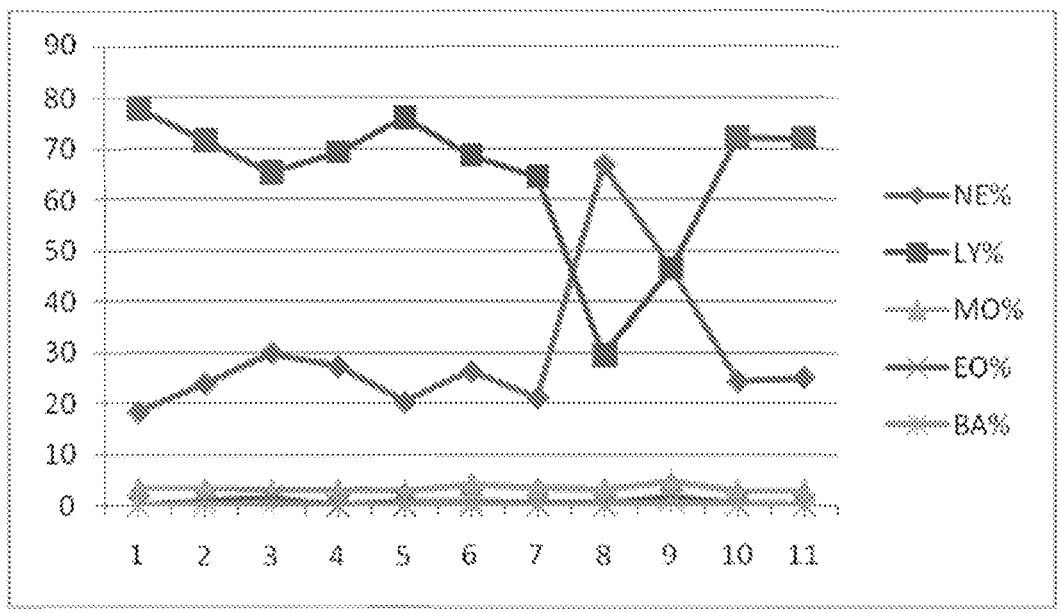
Figure 1D:
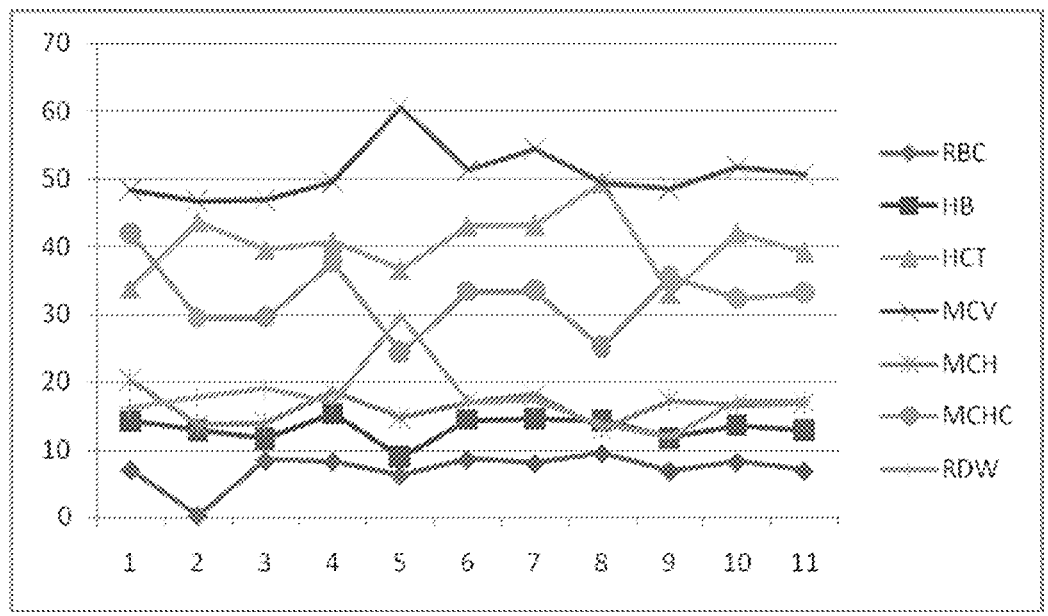
Figure 1D:
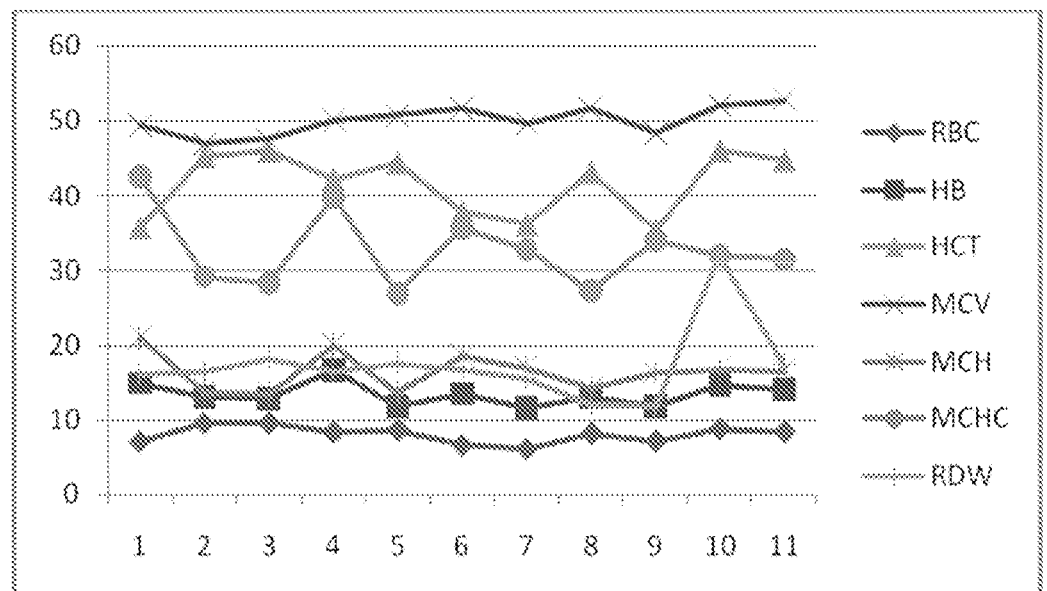
Figure 1D:
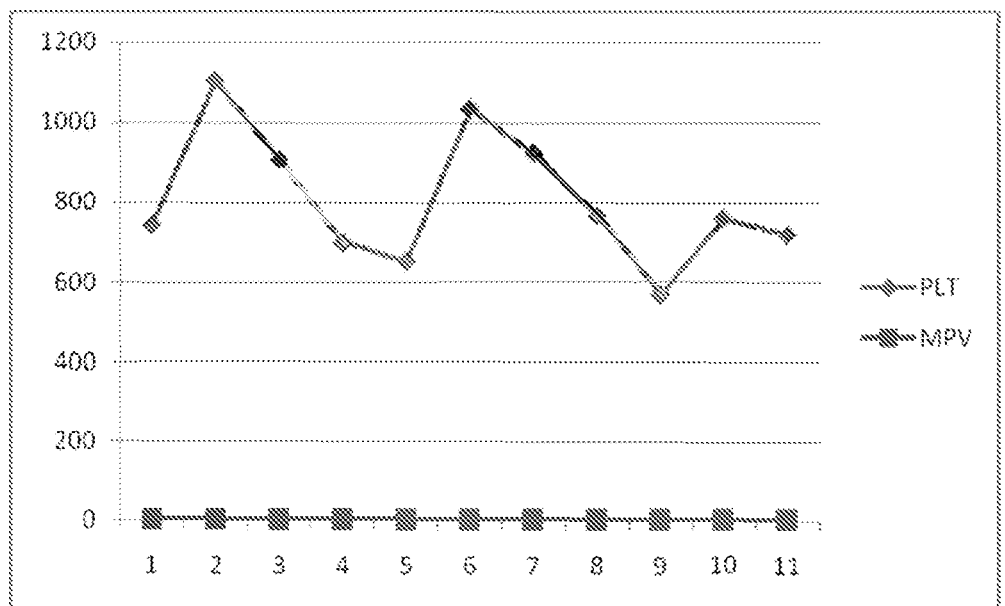
Figure 1D:
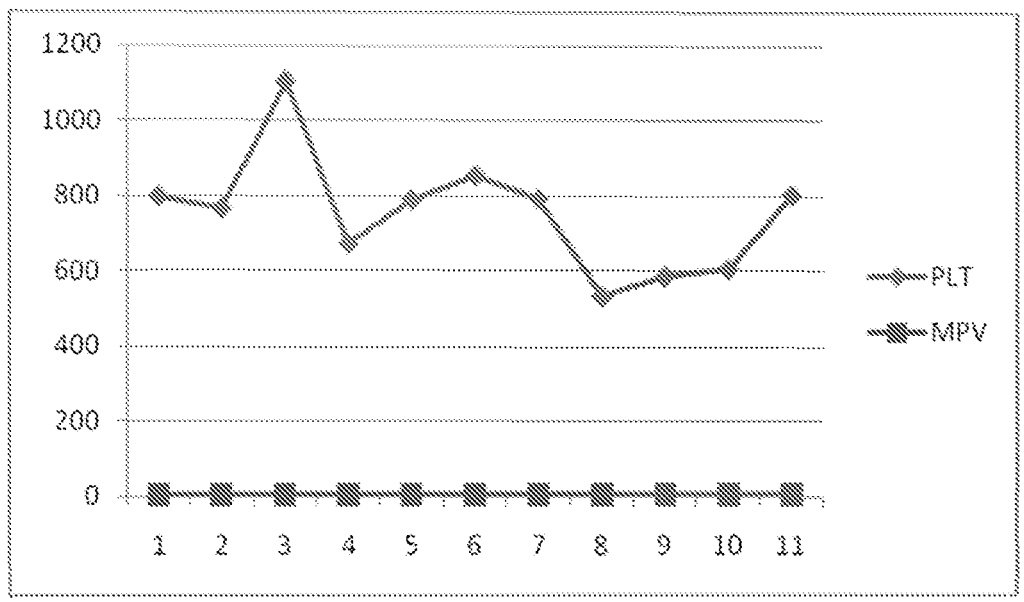
Figure 1E:
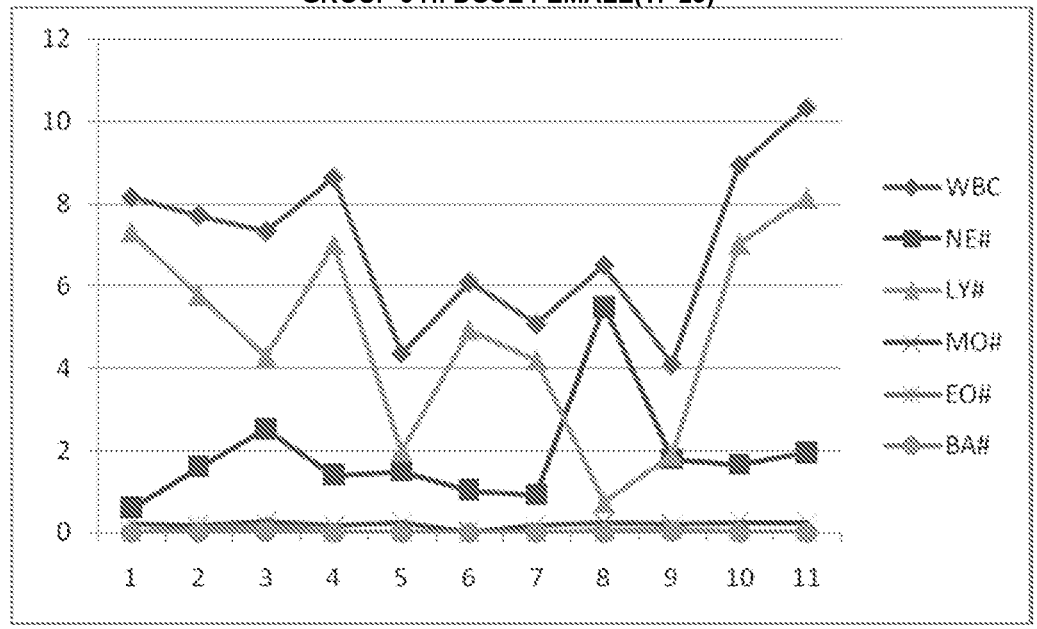
Figure 1E:
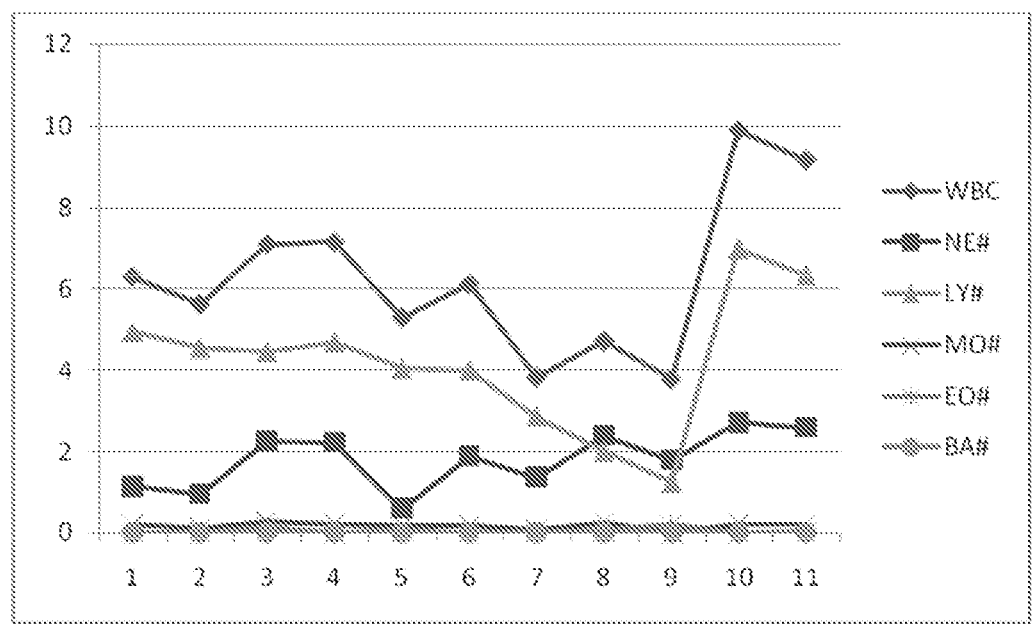
Figure 1E:
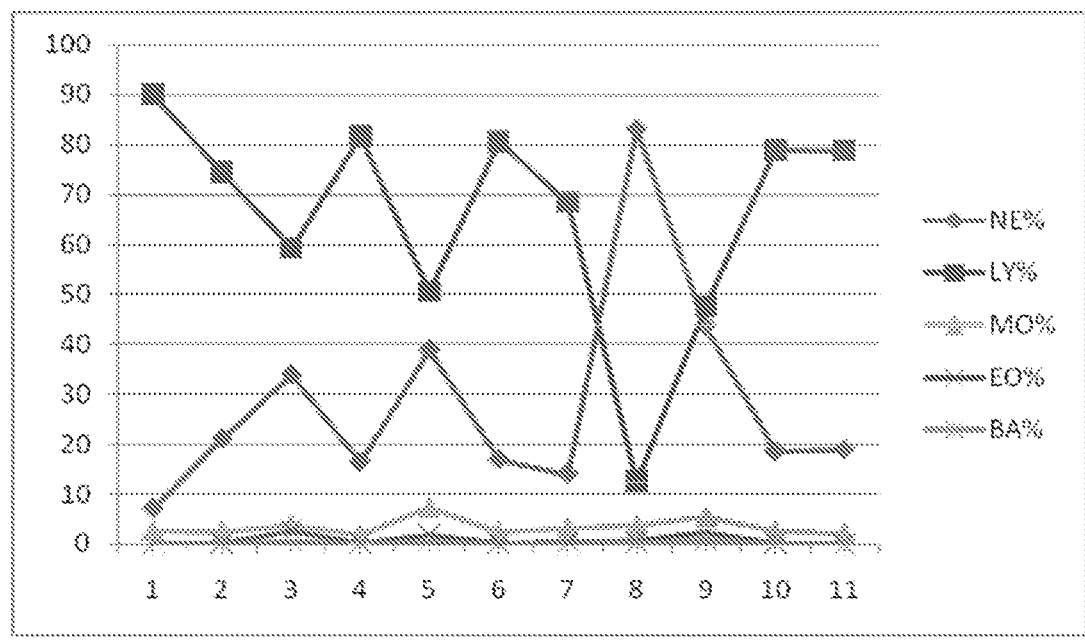
Figure 1E:
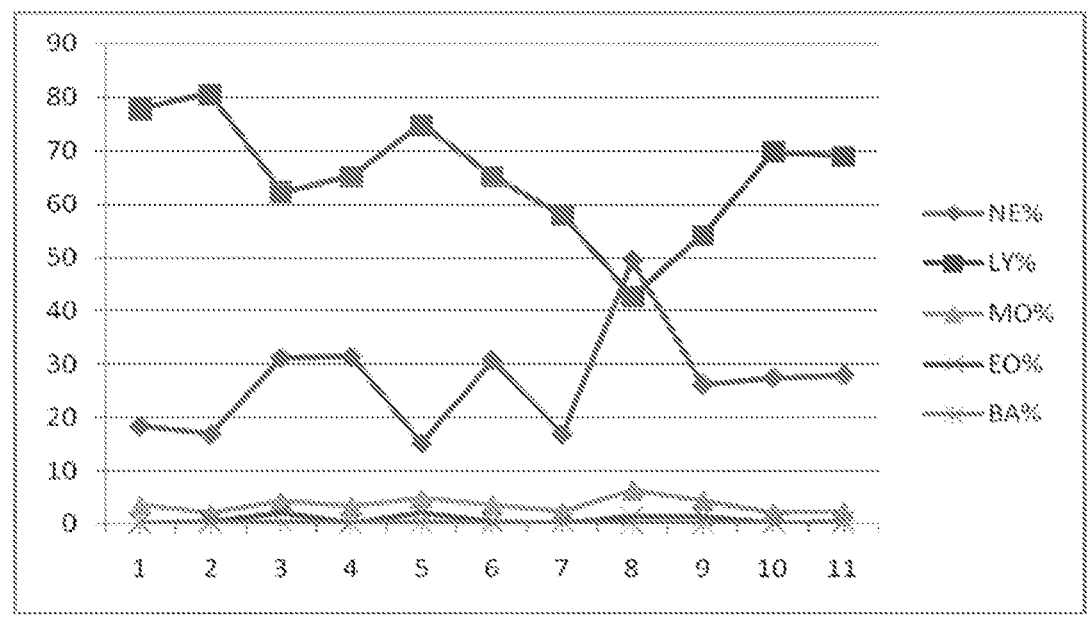
Figure 1E:
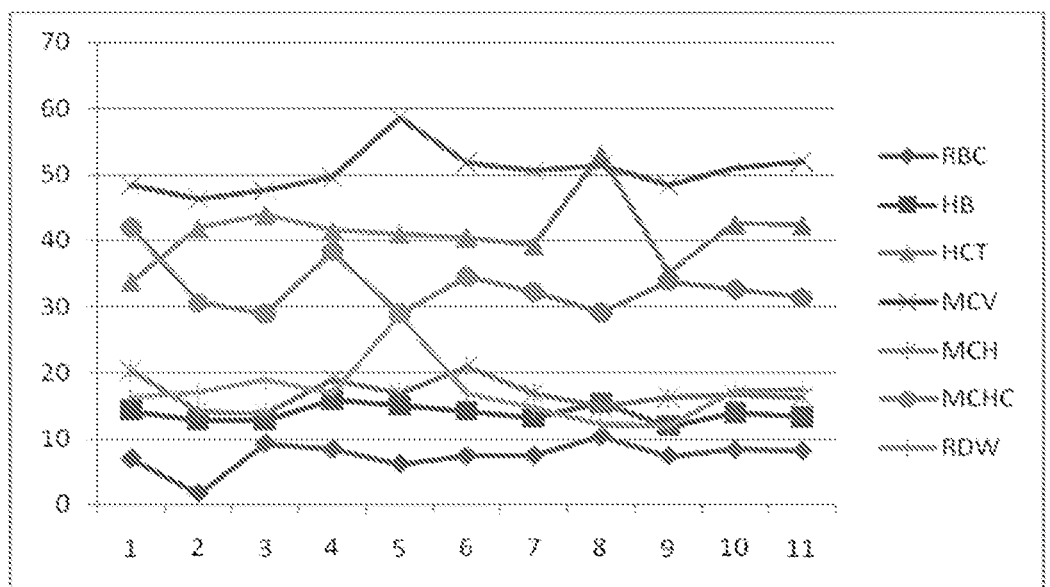
Figure 1E:
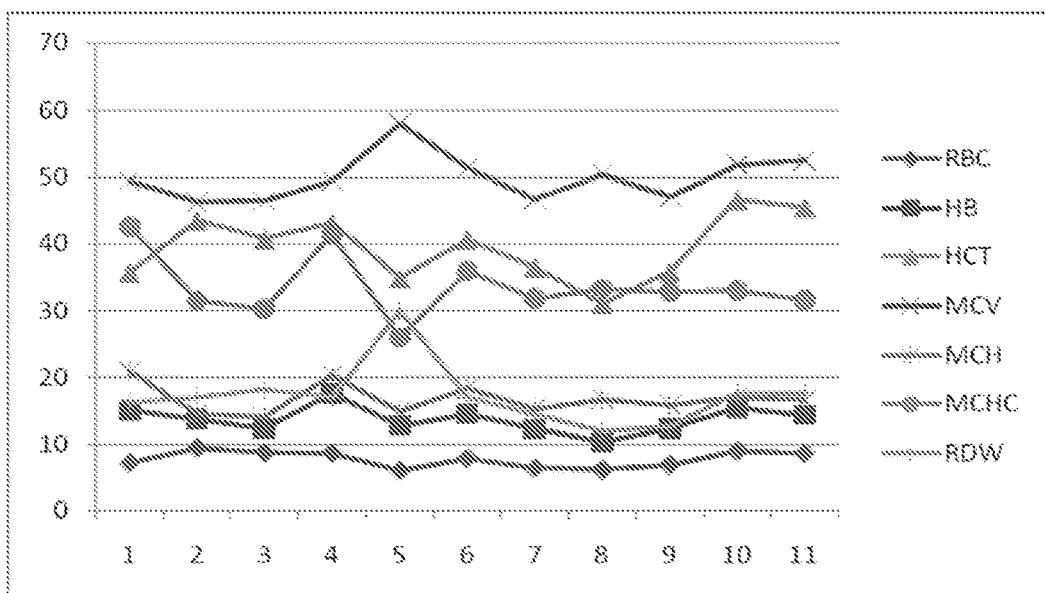
Figure 1E:
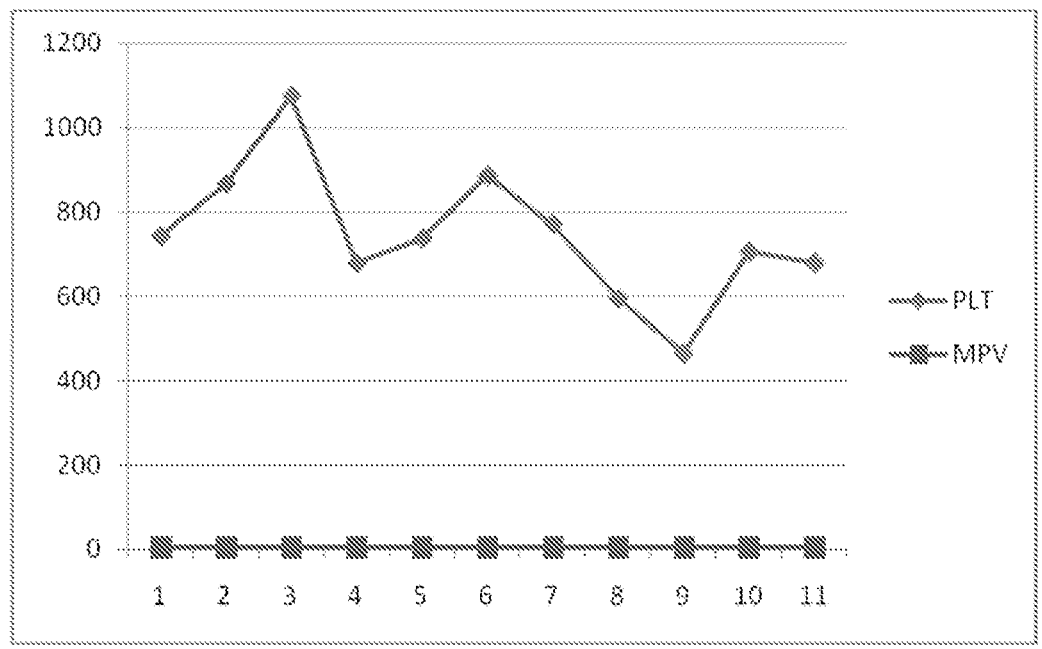
Figure 1E:
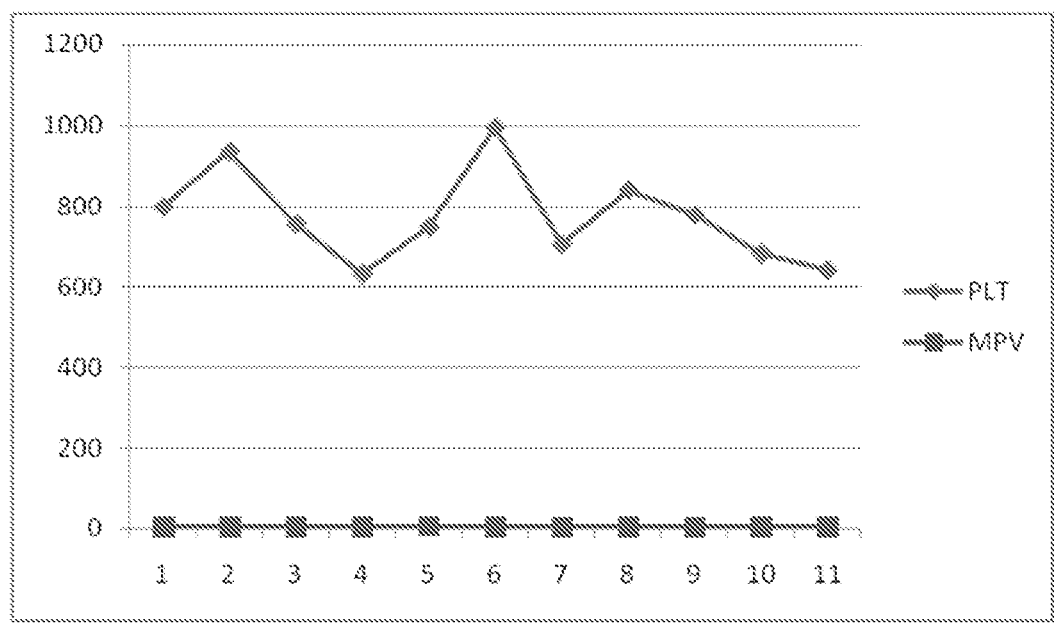

PIF's protection against lethal radiation has been demonstrated (FIG. 1A). Mice (C57BL/6, n=36) were treated with low-dose PIF (0.75 mg/kg) or high-dose PIF (1.25 mg/kg) 2×/day for 14 days starting 2 hours after lethal 8 Gy irradiation. Such an exposure led to 100% survival 2 weeks after stopping therapy. In contrast, control mice (n=14 males; 7 females) that received radiation and (PBS, vehicle), but no PIF treatment, developed ARS and died by day 23 (0% survival). FIG. 1B shows that the global WBC count was preserved at day 0 compared with day 9 in both PIF-treated groups as compared with the control group, which by day 12 already had a very low global WBC count. FIG. 1C shows data from female mice (n=9, similar results in males) that were treated with PIF 0.75 mg/kg 2×/day (low, high dose: 0.75 mg/kg) for 14 days starting 2 hours after 8 Gy radiation exposure. The top panel shows the immune phenotype measured at 0-19 days. The second panel shows the same immune profile expressed as % of total. The third panel shows detailed red blood cell indices (blood count, hemoglobin, hematocrit, and volume of RBCs. The bottom panel has the platelet counts and volume. FIGS. 1D and 1E show that in the PIF-treated groups, immune phenotype, RBC, and platelet count were preserved when measured until day 29-two weeks after stopping PIF administration.

Figure 2A:
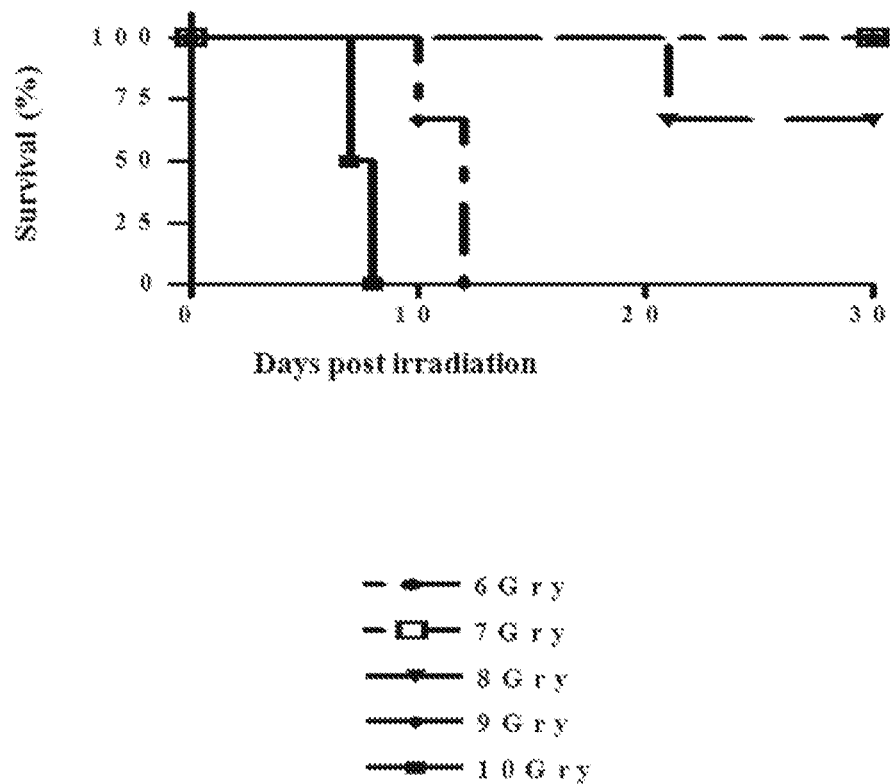
FIG. 2A illustrates the survival curve after irradiation. Mice underwent a variety of doses of total body irradiation. The survival rate was monitored for 30 days post-irradiation. At 6-7 Gy, all mice survived for 30 days.
Figure 2B:
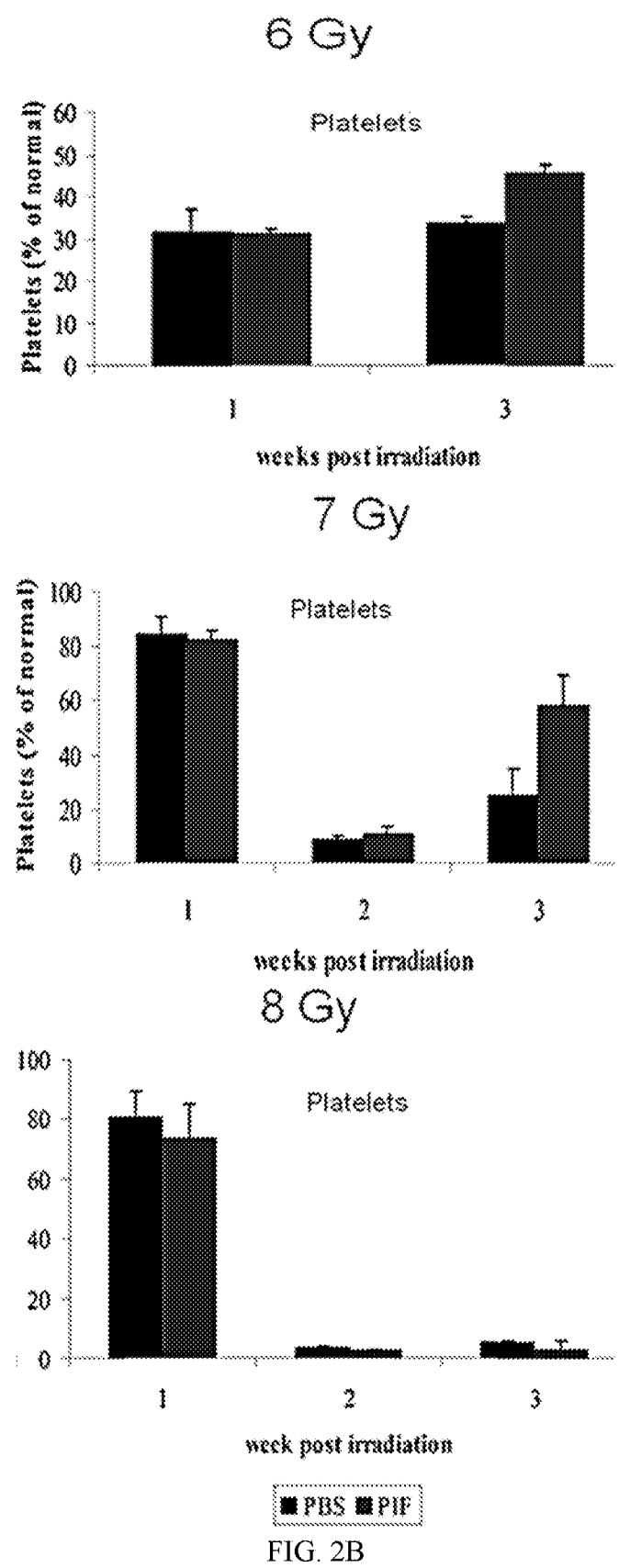
FIG. 2B illustrates that PIF improves platelet count following sub-lethal irradiation. Following exposure to 6 Gy-8 Gy irradiation doses, 24-hour continuous treatment with PIF was initiated for 2 weeks, followed by 1-week post-therapy. The effect of the PIF treatment was compared to a PBS control. Platelet count was determined, and is shown for 6 Gy, 7 Gy, and 8 Gy irradiation.

Example 2 sPIF effect of irradiation on C57BL/6 mice survival: dose-finding experiments: The C57BL/6 mice used in this study are a relatively radio-resistant strain. First, the radiation intensity required for our experiments by evaluating the survival curve in mice exposed to various doses of total body irradiation (6-10 Gry) was determined (FIG. 2). All mice (n=10) survived 30 days after exposure to 6 Gry while all mice (n=10) died within 30 days after exposure to 10 Gry. B. showed that PIF improves platelet count following 7 Gy exposure. Therefore, 6 Gry was defined as sub-lethal dose to determine sPIF's effect on the hematologic profile, cytokine expression and gene expression and 10 Gry as lethal dose for BM transplantation studies. In addition, since PIF was tested for the first time in an ARS setting, the following studies were carried out by using sPIF as sole therapy and without the traditional use of antibiotics which has an important role in infection prevention post-radiation. As such, specific mechanisms involved in sPIF action could be clearly dissected.

Figure 3A:
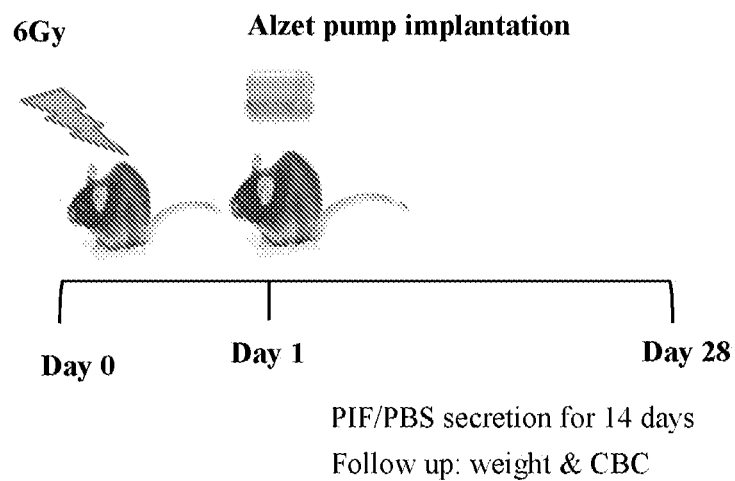
FIGS. 3A to 3D illustrate that PIF enhances hematologic recovery after sub-lethal irradiation. Mice were irradiated with a 6 Gy dose. 1 mg/kg/day of either PIF or PBS was administered continuously for two weeks starting 24 h after irradiation. The protocol of the experiment is described in FIG. 3A. Follow-up of WBC reconstitution of the irradiated mice is shown in FIG. 3B. WBC count 2 and 4 weeks after irradiation is shown in FIG. 3C. The percentages of lymphocytes and granulocytes 4 weeks post-irradiation are shown in FIG. 3D. Results represent 2-3 independent experiments. *$P<0.05$, **$P<0.01$.
Figure 3B:
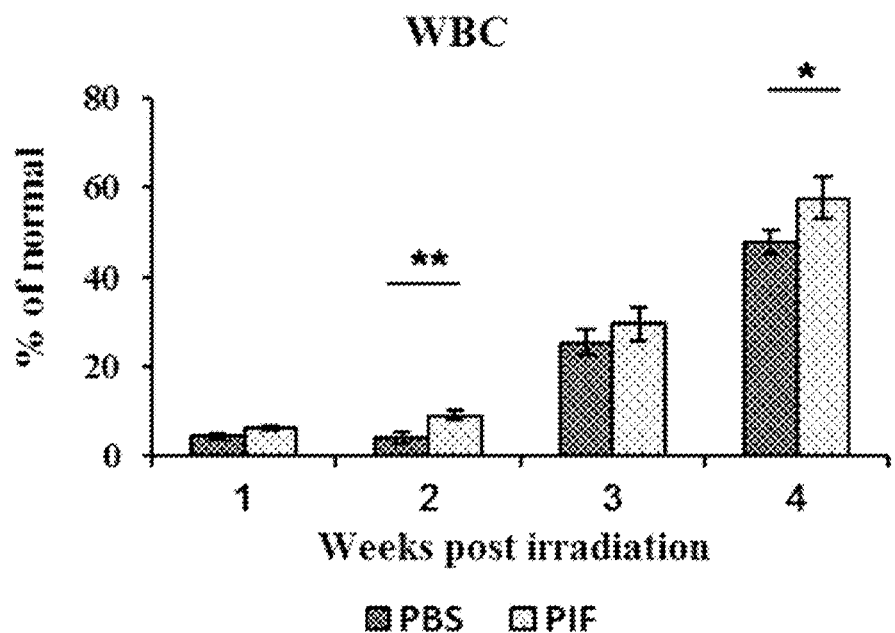
Figure 3C:
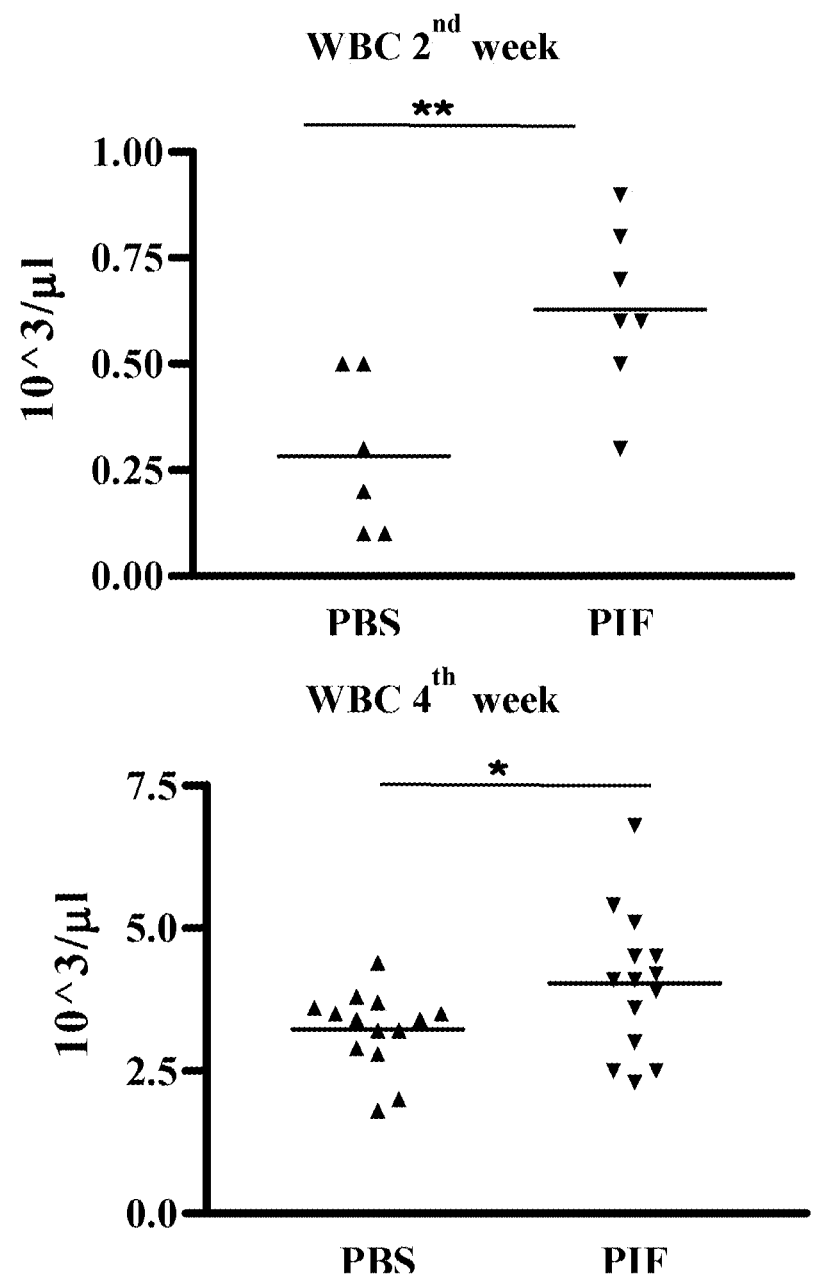
Figure 3D:
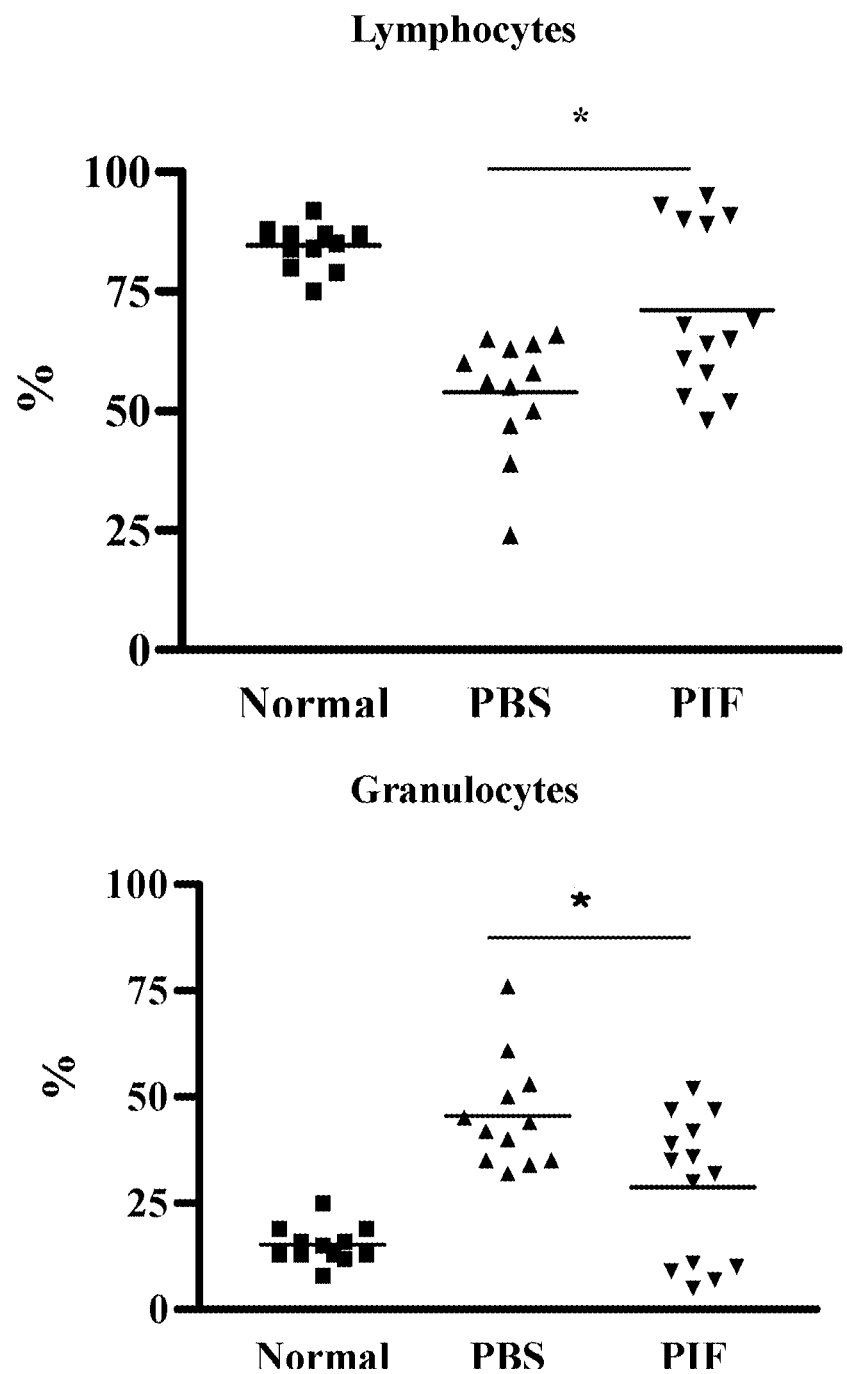

Example 3 sPIF promotes hematologic recovery after sub-lethal irradiation for long-term Post-therapy: The consequence of sub-lethal irradiation is long-term hematopoietic suppression associated with a slow recovery. sPIF's ability to restore WBC profile was determined (FIG. 3A). Early sPIF administration (1 mg/kg/day for 2 weeks) 24 hrs. after 6 Gry irradiation led to rapid recovery and significantly improved reconstitution of total circulating WBC as compared with PBS control (FIG. 3B). This was already evident at 2 weeks after irradiation when WBC have reached a mean value of 600 cells/μl in the sPIF treated group as compared with 250 cells/μl in PBS treated group. Such a level of 600 WBC/μl indicates that these mice were less immuno-compromised already at this time point. Notably, the protective effect of sPIF expanded beyond the 2-week treatment with significant differences observed also at 4 weeks after irradiation 2 weeks post-therapy at the time of sacrifice (FIG. 3C). Moreover, 2 weeks post-administration, sPIF increased the lymphocyte count while reducing circulating granulocytes percentage closely to levels observed in normal untreated group (control) (FIG. 3D). In contrast, in the sham PBS-treated group, lymphocyte count was lower and granulocyte count increased significantly as compared with the sPIF-treated group. The reduction in neutrophil count—an inflammatory response associated with the increase in lymphocytes found in an adaptive immune response reflects a beneficial restored immune profile to that seen in normal mice. This is especially relevant since long-term the lymphocyte population is affected following radiation leading to high vulnerability to infection. These results demonstrate sPIF effectiveness in restoring systemic immune cells profile post-sub-lethal radiation long-term.

Example 4

Figure 4A:
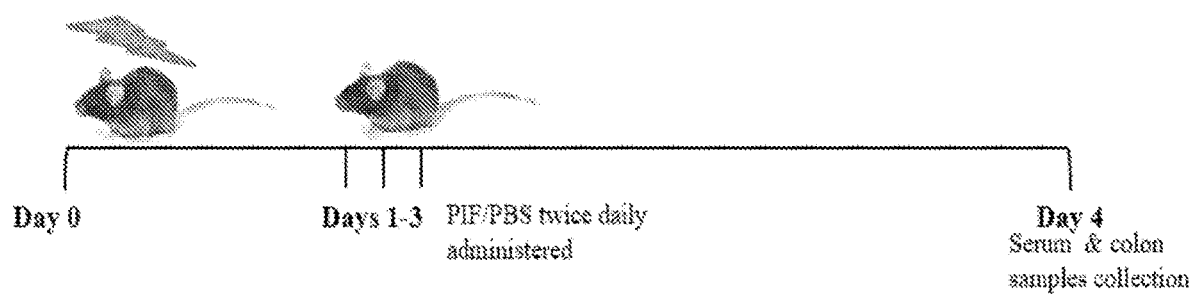
FIGS. 4A to 4E illustrate that PIF reduces inflammation and enhances B7H1 expression after sub-lethal irradiation. Mice were irradiated with either 6 Gy or 7 Gy doses. 0.75 mg/kg of either PIF or PBS was administered subcutaneously twice a day for three days, starting 24 h after irradiation. The protocol of the experiment is described in FIG. 4A. Levels of IL-1a and IL-2 in the serum of experimental mice were measured by FlowCytomix Multiplex kit for the 6 Gy and 7 Gy groups. The results are shown in FIGS. 4B and 4C, respectively. qPCR analyses of iNOS and B7H1 mRNA expression in the colon were performed. The results are shown in FIGS. 4D and 4E, respectively. Results represent 2 independent experiments. *$P<0.05$, $P<0.01$
Figure 4B:
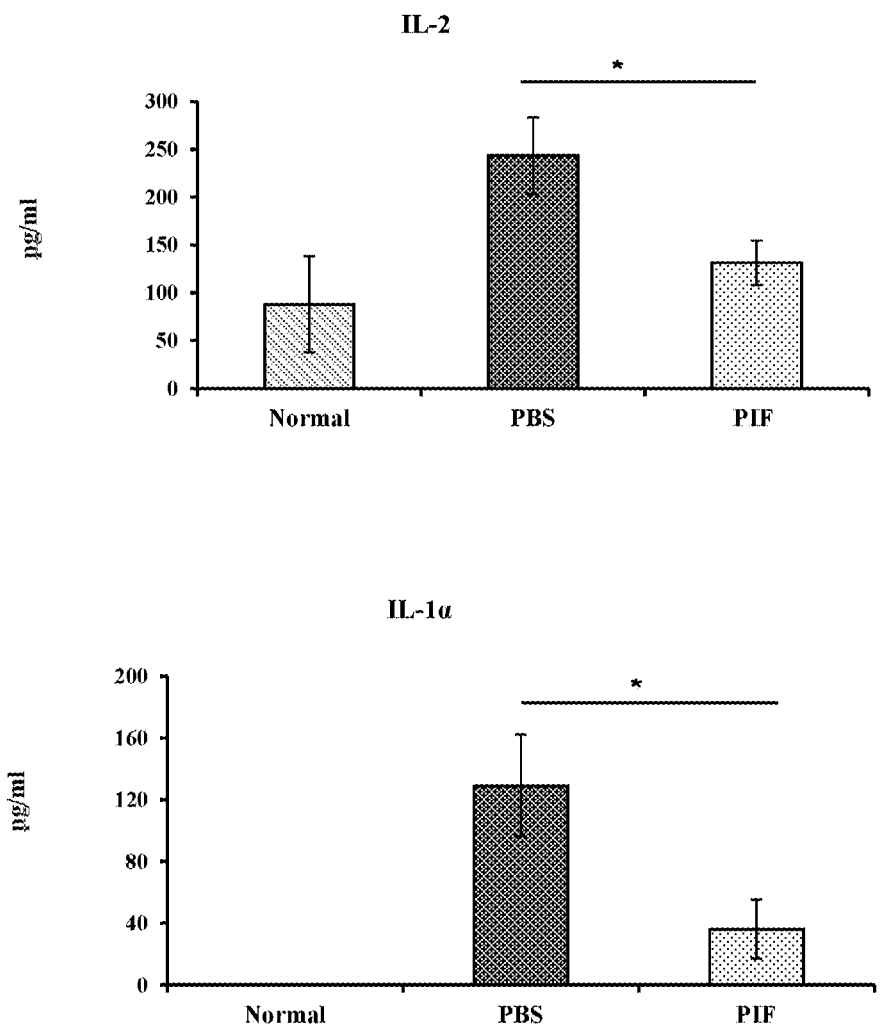
Figure 4C:
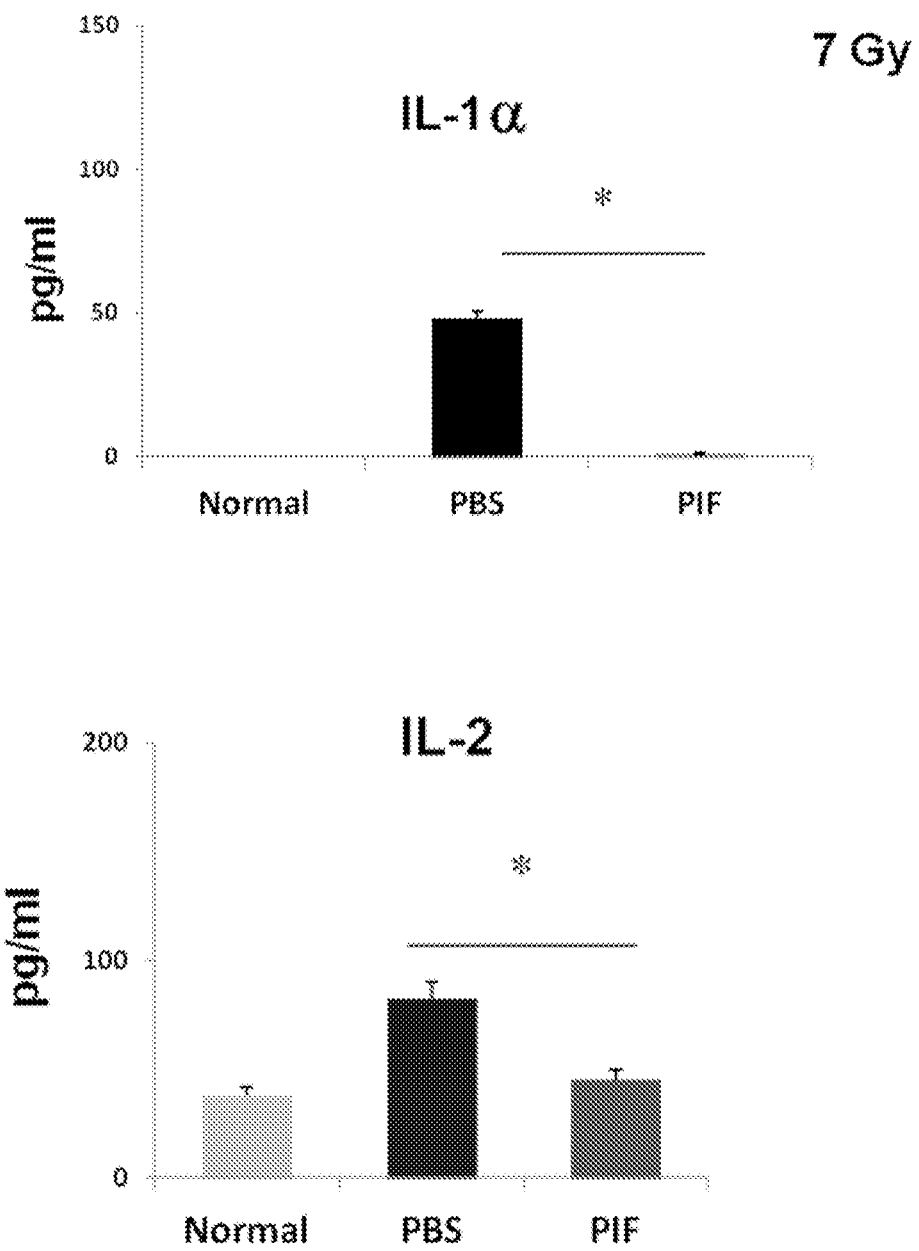
Figure 4D:
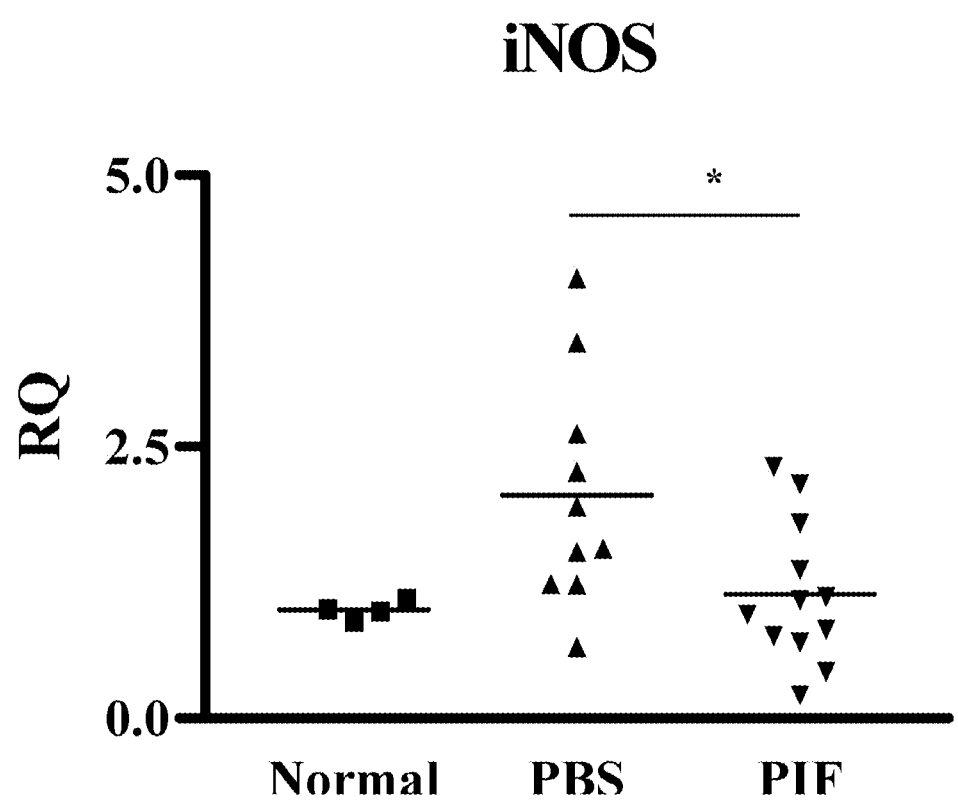
Figure 4E:
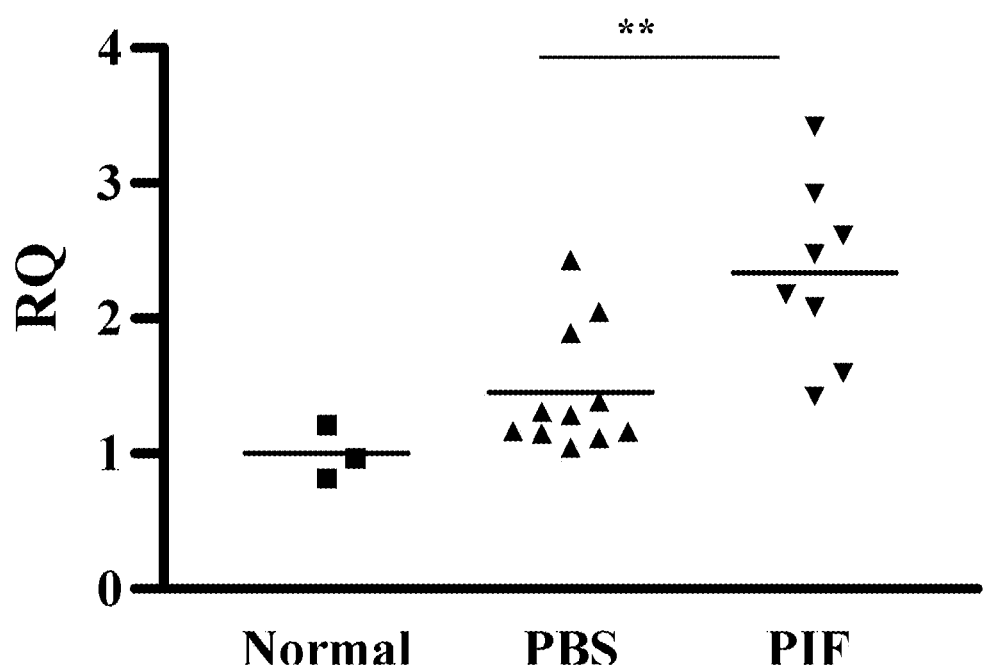

Short-term sPIF reduces systemic pro-inflammatory cytokines level post sublethal irradiation: A systemic inflammatory response rapidly follows ionizing radiation. Therefore, the effect of sPIF starting at 24 hrs. post-6 or 7 Gy irradiation and administered for only 3 days was examined. (FIG. 4A) sPIF led to a significant reduction in prime pro-inflammatory cytokines IL-2 and IL1 a circulating levels as compared with PBS. (FIGS. 4B and 4C). In addition, when compared with levels in normal mice no differences in either cytokine levels were noted. The effect on other cytokines was not significant. These results imply that the sPIF-induced reduction in the systemic inflammatory milieu early on post-radiation plays an important role in the protection against ARS development.

Figure 5A:
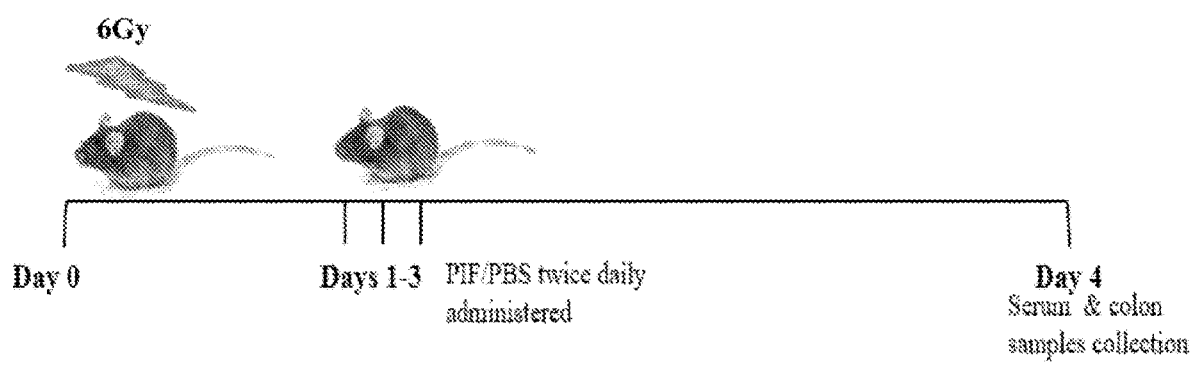
FIG. 5A shows a sketch of the experiment.
Figure 5B:
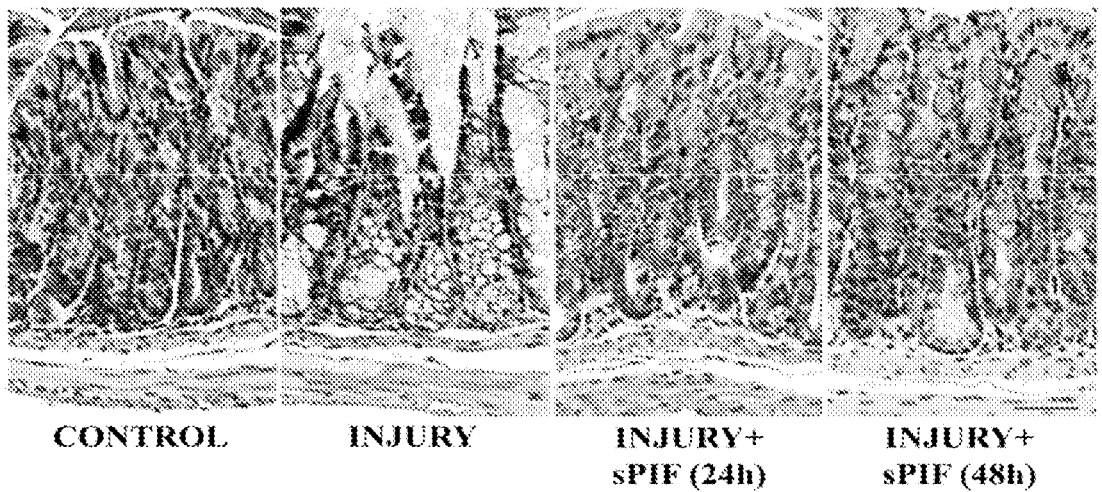
FIG. 5B illustrates that the effect of sPIF was tested on colon crypt histology comparing the effect of sPIF initiated at 24 and 48 hours post-sub-lethal 6 Gry irradiation and gene expression (macro).
Figure 5C:
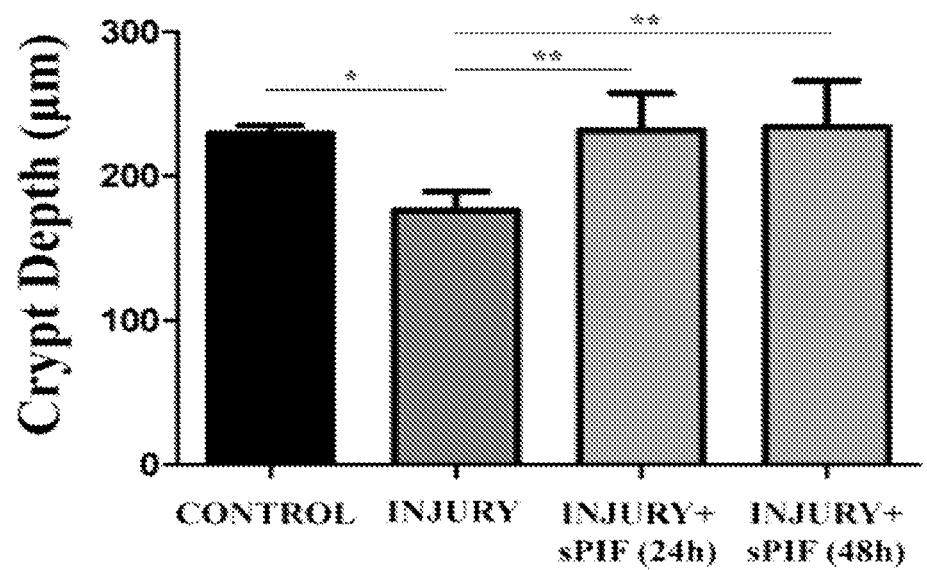
FIG. 5C illustrates pictographs of sPIF's effect as compared with PBS and normal mice.

Example 5 sPIF local and systemic protection: promotes colon crypts recovery post-sub-lethal radiation: ARS rapidly leads to GI inflammation and injury and sPIF improves GI tract ulcers and liver inflammation in a harsh murine GVHD model post-lethal irradiation long-term. The above experiments substantiated both in vivo and in vitro that sPIF is protective in reducing systemic inflammatory mediators leading to long-term recovery. However, whether PIF's effect is also local, targets an organ the colon that has a high cellular turn-over, and which is frequently affected by ARS is not known. Short-term sPIF injections for 2 or 3 days post-sub-lethal radiation (6 Gry) starting treatment at 24 or 48 hrs. post-radiation protects against colon inflammation, as illustrated in FIG. 5A. The model used shows that sPIF significantly reduced colon inflammation restoring colon crypts morphology (FIGS. 5B and 5C). Remarkably the protective effect was also observed when the sPIF treatment has started only at 48 hrs. post-irradiation. D. Shows that PIF crypt recovery is similar to that of normal mice. E. PIF reduces iNOS-oxidative stress gene while promoting B7H1 protective gene in the colon (RTPCR). The effect was noted when PIF treatment started at 48 h hours post-therapy. This supports the view that sPIF exerts an integrated both systemic (hematopoietic, cytokines) and local protection.

Figure 5D:
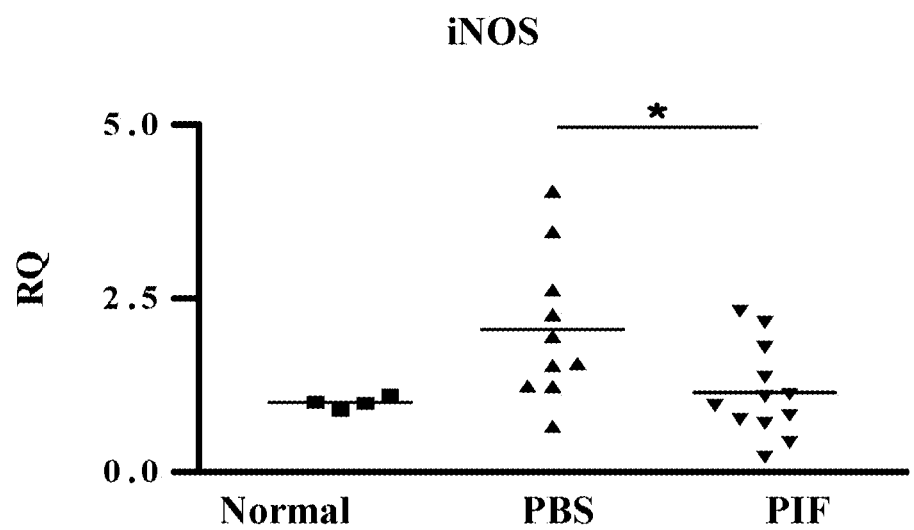
FIG. 5D statistical analysis demonstrates PIF reverses colon injury with no differences with normal mice.
Figure 10:
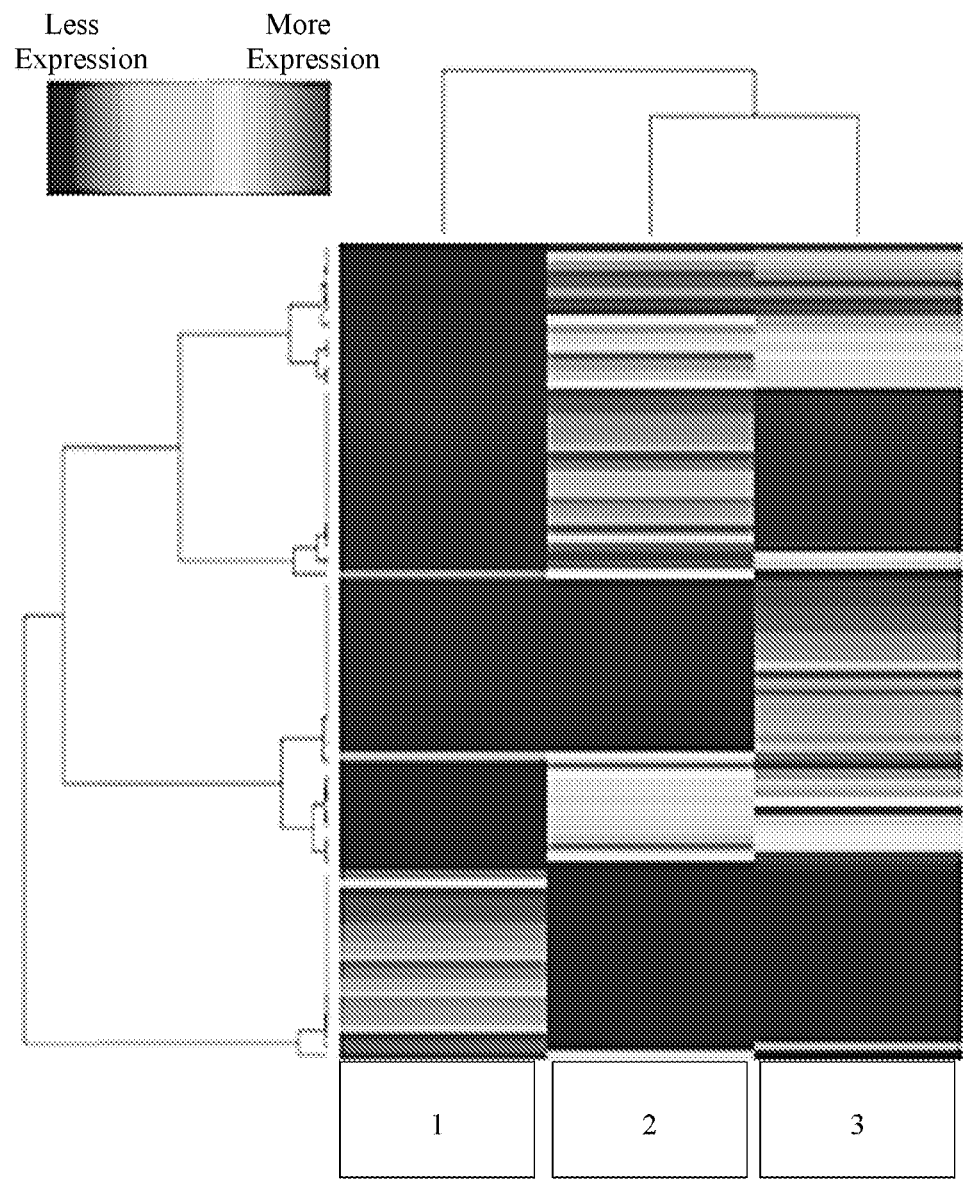
FIG. 10 illustrates a heat map and cluster analysis of the global colon genome. Dark grey represents a relative decrease in expression as compared to the pair of treatments or conditions. Lighter grey represents an increase in expression as compared to the treatment of condition. Column 1 illustrates a heat map of gene expression comparing expression of genes in the presence of radiation+sPIF versus treatment with radiation alone. Column 2 depicts the comparative analysis of relative amount of gene expression from negative control (PBS) animals versus those animals treated with radiation. Column 3 depicts the relative gene expression changes caused by radiation with sPIF as compared to those mice untreated. Several pathways were affected. The genes most affected by sPIF and were genes associated with mitochondrial function, genes associated with response to stress and genes associated with protein-RNA interactions.

Example 6 sPIF promotes colon recovery by reducing oxidative stress, modulating mitochondrial function, immune response. The above data indicated that sPIF has a dual local and systemic effect both reducing the damaging effect of radiation restoring colon architecture while reducing the systemic pro-inflammatory immune response enabling long-term hematopoiesis. Therefore, using both RT PCR (FIGS. 5D and 5E) effect on NOS2, and B7H1 and global genome analysis (FIG. 10) we focused on examining principally two intercalating items local protection and colon function. sPIF treatment (compared to sub-lethal) resulted in significant modulation of several pathways (FIG. 10). Interestingly these genes mainly cluster in three groups which can globally are involved in immune regulation and apoptotic signaling, intracellular energy transfer, and Protein-RNA interactions required for effective metabolic function. The first two are related to protective effect while the latter are related to repair mechanisms.

Table 6 below details a cluster analysis of the global colon genome. The analysis compared sPIF vs PBS and normal mice. Several pathways were affected. A cluster analysis of major pathways' mitochondrial function, response to stress and protein-RNA interactions was performed. ("Fluor"=Fluorescence Measurement). The gene names correspond to the genes identified in the Illumina MouseRef-8 array Instructions booklet (BD-202-0202, Illumina, USA), which is herein incorporated by reference in its entirety. In brief, following sub-lethal radiation (6 Gry) at 24 hrs. sPIF injection twice daily for 72 hrs. were administered. The effect of sPIF following radiation was compared with PBS treated control. Normal mice without irradiation served as an additional control. Following sacrifice 30 mg of colon tissue (N=7 for PIF and PBS and N=3 for normal mice) was excised and homogenized in a Fastprep 120 tissue homogenizer (30 s at 4.0 m/sec) in cell lysis buffer (Qiagen, Hombrechtikon, Switzerland). Total RNAs were extracted from cells using PureLink RNA Mini Kit (Ambion, catalog number 12183018A). Total RNA (250 ng) was amplified into cRNA using TotalPrep RNA amplification kit (AMIL1791, Ambion) following manufacture's instruction. After amplification, 1.5 μg of cRNA was mixed with the hybridization controls and it was hybridized to MouseRef-8 array (BD-202-0202, Illumina, USA). The array was hybridized for 16 hrs. in a hybridization oven with a rocking platform at 58° C. The array chip then went through a series of washes before it was stained with streptavidin-Cy3. After the staining, it went through a final wash and drying. The array was scanned using the Illumina HiScan Scanner.

TABLE 6

| Gene name | Raw Fluor. Value | Ratio of increase in expression | Normalized increase in expression level as compared to absence of PIF | | Gene name | Raw Fluor. Value | Ratio of decrease in expression | Normalized decrease in expression level as compared to absence of PIF |
|---|---|---|---|---|---|---|---|---|
| Cfd | 11537 | 0.858 | 1.57E-001 | 9.67E-001 | Fabp6 | 16204 | -3.060 | 3.83E-002 |
| Olfm4 | 380924 | 0.799 | 1.00E-001 | 9.67E-001 | LOC 100046120 | NA | -1.054 | 3.58E-002 |
| Lyzl | 17110 | 0.733 | 3.20E-001 | 9.67E-001 | Tmem117 | 320709 | -0.788 | 2.03E-001 |
| Scdl | 20249 | 0.730 | 1.21E-001 | 9.67E-001 | Serpinalb | 20701 | -0.721 | 1.35E-001 |
| Rnase1 | 19752 | 0.715 | 8.96E-002 | 9.67E-001 | Prss7 | 19146 | -0.681 | 2.68E-001 |
| Adhl | 11522 | 0.714 | 3.37E-001 | 9.67E-001 | Fam151a | 230579 | -0.627 | 1.58E-001 |
| Regl | 19692 | 0.679 | 6.32E-001 | 9.75E-001 | Pcsk9 | 100102 | -0.610 | 5.22E-002 |
| Cyp3a11 | 13112 | 0.654 | 2.30E-001 | 9.67E-001 | Cfl2 | 12632 | -0.587 | 3.51E-001 |
| Casp6 | 12368 | 0.647 | 1.20E-001 | 9.67E-001 | Mfge8 | 17304 | -0.579 | 4.13E-002 |
| Cc15 | 20304 | 0.647 | 8.73E-004 | 9.67E-001 | Cc121a | 18829 | -0.576 | 1.35E-001 |
| Acaa2 | 52538 | 0.618 | 1.39E-001 | 9.67E-001 | Slc5a6 | 330064 | -0.557 | 7.03E-002 |
| Rps3 | 27050 | 0.610 | 2.19E-001 | 9.67E-001 | Xpnpep2 | 170745 | -0.555 | 1.17E-001 |
| Khk | 16548 | 0.600 | 4.04E-002 | 9.67E-001 | Ddahl | 69219 | -0.554 | 2.67E-001 |
| Mb12 | 17195 | 0.595 | 2.21E-002 | 9.67E-001 | Cxcl13 | 55985 | -0.535 | 4.91E-002 |
| Atp5f1 | 11950 | 0.586 | 1.52E-001 | 9.67E-001 | Mfge8 | 17304 | -0.506 | 9.26E-002 |
| Scyel | 13722 | 0.574 | 1.82E-002 | 9.67E-001 | Gm766 | 330440 | -0.502 | 3.75E-001 |
| Sep15 | 93684 | 0.551 | 1.79E-001 | 9.67E-001 | Serpina 1b | 20701 | -0.497 | 1.07E-001 |
| Ppplca | 19045 | 0.549 | 2.28E-001 | 9.67E-001 | Osta | 106407 | -0.491 | 5.77E-002 |
| Cox7a21 | 20463 | 0.539 | 5.23E-002 | 9.67E-001 | Panxl | 55991 | -0.490 | 4.65E-003 |
| C1ca6 | 99663 | 0.527 | 1.26E-002 | 9.67E-001 | Zmiz 1 | 328365 | -0.488 | 2.21E-002 |
| Apoa4 | 11808 | 0.523 | 1.50E-001 | 9.67E-001 | Aiml | 11630 | -0.480 | 1.18E-002 |
| Calm 2 | 12314 | 0.518 | 4.17E-002 | 9.67E-001 | Serpinald | 20703 | -0.460 | 6.93E-002 |
| Cyp2c65 | 72303 | 0.516 | 1.44E-001 | 9.67E-001 | Apafl | 11783 | -0.459 | 1.51E-002 |
| Hspala | 193740 | 0.510 | 1.21E-001 | 9.67E-001 | Parp14 | 547253 | -0.442 | 6.88E-002 |
| Suclgl | 56451 | 0.509 | 2.09E-001 | 9.67E-001 | Naaladll | 381204 | -0.438 | 3.97E-001 |
| Gsta2 | 14858 | 0.507 | 2.97E-001 | 9.67E-001 | Ccndl | 12443 | -0.431 | 1.52E-001 |
| Adipoq | 11450 | 0.506 | 9.44E-002 | 9.67E-001 | Tap | NA | -0.428 | 1.37E-001 |
| Cyp3a25 | 56388 | 0.502 | 1.69E-001 | 9.67E-001 | BC040758 | 268663 | -0.412 | 1.02E-001 |
| H2afz | 51788 | 0.487 | 1.40E-001 | 9.67E-001 | Ubal | 22201 | -0.412 | 5.03E-002 |
| Arg2 | 11847 | 0.483 | 1.73E-001 | 9.67E-001 | Anpep | 16790 | -0.406 | 6.74E-002 |
| Tubb2b | 73710 | 0.480 | 7.79E-003 | 9.67E-001 | LOC 100040592 | NA | -0.406 | 4.13E-002 |
| H3f3a | 15078 | 0.480 | 1.36E-001 | 9.67E-001 | Coro lc | 23790 | -0.406 | 3.80E-002 |
| Npml | 18148 | 0.477 | 8.07E-002 | 9.67E-001 | Pyy | 217212 | -0.405 | 4.02E-001 |
| Rp17a | 27176 | 0.473 | 1.62E-001 | 9.67E-001 | Cd74 | 16149 | -0.404 | 2.90E-001 |
| Hspa8 | 15481 | 0.472 | 3.60E-001 | 9.67E-001 | Dag 1 | 13138 | -0.403 | 1.49E-002 |
| Rnaset2 | 68195 | 0.472 | 1.13E-001 | 9.67E-001 | Mep la | 17287 | -0.403 | 3.37E-002 |
| EG433923 | 433923 | 0.467 | 1.63E-001 | 9.67E-001 | LOC100041504 | 1E+08 | -0.403 | 1.20E-001 |
| Acta2 | 11475 | 0.463 | 1.38E-001 | 9.67E-001 | Gata5 | 14464 | -0.403 | 1.01E-002 |
| Cyp2b10 | 13088 | 0.462 | 3.82E-001 | 9.67E-001 | Igsf3 | 78908 | -0.399 | 8.49E-002 |
| Cldn4 | 12740 | 0.461 | 8.16E-003 | 9.67E-001 | Sqle | 20775 | -0.397 | 2.23E-001 |
| Cyb5 | 109672 | 0.451 | 1.47E-002 | 9.67E-001 | Myadm | 50918 | -0.390 | 5.39E-002 |
| Cm14 | 68396 | 0.450 | 5.36E-002 | 9.67E-001 | Stat3 | 20848 | -0.385 | 6.65E-002 |
| Tsc22d1 | 21807 | 0.436 | 8.28E-002 | 9.67E-001 | Sec16a | 227648 | -0.385 | 3.59E-002 |
| Pnliprp2 | 18947 | 0.435 | 1.92E-001 | 9.67E-001 | Nr1h4 | 20186 | -0.383 | 1.21E-001 |
| Lgsn | 14661 | 0.434 | 7.15E-002 | 9.67E-001 | Lamb3 | 16780 | -0.382 | 1.68E-002 |
| Cyp2b23 | 243881 | 0.430 | 7.79E-002 | 9.67E-001 | Elf3 | 13710 | -0.381 | 7.89E-002 |
| Ndufc2 | 68197 | 0.430 | 1.11E-001 | 9.67E-001 | Mfi2 | 30060 | -0.381 | 4.70E-002 |
| Immp21 | 93757 | 0.428 | 1.12E-001 | 9.67E-001 | Npc111 | 237636 | -0.379 | 1.81E-001 |
| Sphkl | 20698 | 0.427 | 4.24E-002 | 9.67E-001 | Brd4 | 57261 | -0.376 | 1.08E-001 |
| Ppa2 | 74776 | 0.425 | 1.94E-003 | 9.67E-001 | Iqgap2 | 544963 | -0.375 | 2.07E-002 |
| Sumo2 | 170930 | 0.425 | 1.64E-001 | 9.67E-001 | Dgka | 13139 | -0.373 | 4.27E-002 |
| Rnu6 | 19862 | 0.419 | 1.74E-001 | 9.67E-001 | Dync 1 hl | 13424 | -0.371 | 1.47E-001 |
| Dnajc19 | 67713 | 0.418 | 1.13E-001 | 9.67E-001 | Nucbl | 18220 | -0.371 | 1.47E-002 |
| Mrp153 | 68499 | 0.415 | 1.31E-001 | 9.67E-001 | Reep3 | 28193 | -0.371 | 4.81E-002 |
| Tmem33 | 67878 | 0.413 | 2.35E-001 | 9.67E-001 | Hsd17b4 | 15488 | -0.370 | 1.46E-002 |
| Dnasel | 13419 | 0.409 | 5.11E-002 | 9.67E-001 | Pmt | 18854 | -0.368 | 8.76E-003 |
| Npm3-psi | 108176 | 0.407 | 3.07E-002 | 9.67E-001 | Irfl | 16362 | -0.364 | 3.73E-002 |
| Cbrl | 12408 | 0.405 | 1.88E-001 | 9.67E-001 | Ogdh | 18293 | -0.363 | 1.78E-001 |
| Ifi27 | 76933 | 0.404 | 4.78E-002 | 9.67E-001 | Gdpdl | 66569 | -0.361 | 2.61E-001 |
| Gstol | 14873 | 0.404 | 6.86E-002 | 9.67E-001 | Midn | 59090 | -0.360 | 1.40E-001 |

TABLE 6-continued

| Gene name | Raw Fluor. Value | Ratio of increase in expression | Normalized increase in expression level as compared to absence of PIF | | Gene name | Raw Fluor. Value | Ratio of decrease in expression | Normalized decrease in expression level as compared to absence of PIF |
|---|---|---|---|---|---|---|---|---|
| Alg5 | 66248 | 0.401 | 8.97E-002 | 9.67E-001 | X1r4a | 434794 | -0.359 | 3.30E-002 |
| Tact | 21333 | 0.401 | 3.26E-002 | 9.67E-001 | Psap | 19156 | -0.358 | 6.97E-002 |
| Thap4 | 67026 | 0.400 | 7.65E-003 | 9.67E-001 | Dag 1 | 13138 | -0.354 | 7.77E-003 |
| Sdcbp | 53378 | 0.398 | 2.16E-001 | 9.67E-001 | Hgs | 15239 | -0.354 | 8.72E-002 |
| Hist 1 hl c | 50708 | 0.396 | 1.58E-003 | 9.67E-001 | H2-Ebl | 14969 | -0.353 | 2.47E-001 |
| Lgals6 | 16857 | 0.393 | 4.66E-002 | 9.67E-001 | Slc44a4 | 70129 | -0.351 | 1.50E-001 |
| Rps2 | 16898 | 0.392 | 1.35E-001 | 9.67E-001 | Gplbb | 14724 | -0.350 | 2.10E-001 |
| Fbpl | 14121 | 0.390 | 6.83E-002 | 9.67E-001 | Ribp1 | 81910 | -0.350 | 6.50E-002 |
| Rpl23 | 65019 | 0.384 | 3.29E-002 | 9.67E-001 | Ttyh3 | 78339 | -0.350 | 6.93E-002 |
| Gsta3 | 14859 | 0.384 | 7.46E-002 | 9.67E-001 | Ahnk | 66395 | -0.350 | 1.59E-001 |
| Mbnl2 | 105559 | 0.383 | 2.89E-003 | 9.67E-001 | Bcl3 | 12051 | -0.345 | 1.32E-002 |
| Nme2 | 18103 | 0.377 | 4.00E-002 | 9.67E-001 | H2-DMa | 14998 | -0.344 | 2.82E-001 |
| EG434858 | 434858 | 0.376 | 2.46E-001 | 9.67E-001 | Ceacam20 | 71601 | -0.344 | 1.70E-001 |
| Eef2 | 13629 | 0.375 | 3.22E-001 | 9.67E-001 | Mfsd7c | 217721 | -0.342 | 2.23E-001 |
| Hintl | 15254 | 0.374 | 1.38E-001 | 9.67E-001 | Sema4b | 20352 | -0.342 | 9.11E-002 |
| Chptl | 212862 | 0.373 | 1.01E-001 | 9.67E-001 | Preb | 50907 | -0.341 | 8.95E-003 |
| Naca | 17938 | 0.372 | 1.95E-001 | 9.67E-001 | Smap2 | 69780 | -0.340 | 2.16E-002 |
| Hist1h2bf | 319180 | 0.370 | 1.09E-001 | 9.67E-001 | Sema4a | 20351 | -0.339 | 6.92E-002 |
| Gpx4 | 625249 | 0.370 | 9.91E-002 | 9.67E-001 | Cyp2s1 | 74134 | -0.339 | 1.28E-001 |
| BatS | 193742 | 0.369 | 1.96E-002 | 9.67E-001 | Kcnk6 | 52150 | -0.338 | 1.65E-001 |
| Gsdmdcl | 69146 | 0.368 | 1.51E-001 | 9.67E-001 | Plecl | 18810 | -0.338 | 2.68E-001 |
| Hist1h2bh | 319182 | 0.367 | 1.22E-001 | 9.67E-001 | Mall | 228576 | -0.336 | 1.64E-001 |
| Hnrnpa2 b1 | 53379 | 0.366 | 3.04E-001 | 9.67E-001 | Abcd3 | 19299 | -0.335 | 3.94E-002 |
| Cyp2d26 | 76279 | 0.362 | 2.72E-001 | 9.67E-001 | Gapvdl | 66691 | -0.335 | 2.01E-002 |
| Pigp | 56176 | 0.362 | 1.54E-001 | 9.67E-001 | Gbfl | 107338 | -0.333 | 8.55E-002 |
| Hpgd | 15446 | 0.360 | 6.36E-002 | 9.67E-001 | Extl | 14042 | -0.333 | 1.30E-002 |
| Ndufs3 | 68349 | 0.359 | 7.02E-002 | 9.67E-001 | Ggtl | 14598 | -0.332 | 1.70E-002 |
| Lyplal | 18777 | 0.359 | 3.18E-001 | 9.67E-001 | Gptl | 76282 | -0.332 | 8.65E-002 |
| Slc2a2 | 20526 | 0.358 | 1.44E-001 | 9.67E-001 | Tcf712 | 21416 | -0.332 | 6.88E-002 |
| Ada | 11486 | 0.357 | 7.39E-002 | 9.67E-001 | Tmc5 | 74424 | -0.330 | 5.09E-002 |
| Ndufal2 | 66414 | 0.356 | 1.09E-001 | 9.67E-001 | Lmtla, | 231876 | -0.329 | 3.25E-002 |
| Gm1123 | 382097 | 0.356 | 3.79E-001 | 9.67E-001 | Acta 1 | 11459 | -0.328 | 8.55E-002 |
| Fos | 14281 | 0.356 | 1.46E-002 | 9.67E-001 | Slc35c1 | 228368 | -0.327 | 7.77E-002 |
| Sumol | 22218 | 0.356 | 2.03E-001 | 9.67E-001 | Ecel | 230857 | -0.325 | 9.16E-002 |
| Tbrgl | 21376 | 0.355 | 2.44E-001 | 9.67E-001 | Igf2 | 16002 | -0.324 | 4.88E-001 |
| Plekhfl | 72287 | 0.354 | 1.79E-001 | 9.67E-001 | Camk2b | 12323 | -0.321 | 4.02E-002 |
| Rps7 | 20115 | 0.354 | 2.98E-001 | 9.67E-001 | H2-DMbl | 14999 | -0.321 | 2.94E-001 |
| Tbca | 21371 | 0.353 | 3.99E-002 | 9.67E-001 | Zfp710 | 209225 | -0.320 | 4.33E-003 |
| Ufsp2 | 192169 | 0.352 | 2.35E-001 | 9.67E-001 | Neul | 18010 | -0.320 | 2.52E-001 |
| Prdx5 | 54683 | 0.350 | 4.48E-003 | 9.67E-001 | Ostb | 330962 | -0.319 | 2.55E-001 |
| Ndufa6 | 67130 | 0.348 | 5.79E-002 | 9.67E-001 | Purb | 19291 | -0.317 | 1.13E-001 |
| Mtch2 | 56428 | 0.348 | 3.69E-001 | 9.67E-001 | Gns | 75612 | -0.317 | 6.64E-002 |
| Arrdc4 | 66412 | 0.347 | 3.73E-002 | 9.67E-001 | Rnasen | 14000 | -0.314 | 1.23E-002 |
| Eif5 | 217869 | 0.346 | 1.89E-001 | 9.67E-001 | B230339M05Rik | 228850 | -0.313 | 4.26E-002 |
| Eif3 s4 | 53356 | 0.346 | 1.51E-001 | 9.67E-001 | Slc9a1 | 20544 | -0.312 | 2.61E-002 |
| Fam109a | 231717 | 0.345 | 1.75E-003 | 9.67E-001 | Tns4 | 217169 | -0.312 | 4.28E-002 |
| Arl6ip5 | 65106 | 0.345 | 6.55E-002 | 9.67E-001 | Nos2 | 18126 | -0.310 | 2.50E-001 |
| Apoc2 | NA | 0.344 | 2.07E-001 | 9.67E-001 | Camta2 | 216874 | -0.309 | 2.55E-001 |
| Tspan3 | 56434 | 0.343 | 2.79E-001 | 9.67E-001 | Gpx2 | 14776 | -0.307 | 6.23E-002 |
| Cc19 | 20308 | 0.342 | 1.71E-001 | 9.67E-001 | Gnal3 | 14674 | -0.307 | 3.80E-002 |
| Psma7 | 26444 | 0.342 | 1.65E-001 | 9.67E-001 | Vcp | 269523 | -0.306 | 1.81E-001 |
| Usel | 67023 | 0.342 | 1.15E-001 | 9.67E-001 | Hipk2 | 15258 | -0.305 | 1.39E-001 |
| Sdhb | 67680 | 0.341 | 1.38E-001 | 9.67E-001 | Xpnpepl | 170750 | -0.305 | 1.34E-001 |
| Cd59a | 12509 | 0.341 | 2.97E-001 | 9.67E-001 | Afl | 17355 | -0.305 | 8.78E-002 |
| Ak2 | 11637 | 0.340 | 2.08E-001 | 9.67E-001 | Adcy8 | 11514 | -0.303 | 1.99E-001 |
| Tmem85 | 68032 | 0.340 | 6.90E-002 | 9.67E-001 | LOC 100048299 | NA | -0.302 | 9.56E-002 |
| Clqbp | 12261 | 0.340 | 1.77E-001 | 9.67E-001 | Abcfl | 224742 | -0.302 | 8.60E-002 |
| Prdx4 | 53381 | 0.338 | 1.84E-001 | 9.67E-001 | Agpat4 | 68262 | -0.299 | 2.01E-001 |
| Hebpl | 15199 | 0.337 | 3.33E-004 | 9.67E-001 | Ctdsp2 | 52468 | -0.297 | 7.91E-002 |
| Ap1s1 | 11769 | 0.336 | 5.98E-002 | 9.67E-001 | C4b | 12268 | -0.296 | 1.06E-001 |
| Nudt19 | 110959 | 0.335 | 2.44E-002 | 9.67E-001 | Lrrcl | 214345 | -0.296 | 1.74E-002 |
| Rdh7 | 54150 | 0.335 | 4.26E-001 | 9.67E-001 | NA | | -0.294 6.10E-002 | 9.67E-001 |
| Adk | 11534 | 0.333 | 1.24E-001 | 9.67E-001 | Chst8 | 68947 | -0.294 | 2.30E-001 |
| Rpl13a | 22121 | 0.333 | 1.18E-001 | 9.67E-001 | Copzl | 56447 | -0.294 | 9.89E-002 |
| Ppp2r5c | 26931 | 0.332 | 1.67E-001 | 9.67E-001 | Clec2d | 93694 | -0.293 | 2.88E-001 |
| Mbnll | 56758 | 0.331 | 3.47E-002 | 9.67E-001 | Dfna5h | 54722 | -0.293 | 4.73E-001 |
| Rheb | 19744 | 0.331 | 7.93E-002 | 9.67E-001 | Kiflb | 16561 | -0.293 | 6.76E-002 |
| Mrp19 | 78523 | 0.330 | 2.14E-001 | 9.67E-001 | Sec63 | 140740 | -0.293 | 2.57E-002 |
| Eif5a | 276770 | 0.330 | 3.72E-001 | 9.67E-001 | Fntb | 110606 | -0.293 | 1.53E-001 |
| Sarlb | 66397 | 0.329 | 2.56E-001 | 9.67E-001 | Capg | 12332 | -0.293 | 1.04E-001 |

TABLE 6-continued

| Gene name | Raw Fluor. Value | Ratio of increase in expression | Normalized increase in expression level as compared to absence of PIF | | Gene name | Raw Fluor. Value | Ratio of decrease in expression | Normalized decrease in expression level as compared to absence of PIF |
|---|---|---|---|---|---|---|---|---|
| Rdh7 | 54150 | 0.326 | 4.55E−001 | 9.67E−001 | Sidt2 | 214597 | −0.293 | 2.15E−001 |
| Indo | 15930 | 0.325 | 1.40E−001 | 9.67E−001 | Mboatl | 218121 | −0.292 | 2.99E−001 |
| Oaslg | 23960 | 0.323 | 2.57E−001 | 9.67E−001 | AI427809 | 381524 | −0.292 | 1.20E−001 |
| Gdel | 56209 | 0.323 | 1.81E−001 | 9.67E−001 | Pcytla | 13026 | −0.291 | 1.69E−002 |
| Atp5c1 | 11949 | 0.320 | 8.74E−002 | 9.67E−001 | Atp6apl | 54411 | −0.290 | 3.13E−002 |
| Idh3g | 15929 | 0.320 | 3.15E−001 | 9.67E−001 | AI451617 | 209387 | −0.289 | 6.12E−002 |
| Atp5l | 27425 | 0.320 | 1.10E−001 | 9.67E−001 | Atp6v0a1 | 11975 | −0.288 | 2.29E−001 |
| H2-Q2 | 15013 | 0.319 | 1.28E−001 | 9.67E−001 | Slco2al | 24059 | −0.288 | 1.22E−001 |
| Seppl | 20363 | 0.319 | 1.47E−001 | 9.67E−001 | Batf2 | 74481 | −0.288 | 1.75E−002 |
| Dcn | 13179 | 0.317 | 1.86E−001 | 9.67E−001 | Dusp6 | 67603 | −0.287 | 2.50E−001 |
| S1c28a2 | 269346 | 0.316 | 6.25E−002 | 9.67E−001 | LOC 100044566 | NA | −0.286 | 7.52E−002 |
| Npm3 | 18150 | 0.315 | 6.24E−003 | 9.67E−001 | Papss2 | 23972 | −0.285 | 3.48E−001 |
| Timm8b | 30057 | 0.315 | 1.54E−001 | 9.67E−001 | Gpd2 | 14571 | −0.285 | 9.42E−002 |
| S100a1 | 20193 | 0.314 | 1.53E−001 | 9.67E−001 | Mapk6 | 50772 | −0.285 | 8.07E−002 |
| Ddit4 | 74747 | 0.313 | 1.42E−001 | 9.67E−001 | Entpd5 | 12499 | −0.284 | 2.76E−002 |
| Tmem49 | 75909 | 0.313 | 3.81E−001 | 9.67E−001 | Sbfl | 77980 | −0.282 | 1.63E−002 |
| Ntanl | 18203 | 0.312 | 6.37E−002 | 9.67E−001 | Dlst | 78920 | −0.282 | 1.09E−001 |
| Cfi | 12630 | 0.312 | 1.27E−001 | 9.67E−001 | Laspl | 16796 | −0.281 | 1.02E−001 |
| Mocs2 | 17434 | 0.312 | 1.11E−001 | 9.67E−001 | Krt20 | 66809 | −0.281 | 3.82E−002 |
| Gstal | 14857 | 0.311 | 4.90E−001 | 9.67E−001 | Ncorl | 20185 | −0.281 | 1.62E−001 |
| Rnase4 | 58809 | 0.310 | 1.90E−001 | 9.67E−001 | Serpina3n | 20716 | −0.279 | 1.40E−001 |
| Tmem77 | 67171 | 0.310 | 2.32E−001 | 9.67E−001 | Gjb3 | 14620 | −0.278 | 1.23E−001 |
| Usp18 | 24110 | 0.309 | 2.43E−001 | 9.67E−001 | Srr | 27364 | −0.278 | 2.91E−002 |
| Atp6v0e | 11974 | 0.308 | 1.71E−001 | 9.67E−001 | Vdr | 22337 | −0.277 | 1.62E−001 |
| Rp1p0 | 11837 | 0.308 | 1.58E−002 | 9.67E−001 | Sppl3 | 74585 | −0.276 | 2.20E−001 |
| Vps29 | 56433 | 0.307 | 1.59E−001 | 9.67E−001 | Sgkl | 20393 | −0.276 | 2.69E−001 |
| Rdh14 | 105014 | 0.306 | 1.27E−001 | 9.67E−001 | Rnf185 | 193670 | −0.276 | 1.08E−001 |
| Meplb | 17288 | 0.304 | 3.36E−001 | 9.67E−001 | Rfxl | 19724 | −0.275 | 7.80E−002 |
| Mrps33 | 14548 | 0.303 | 2.22E−001 | 9.67E−001 | Epb4.111 | 13821 | −0.275 | 9.00E−002 |
| Nipsnap3a | 66536 | 0.303 | 1.30E−001 | 9.67E−001 | Cpxml | 56264 | −0.274 | 9.20E−002 |
| Dnajc15 | 66148 | 0.302 | 2.42E−001 | 9.67E−001 | Sgk2 | 27219 | −0.274 | 1.51E−001 |
| Hint3 | 66847 | 0.301 | 1.51E−001 | 9.67E−001 | Speccll | 74392 | −0.274 | 1.51E−001 |
| Eif3g | 53356 | 0.300 | 2.20E−001 | 9.67E−001 | Tmem50a | 71817 | −0.274 | 6.52E−004 |
| Rps27a | 78294 | 0.300 | 3.28E−001 | 9.67E−001 | Utx | 22289 | −0.273 | 1.87E−001 |
| Akr1 c12 | 622402 | 0.300 | 4.27E−001 | 9.67E−001 | Fam102a | 98952 | −0.272 | 1.79E−001 |
| Spcsl | 69019 | 0.299 | 2.37E−001 | 9.67E−001 | Kctd5 | 69259 | −0.272 | 6.67E−002 |
| Hmgn2 | 15331 | 0.299 | 1.29E−001 | 9.67E−001 | Rtn3 | 20168 | −0.272 | 1.00E−002 |
| Ccl11 | 20292 | 0.299 | 2.69E−001 | 9.67E−001 | Grit | 330914 | −0.271 | 2.24E−001 |
| Tyms | 22171 | 0.298 | 2.79E−001 | 9.67E−001 | Csnkld | 104318 | −0.270 | 2.78E−002 |
| Bpntl | 23827 | 0.297 | 8.58E−002 | 9.67E−001 | HU | 14254 | −0.270 | 1.16E−001 |

Figure 5E:
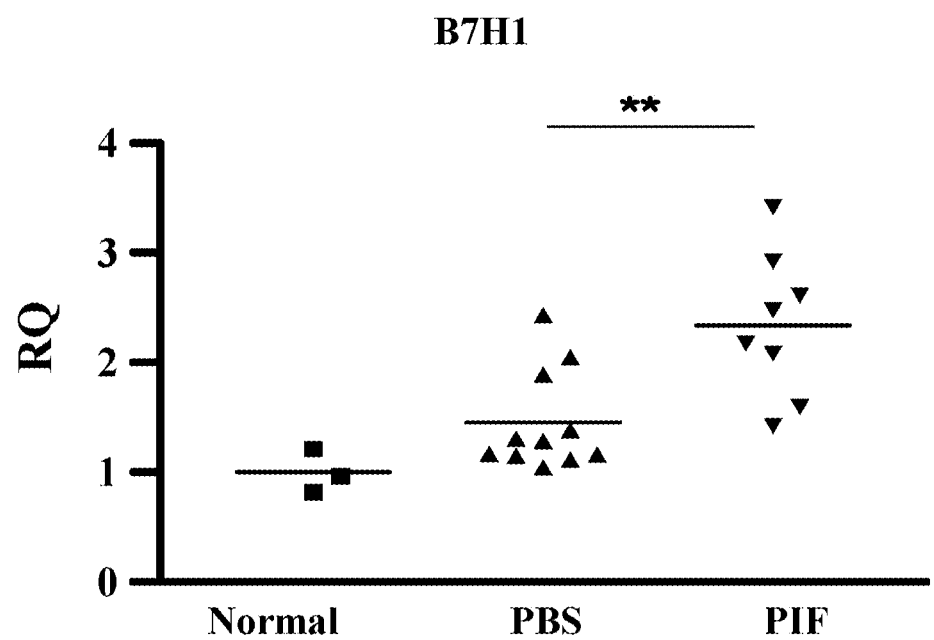
FIG. 5E illustrates qPCR B7H1 expression increased vs. PBS protection by increased B7H1 as compared with normal and PBS as well. Results represent two independent experiments. *$P<0.05$, **$P<0.01$.

Example 7 sPIF prevents colon inflammation, Down-regulates nitric oxide (NOS2), and up-regulates HSPs and B7H1 expression to enable metabolic function: The colon histology (FIG. 5B) indicated that sPIF protects against inflammation by restoring the colon crypts. sPIF plays a major role in protecting against oxidative stress and nitric oxide (NO) formation through eNOS (NOS2) pathways in both liver and in macrophages. sPIF downregulated the NOS2 gene expression in the colon as well (FIG. 5E). By promoting NOSIP gene NO production decreased as NOS1 and NOS3 are translocated to the actin cytoskeleton attenuating theses enzymes' activity. The increased PTS (6-Pyruvoyltetrahydropterin Synthase), DDAH1 and SPR and decreased WASL (Wiscott-Aldrich syndrome) genes further limits NOS2 activity. In addition, NDOFA12 and 6 regulatory mitochondrial membrane respiratory chain NADH dehydrogenases non catalytic subunits expression decreased as well. Beyond the reduced oxidative stress, sPIF also prevents protein misfolding by increasing HSPa1a and HSPA8 genes also known to be targeted by sPIF and is also regulated in vivo. The local colon innate immune system as shown by B7H1 expression is independent of the systemic immunity and B7H1 and was reported as a prime protector against colon inflammation. Remarkably, sPIF promoted B7H1 gene expression as compared with control (FIG. 5E). The increase in B7H1 was higher than in sham, indicating a potent protective response. Significant protection was also noted when sPIF therapy was started only 48 hours post-radiation. The highest expressed gene is CFD, a complement D factor which protects against infection and the consequence of colon damage. This is coupled by the effect of OLFM4 which has an additive antiapoptotic effect. To favor local metabolism the upregulation of SCD1 and CYP3A11 and ATP5fi provide the energy required for such an important task. Among leading genes upregulated was ACAA2, which is involved in fatty acid and selective amino acids metabolism and KHK which is involved in fructose metabolism, among others. Slc5a6 expression, which is involved in solute transport, was also upregulated. This data indicates that sPIF-induced colon protection is associated with enhanced metabolism promoting genes expression.

Figure 6A:
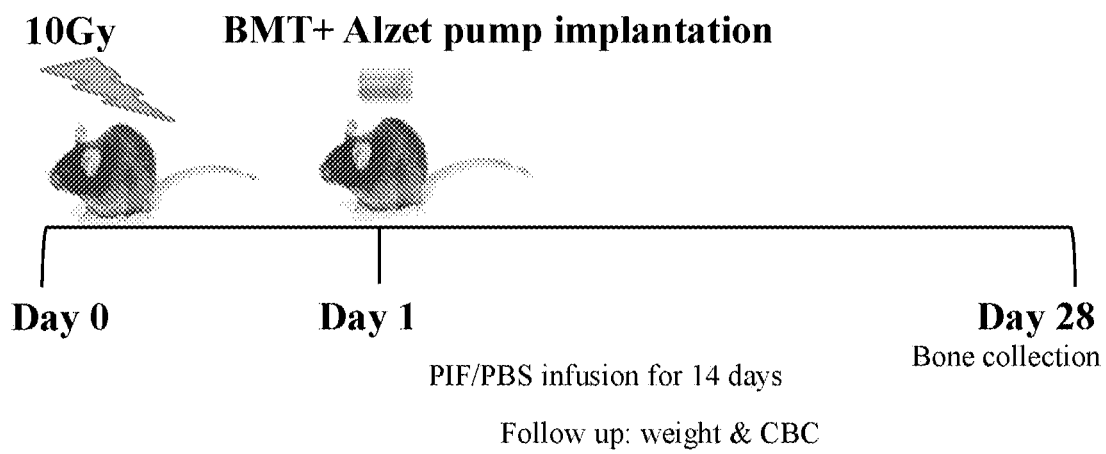
FIGS. 6A to 6D illustrate that PIF improves haematopoiesis after lethal irradiation and semi-allogeneic BMT. Mice were irradiated with a 10 Gy dose, which was followed by a semi-allogeneic BMT. 1 mg/kg/day of either PIF or PBS was administered continuously for two weeks starting 24 h after irradiation. The protocol of the experiments is described in FIG. 6A. The WBC count of each group 3 weeks after irradiation and transplantation is shown in FIG. 6B. The percentages of lymphocytes and granulocytes 3 weeks post-irradiation are shown in FIG. 6C. Histological examination of the femur bone for the cellularity level of the BM in normal, PBS-treated, and PIF-treated mice, as shown in FIGS. 6D, 6E, and 6F, respectively. One representative picture out of 12 mice. The number of fat cells in a 0.75 mm2 section of femur bone marrow is shown in FIG. 6G. Results summarize 2 independent experiments (FIG. 6D). *$P<0.05$, ****$P<0.001$.
Figure 6B:
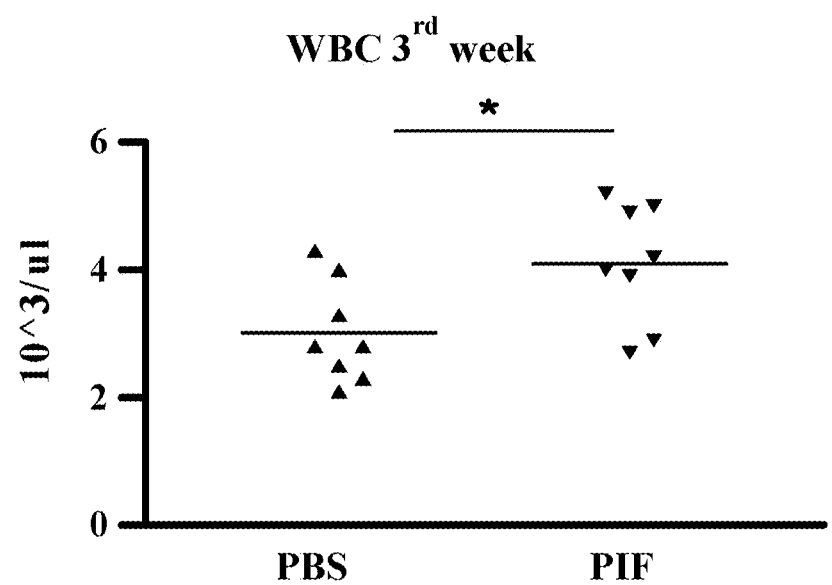
Figure 6C:
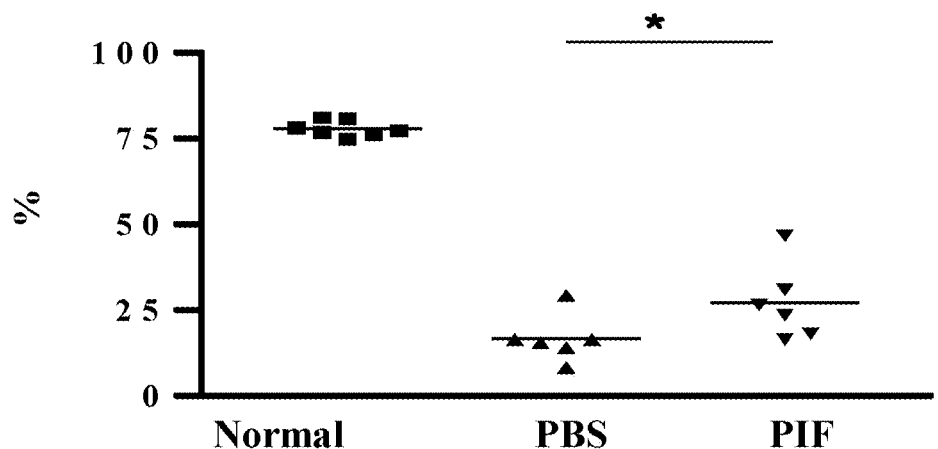
Figure 6C:
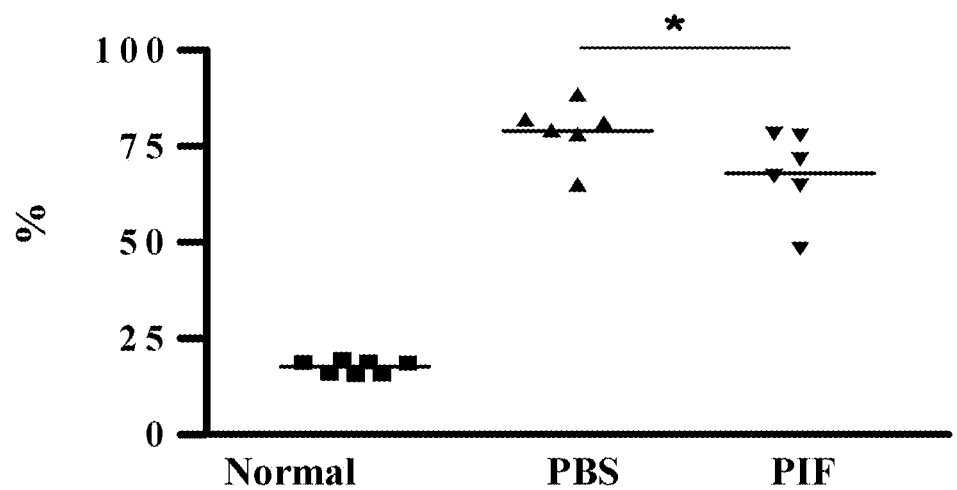
Figure 6D:
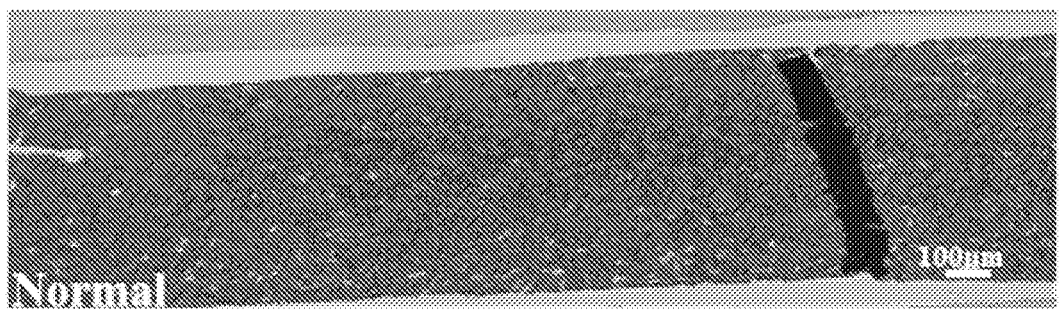
Figure 6D:
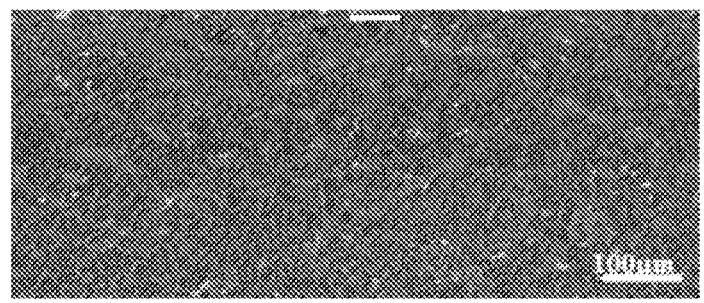
Figure 6E:
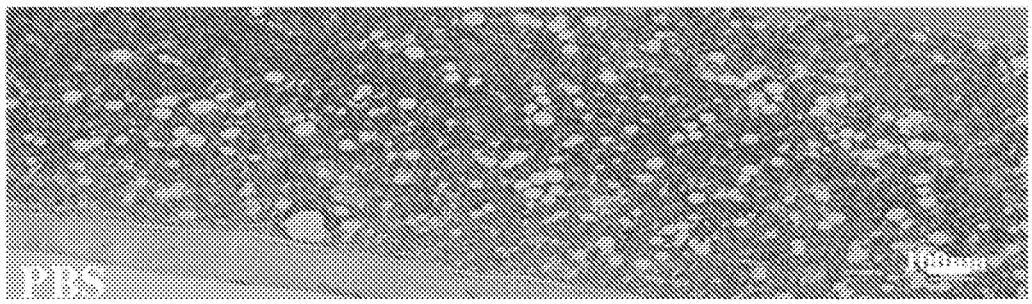
Figure 6E:
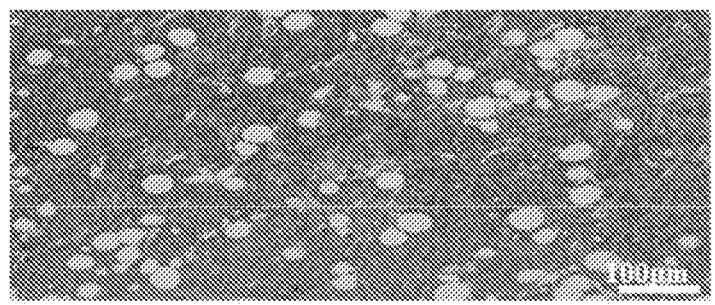
Figure 6F:
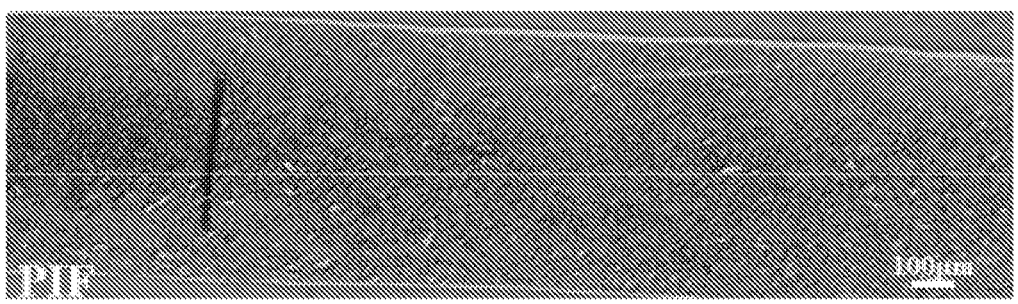
Figure 6F:
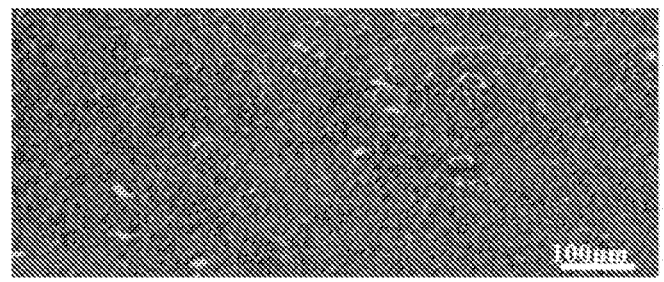
Figure 6G:
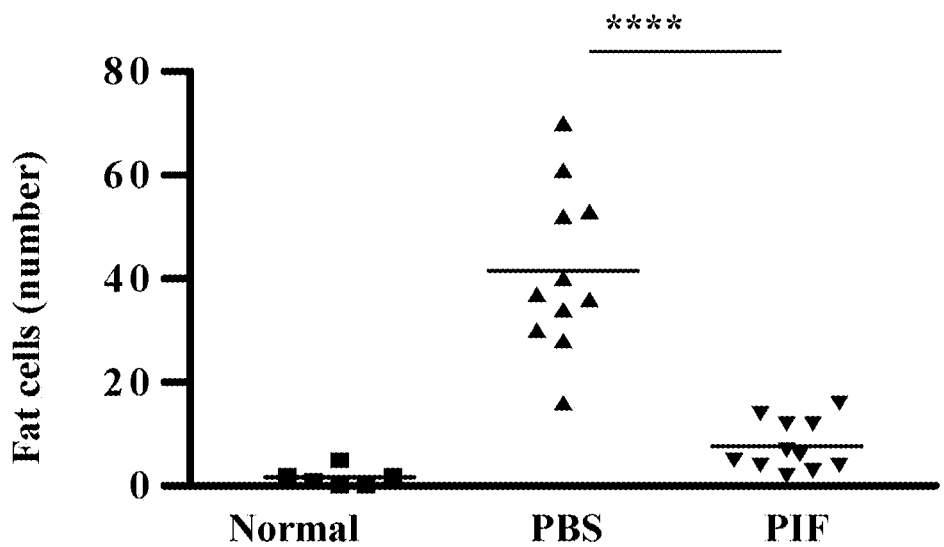

Example 8 sPIF enhances hematopoietic recovery post-lethal irradiation followed by semi-allogeneic BMT: For patients exposed to high (lethal) levels of radiation, hematopoietic stem cell transplantation is routinely considered. Since a donor must be available in a short notice, haploidentical allogeneic transplantation might be the only option. It was therefore decided to evaluate the effect of sPIF on hematologic recovery post-lethal total body irradiation followed by semi-allogeneic BMT, which resembles parent-to-child transplantation. In order to mimic a clinical setting where a graft-versus-host reaction would be generated, F1 (C57BL/6×Balb/c) mice were exposed to 10 Gry total body irradiation followed by intravenous administration of C57BL/6 BM cells the next day. (FIG. 6A) SPIF (1 mg/kg/day) or PBS was administered continuously (0.25 ml/h) starting at 24 hrs. post-irradiation, for two weeks, using Alzet osmotic pumps. The clinical condition and hematologic recovery were followed up to 4 weeks post-irradiation. This experiment aimed in addition to demonstrate whether sPIF prevents a reduction in WBC and/or it is also effective in BM repopulation restoring hematopoiesis. Three weeks post-irradiation following BMT, sPIF significantly increased the recovery of total WBC in the peripheral blood as compared to PBS treated group (FIG. 6B). In addition, sPIF treatment improved the lymphocyte/granulocyte ratio as compared with PBS-treated control mice (FIG. 6C). This WBC ratio was similar to that found following sub-lethal irradiation. To further evaluate the effect of sPIF on hematologic recovery, histological examination of the femur bone was also performed. Significant difference in bone marrow cellularity was observed at 4 weeks post-irradiation and BMT at 2 weeks post-therapy. Representative histological images of the bone marrow from femur bone of normal, PBS and PIF treated mice are presented in FIGS. 6D, 6E, and 6F, respectively. The fat cells number in the femur BM sections of sPIF treated group was significantly lower as compared to PBS control mice (FIG. 6G), indicating improved rehabilitation of the BM cells in the sPIF treated group. Remarkably, the number of fat cells in the sPIF-treated group was similar to that observed in normal mice. Such observations indicate that post-lethal irradiation BMT coupled with PIF can help rapidly restore both circulation as well the bone marrow reservoir.

Example 9

Figure 7A:
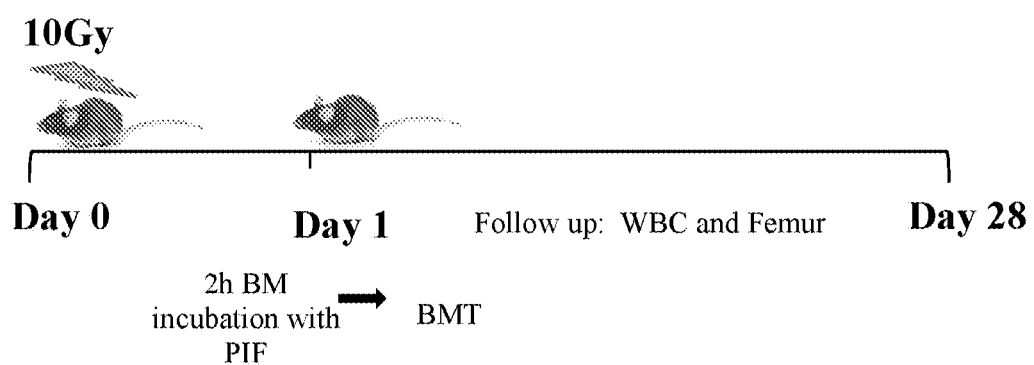
FIGS. 7A to 7G illustrate that BM pre-treated with PIF enhances hematologic recovery after lethal irradiation and allogeneic BMT. Donor BM cells were incubated with PIF for 2 h prior to transplantation. Mice were irradiated with a 10 Gy dose, followed by an allogeneic BMT transplantation with the PIF-pre-treated BM graft. No additional treatments were given to the mice. The protocol of the experiments is described in FIG. 7A. WBC and lymphocyte counts are shown 3 weeks (FIG. 7B) and 4 weeks (FIG. 7C) after irradiation and transplantation. Results represent 3 independent experiments. *P<0.05.

Transplantation of sPIF-pre-treated allogeneic bone marrow enhances hematologic reconstitution after lethal irradiation long term: sPIF regulates immune response. Therefore, whether sPIF has a direct influence on transplanted bone marrow cells improving their engraftment was examined. Or alternatively sPIF leads to hematologic reconstitution only by exerting its immune-regulatory properties on the recipient by promoting BMT engraftment. To address such critical question, donor BM cells (allogeneic) were pre-incubated with sPIF for 2 hrs. in culture and then the cells were washed off prior transplantation. Recipients were lethally irradiated with (10 Gry) and 24 hrs. later transplanted with the pre-conditioned BM graft. No additional treatment was administered. (FIG. 7A).

Figure 7B:
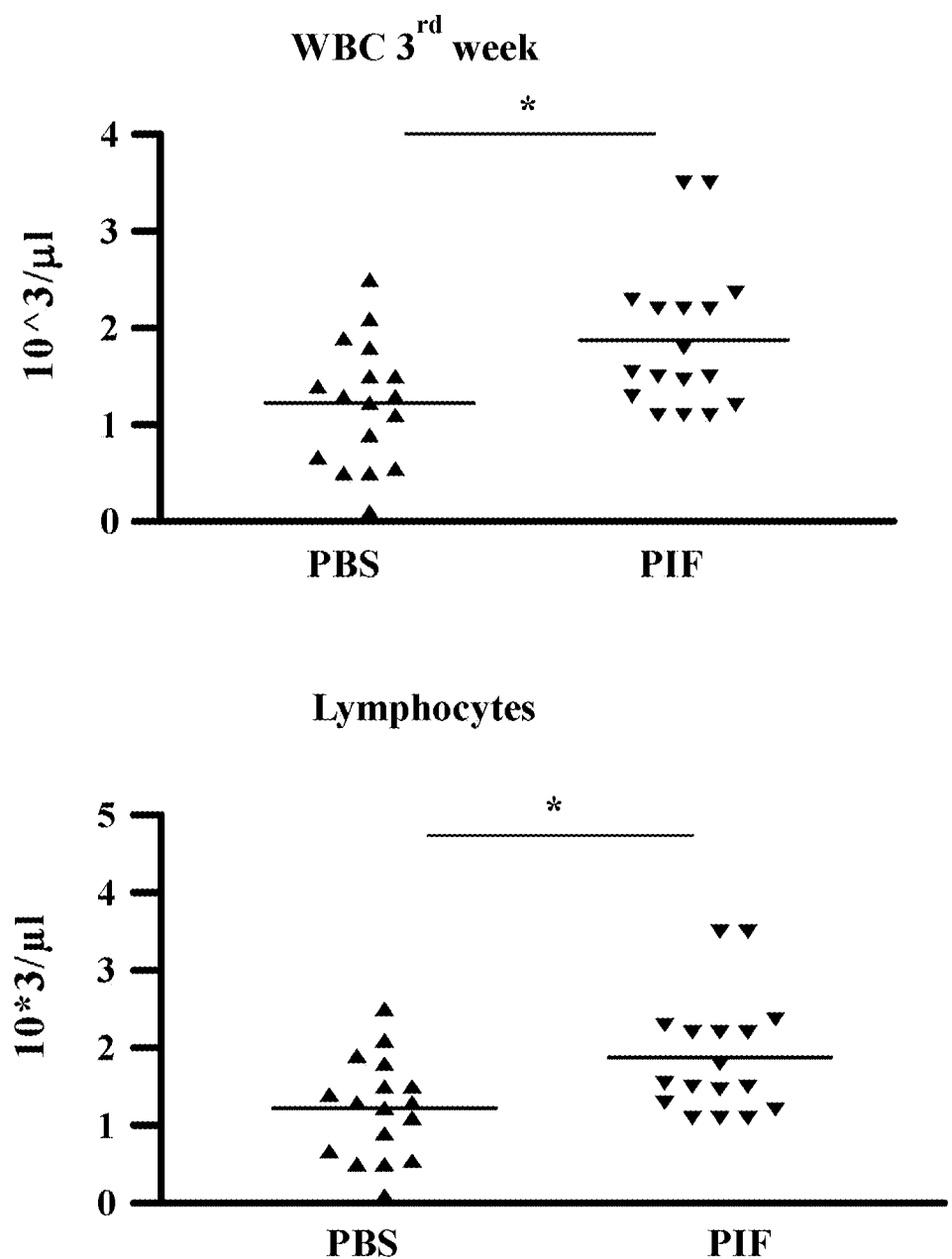
Figure 7C:
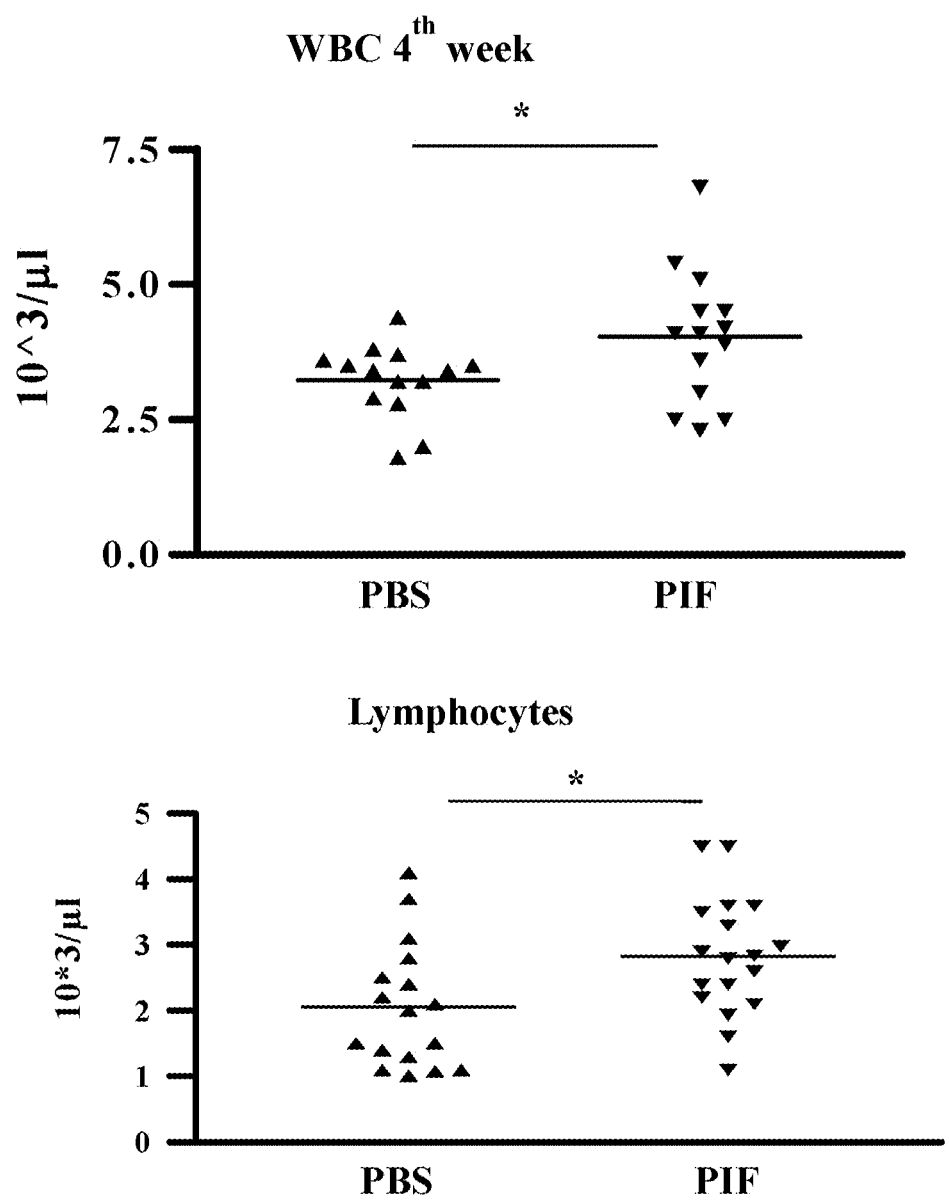
Figure 7D:
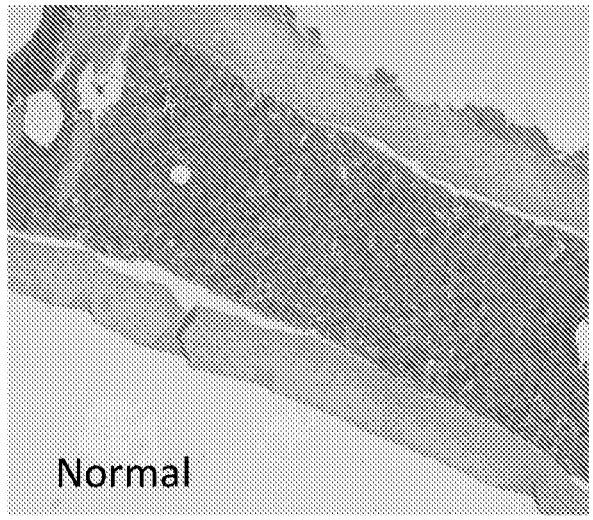
Figure 7E:
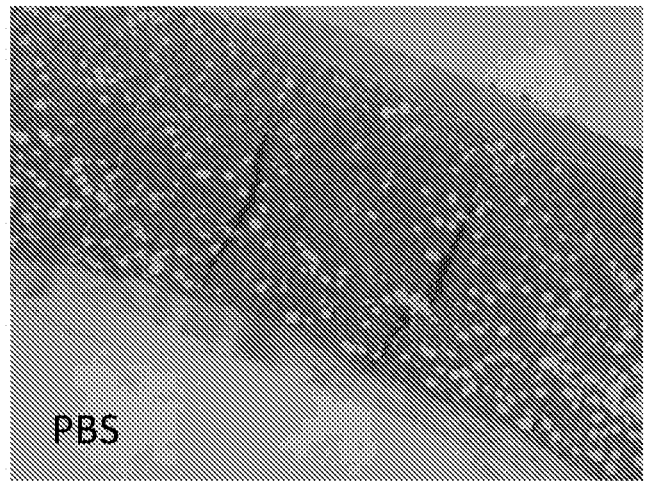
Figure 7F:
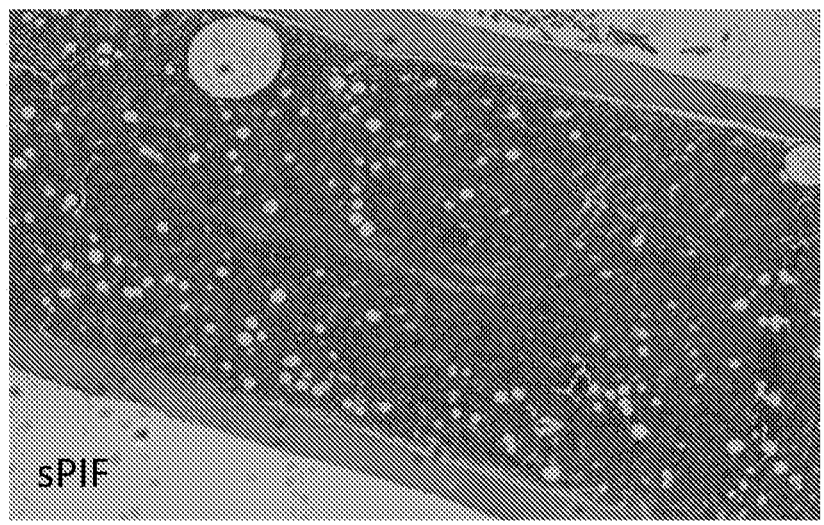
Figure 7G:
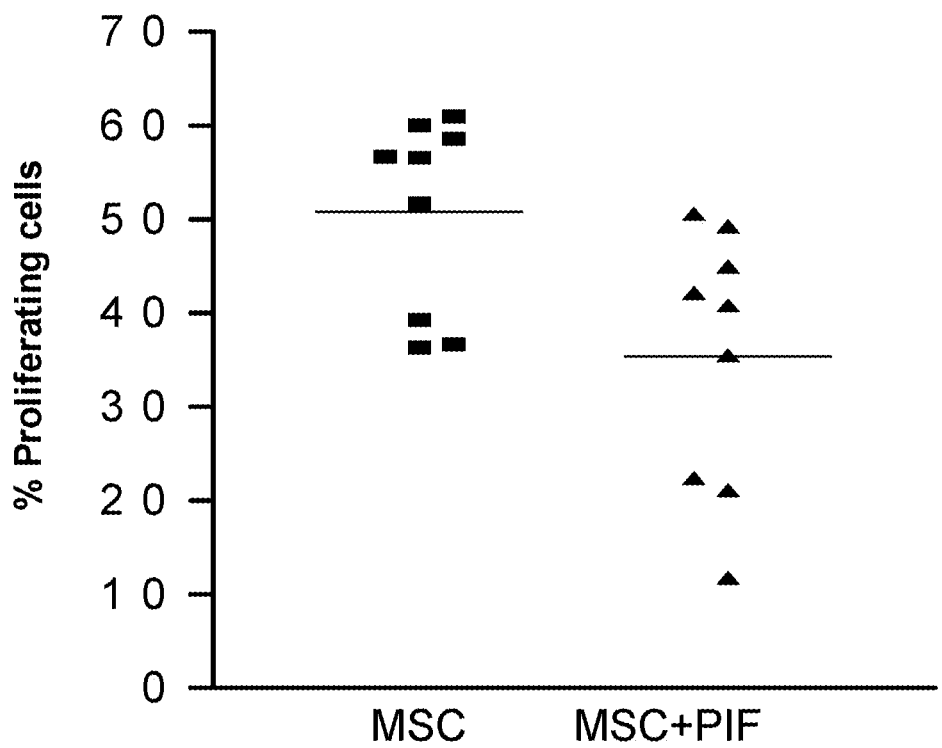

Although the BM was incubated with sPIF for only 2 hrs. prior to transplantation, the experimental group receiving sPIF-treated cells showed enhanced reconstitution of the total WBC count, and specifically lymphocyte count, three and four weeks after transplantation (FIGS. 7B and 7C). Whether this effect was exerted by improved bone marrow cellularity was further examined (FIG. 7D, E, F). Data showed that sPIF led to restored BM by reducing fat cells presence in the femur. Since sPIF-based preconditioning was effective in vivo following BMT, the possible mechanisms involved in this protection were further examined. The effect of sPIF pre-treatment on BM antigenicity was examined. sPIF preincubated with MSCs for 2 hrs. were added in culture to CFSE labelled splenocytes activated by anti-CD3 antibody assessing effect on proliferation. (FIG. 7G) Flow cytometry data documented that such precondition has a significant effect reducing the number of proliferating cells. FIG. 7F shows that PIF preconditioning of MSCs lead to their differentiation to B and T cells. FIG. 7H shows that PIF prevents weight loss when examined 5 days after transplantation.

This demonstrated that short-term exposure of sPIF for BM cells is sufficient to lead to effective engraftment without requiring further therapy post-transplant long-term. This implies that short-term direct effect of sPIF in culture can translate into long-term pro-engraftment effects in vivo.

Figure 8A:
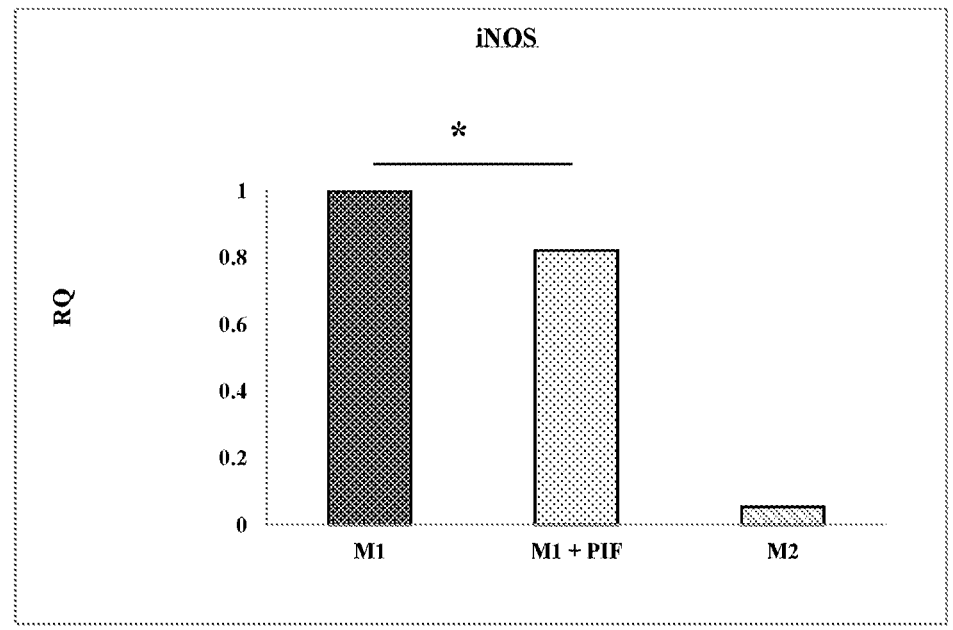
FIGS. 8A to 8E illustrate that PIF shifts M1 macrophage differentiation to an M2-like phenotype. Peritoneal macrophages were cultured with GM-CSF (10 ng/ml) and LPS (10 ng/ml) for M1 differentiation or with M-CSF (10 ng/ml) and IL-4 (10 ng/ml) for M2 differentiation for 20 h in either the presence or absence of PIF. qPCR analyses of iNOS (FIG. 8A), COX-2 (FIG. 8B), and Arginase (FIG. 8C) mRNA expression of the differentiated cells were performed. % of M1 macrophages gMFI of F480 (FIG. 8D) and CD1 1b (FIG. 8E) by FACS analysis are shown. Results represent 5-6 independent experiments. *P<0.05,  P<0.01 **P<0.001.
Figure 8B:
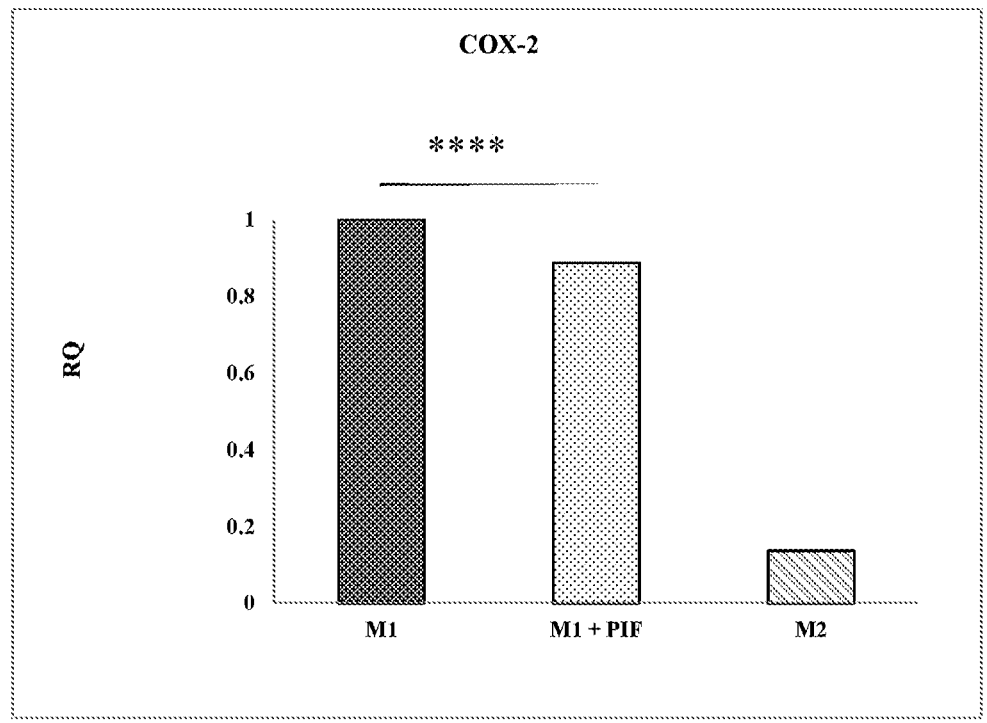
Figure 8C:
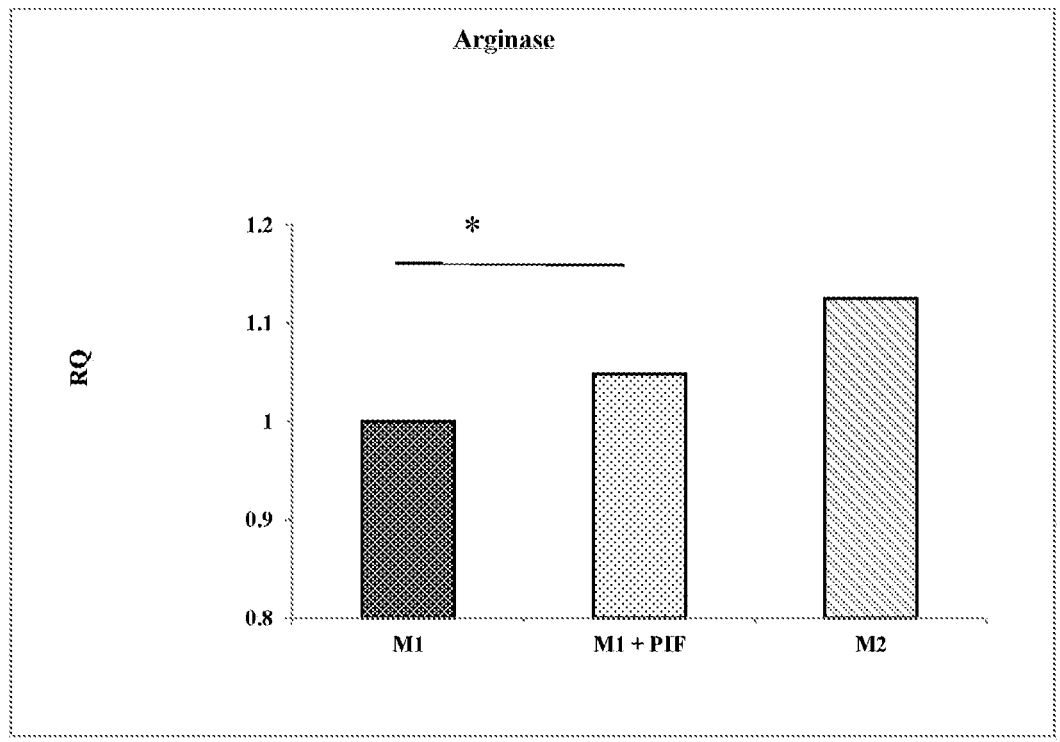
Figure 8D:
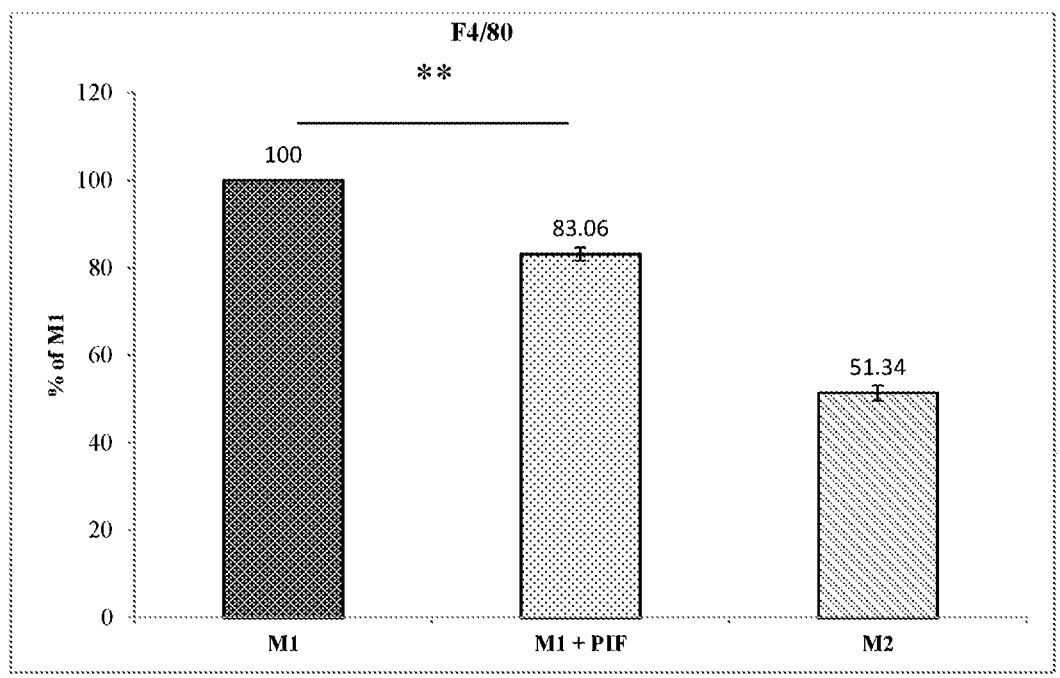
Figure 8E:
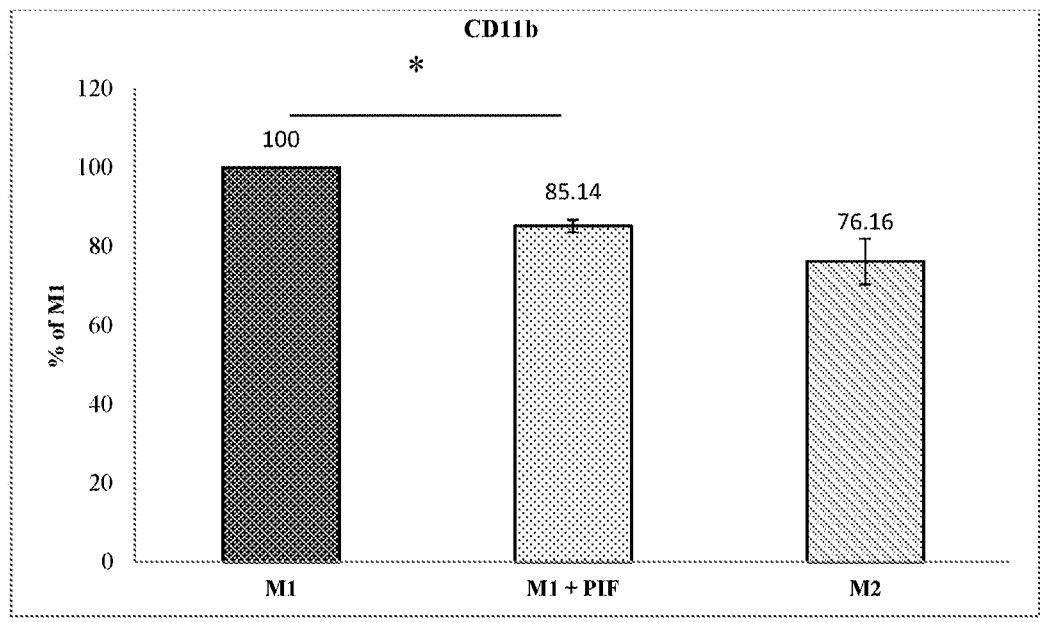
Figure 9A:
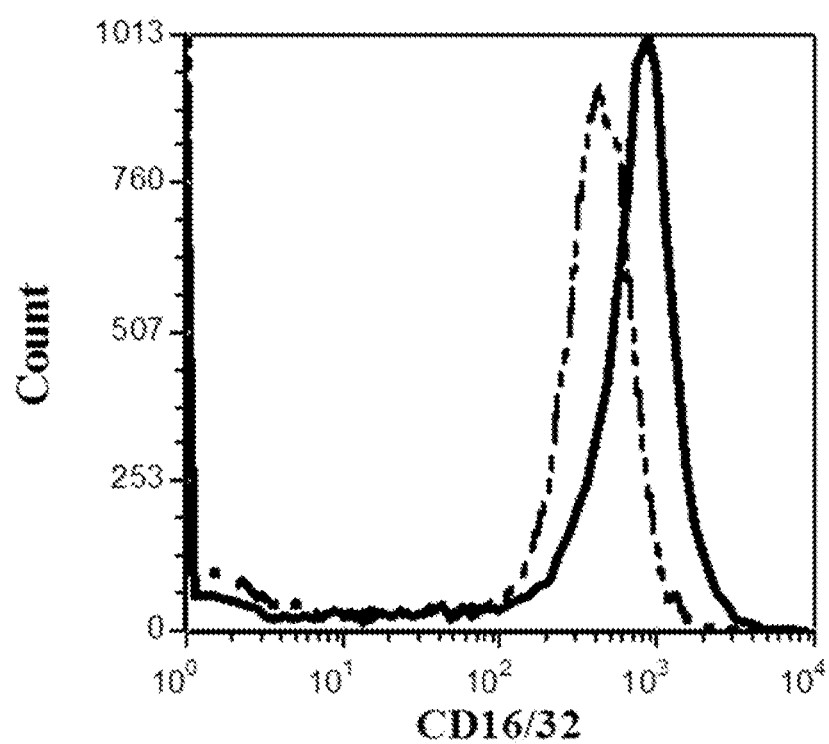
FIGS. 9A and 9B illustrate FACS analyses of CD16/32 (FIG. 9A) and CD206 (FIG. 9B). Peritoneal macrophages were cultured with GM-CSF (10 ng/ml) and LPS (long/ml) for M1 differentiation or with M-CSF (10 ng/ml) and IL-4 (10 ng/ml) for M2 differentiation for 20 h. Solid lines represent M1, and dashed lines represent M2 macrophages. One representative figure out of 4 independent experiments.
Figure 9B:
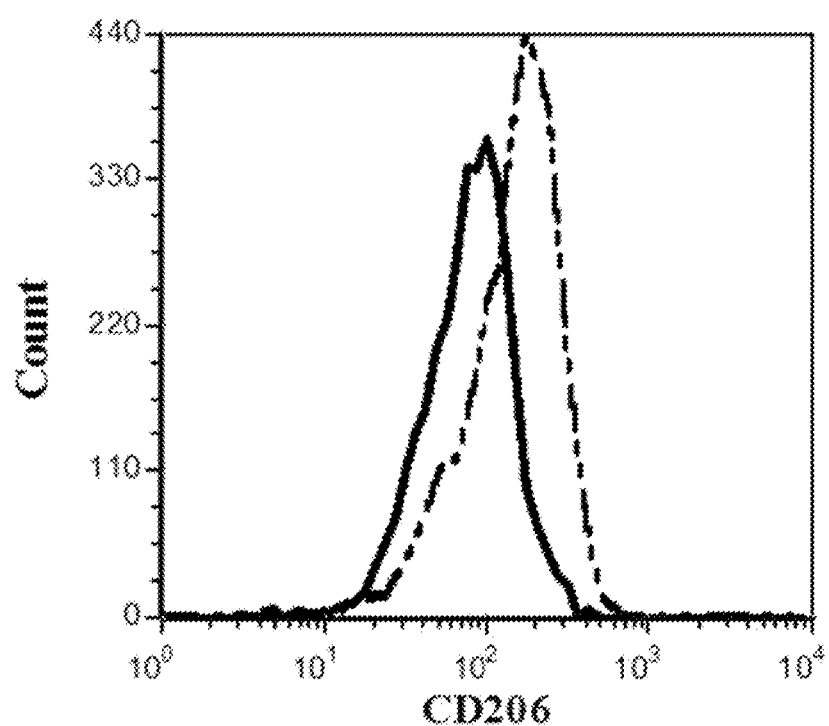

Example 10 sPIF alters macrophage differentiation: Given the importance of immune response in ARS and immune modulatory effect of sPIF on monocytes, sPIF's effect on macrophages in vitro was tested. It was previously shown that PIF upregulates B7H1 in macrophages, reflecting immune regulatory effects on T-cells proliferation. This upregulation was further confirmed since in sPIF primed macrophages following co-culture with activated T-cells has led to the reduced proliferation. The current experiments aimed to examine whether the protective effect of sPIF in both sub-lethal and in lethal ARS models are due to a shift in macrophage polarity thereby reducing the inflammatory response following ionizing radiation. Macrophages are key mediators of the immune response and can differentiate into inflammatory (M1) and regulatory (M2) macrophages. Thus, we obtained peritoneal macrophages from C57BL/6 mice and differentiated them towards a M1 or M2 phenotype in the presence of sPIF (FIGS. 8 and 9). Expectedly, sPIF significantly decreased iNOS (NOS2) and COX-2 genes expression (FIGS. 8A and 8B, respectively) in M1 differentiating macrophages and enhanced the expression of arginase-1, which is a marker of M2 regulatory macrophages (FIG. 8C). Additionally, FACS analysis confirmed downregulation of macrophage cell surface CD1 1b and F4/80 expression to resemble an M2 macrophage phenotype (FIGS. 8D and 8E). FIG. 9 shows that PIF shift CD16/32 and CD206 expression, further evidencing the shift to M2. Collectively, these results suggest that sPIF may regulate immune response in irradiated mice by targeting M1/M2 macrophages.

Figure 13:
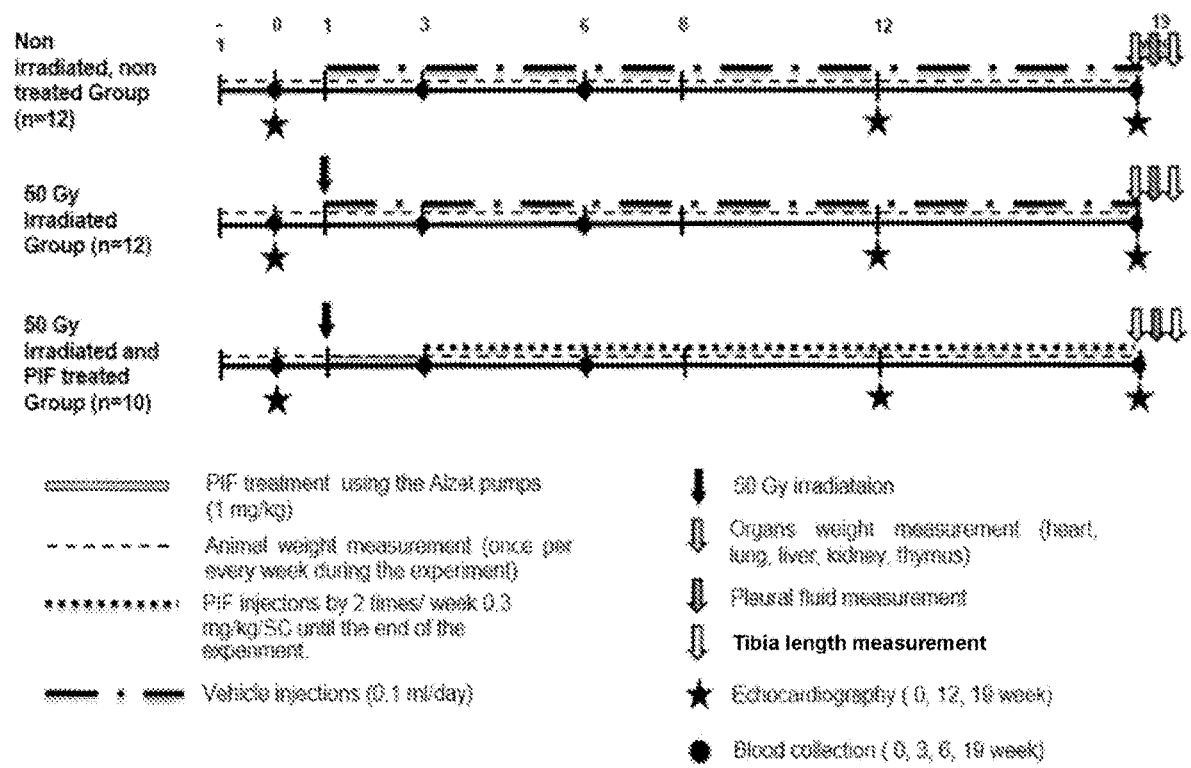
FIG. 13 illustrates the experimental protocol using PIF's injection for testing the effect against lethal 50 Gy radiation long term in rats. It depicts a flowchart of a protocol and dosing regimen describing when and how organ transplant will be evaluated.

PIF protects against lethally irradiated heart. I/1. Radiation-induced heart disease (RIHD) is a concern during radiotherapy. Patho-mechanisms involved are progressive atherosclerosis of coronary arteries due to endothelial damage, and the diffuse injury of the myocardium due to the loss of small vessels and cardiomyocytes replaced by fibrosis). In a murine model, the parallel study of the macro-vasculature-mediated and diffuse radiation heart injuries with heart function studies (cardio-echo), the time-dependent evaluation of survival weight, skin healing was evaluated Newborn rats 10-12/group were exposed to 50 Gy lethal radiation targeting the heart specifically. Subsequently sPIF continuous delivery was implanted using an Alzet pump. The pump released PIF for 2 w 1 mg/kg/day. (The sketch of the protocol is described in FIG. 13). Faster hair growth was noted on the site of irradiation and surgery in the sPIF-treated animals than in the irradiated rats. The scar healing was faster some days after the implantation of the Alzet pump in the PIF-treated animals after 2 weeks long PIF-treatment. The daily activity of the PIF-treated animals was higher, they were much more playful then the other animals in the irradiated group.

Example 11

Figure 11:
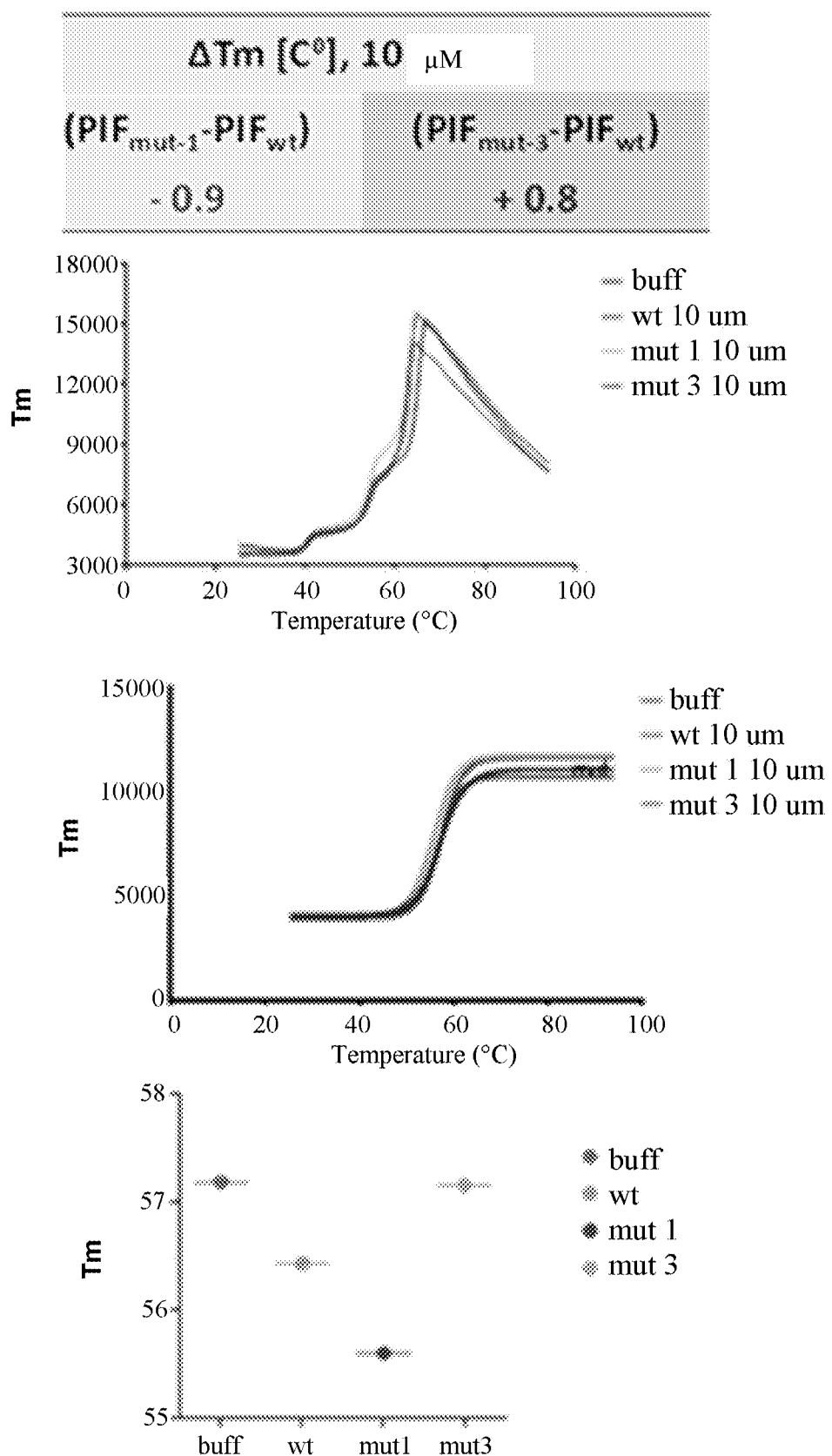
FIG. 11 illustrates data on the Differential Shift Assay analysis of PIF mutants for IDE, which is a binding partner for PIF. PIF mutants 1 and 3 bind the Insulin-degrading enzyme (IDE).
Figure 12:
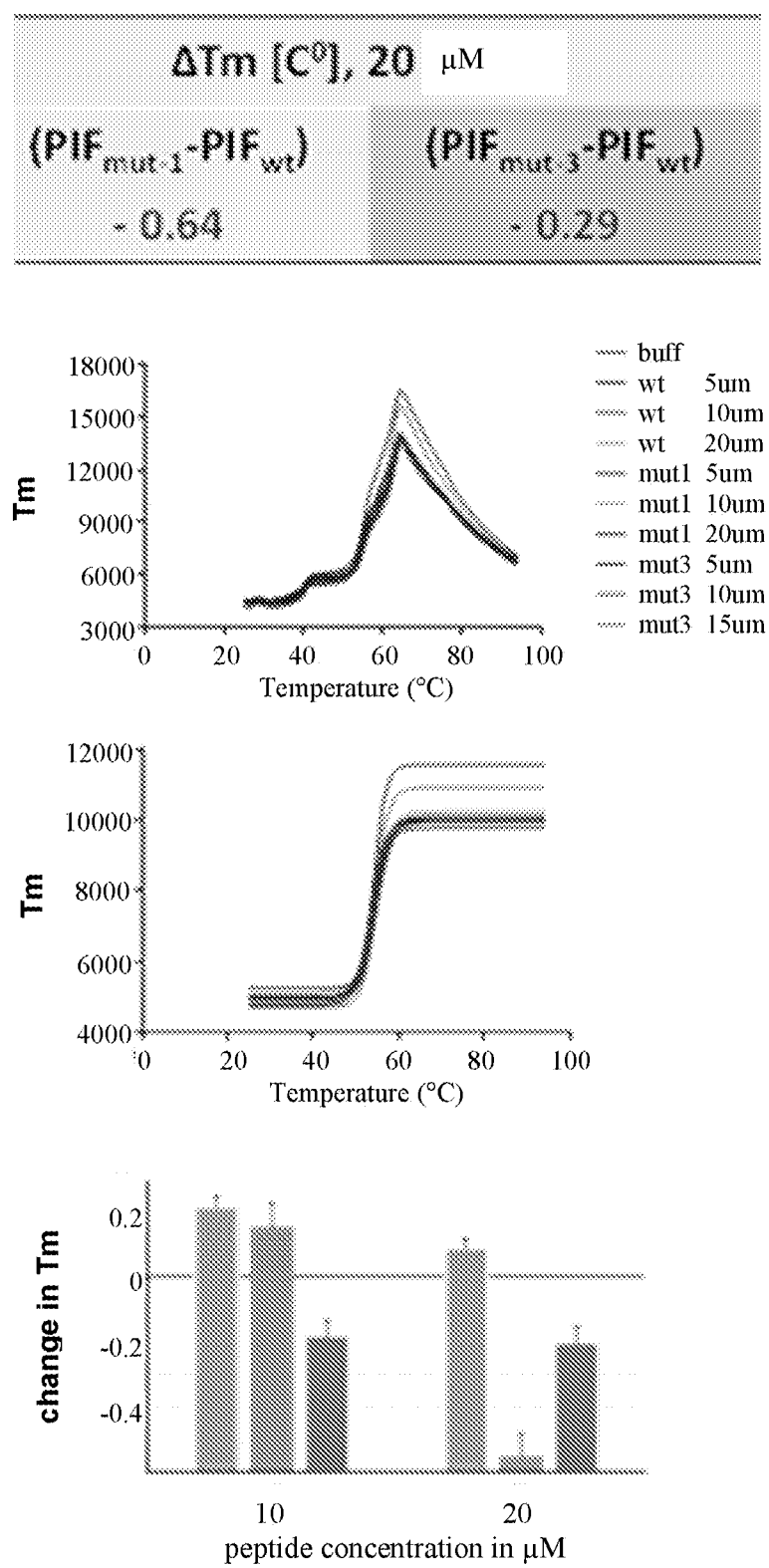
FIG. 12 depicts data on the Differential Shift Assay analysis of PIF mutants for Kv1.3f3, which is a binding partner for PIF. The bottom panel depicts the change of Tm in 10 micromolar concentration of PIF mutants (left side versus 20 micromolar concentration of PIF (right side).

PIF core peptide sequence investigation: In silico docking of PIFwt reveal that chain A of the KCNAB1 (Kv1.3 (3) tetramer to be more likely PIF target than the three other chains. The in silico mutagenesis of docked PIFwt: Kv1.3 (3 interface also reveals M*RIKP*N importance (mutation in M1, I4, K5, P6 and N10 are strongest interface disruptors), but shows no similarity among the tetramer domains: a. FlexPepDock server docking of PIF suggested that PIF is more stable when binding to chain A; b. BeatMusic server was used for in silico mutagenesis, in order to predict which amino acid of the PIF sequence upon mutation would yield a higher Energy PIF-Kv1.3 (3: A-D complex, and thus less stable structure. Thus 2 putative mutants were conceived, mutant-1: P6→E6, and mutant-3:14→G4; c. Table represent the mutants that were considered, of them 2 were synthesized based on their putative availability as options for ligand-receptor disruptors). Mutant 1 (P6→E6) is more specific for chain D of the Kv1.3 (3, the form that also had high energy of binding and interface score. Mutant 3 (14→G4) is predicted to disrupt the binding with chain A of the Kv1.3 (3. An example with more details of the in-silico mutagenesis using several PIF targets also suggests that RIKP is the core sequence. The validation of the mutants is shown in FIG. 11 for another target of PIF-IDE (data on the Differential Shift Assay is shown). The validation of mutants is also shown in FIG. 12, which shows Differential Shift Assay data for Kv1.3 (3.

Flexible in silico docking (Algorithm #2: CABS Dock—this is a molecular modelling approach where the PIF sequence is only provided, not a model, and the simulation of its molecular dynamics and flexibility are used to seek where the peptide would bind) models were compared to flexible in silico docking (Algorithm #1: FlexPepDock) by projecting PIF wt from FlexPepDock over the FLAG-GG-PIF-HA models, obtained in CABS Dock. Remarkably, both algorithms (very distinct in nature) predict binding to the same "pocket" in Kv1.3 (3 with the consensus sequence RIKP shared in the interface of both types of models, but with opposite directions. The data suggests double tagged PIF to be able to bind PIF wt targets in most cases. IDE binding and PIFwt vs PIFmut-⅓ bound to Kv1.3f3 were studied.

Example 12

Figure 14:
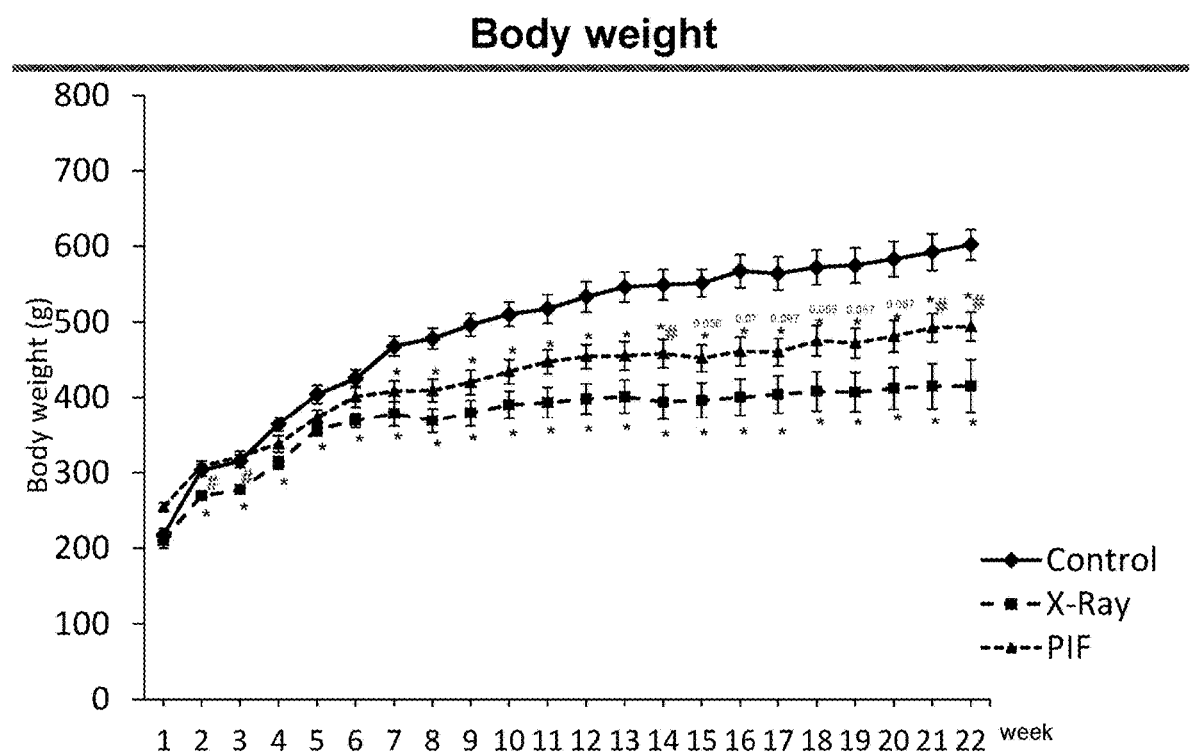
FIG. 14 illustrates the effect of PIF treatment following lethal radiation on body weight until 19 weeks of study in rats. PIF increases rats' weight at the end of the experiments vs PBS *<0.05. It depicts a one-way ANOVA plot of naive mice, mice irradiated with X-ray and those treated with PIF. n=9-12 mice. Holm Sidak post hoc test was performed with a confidence interval of <0.05. PIF-treated animals that were irradiated scored higher in body weight than those animals irradiated alone.

FIG. 14 showed that following 2 w continuous and subsequent twice weekly injections sPIF improves the rats' weight as compared with control after 19 weeks of the study. The effect was significant vs vehicle treated rats. The growth curve was similar to non-irradiated rats.

Figure 15:
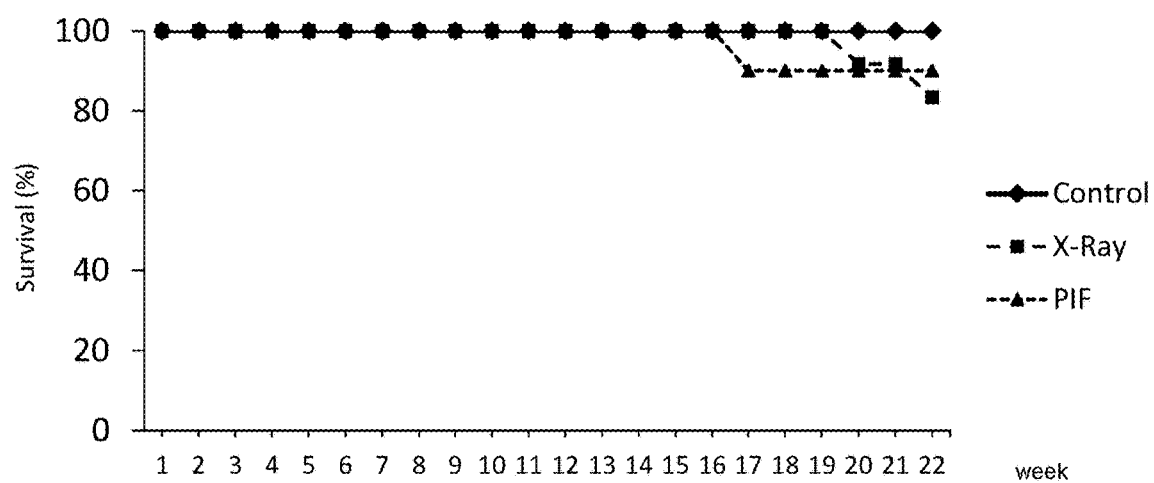
FIG. 15 depicts a Kaplan Meier curve of PIF-treated animals as compared to controls with a time period measured over 22 weeks of time. It shows survival curve of PIF treated rats following lethal radiation. No differences were found with controls.

FIG. 15 shows that post-lethal irradiation sPIF survival is preserved until the end of the study and it is slightly lower than that in PBS treated rats.

FIG. 16 described the cardiac indices that sPIF can affect following lethal irradiation.

FIG. 17 shows that sPIF protects against lethal radiation affecting a number of cardiac indices among them. AWTs-anterior wall thickness both in systole and diastole. In addition, it reduces PWT thickness during diastole, P<0.05.

FIG. 18 shows that sPIF significantly improved rats' body weight as compared with PBS treated controls.

FIG. 19 shows that sPIF increases kidney weight as compared with PBS control. P<0.05.

PIF injection protects against heterotrophic cardiac graft rejection. Mice Balb/c were transplanted cardiac allograft to the abdominal cavity of the recipient (57B116) attaching the vessels to the abdominal aorta. Following transplant sPIF twice daily injections were carried out determining transplanted heart activity by determining cardiac pulsations using a stethoscope. The effect of sPIF was compared with PBS treated control. Data showed that sPIF significantly delayed rejection 9+/−0.52 SE vs 7+/−0 (N=18 sPIF and N=5 control), P<0.002, (DF 17).

PIF promotes primary adrenal cell viability and cortisol secretion: basis for bioartificial adrenal. Congenital adrenal hyperplasia (CAH) due to deficiency of 21-hydroxylase is the most common genetic endocrine disorder in humans, presenting with clinical symptoms of neuroendocrine perturbations, virilization and metabolic disease in later life. Patients may suffer from hypotensive crises, hypoglycemia, acne, and infertility.

Current treatment options with glucocorticoid substitution can reverse the symptoms only partially and exhibit the unpleasant side effects of excess glucocorticoid treatment. Despite different treatment algorithms, the management of CAH remains a major therapeutic challenge sometimes requiring drastic therapeutic measures such as bilateral adrenalectomy (Merke et al., 1999). Adrenal cell transplantation is a feasible therapeutic alternative for those patients. However, this strategy is critically limited by persistent lack of human donor organs and the requirement of chronic immune suppression.

One of the ways to solve those problems could be transplantation of xenogeneic cells. Remarkable breakthrough in xenotransplantation is based on application of microencapsulated in alginate xenogeneic cells. This method provides promising platform for cell therapy (Dolgin et al., 2014). Cell microencapsulation aims to protect the transplanted cells from attack by the host immune system without immunosuppressive agents (Neufeld et al., 2013) and the recipient from immunization. There is a future advantage that implantation could be accomplished by simple injection procedure rather than by a surgical operation. PIF exposure to primary bovine adrenal cells could be a suitable source for enabling effective adrenal transplantation.

Experiments on primary bovine adrenocortical cells (BAC), isolated from four bovine adrenal glands. For viability, apoptosis and proliferation assay BAC were seeded in 96 well plates ($1 \times 10^4$ cells per well, sixplicate). For cortisol production assay cells were seeded in 24 well plate ($5 \times 10^4$ cells per well, triplicate). PIF was dissolved in Saline and was used in concentration 0.1 µg/ml. One group of cells received PIF contained medium right after cell isolation (PIF d0). Another group of cells received PIF containing medium 24-hour post cell isolation (PIF d1). Control cells did not receive PIF. Viability was assessed using XTT Cell Proliferation Assay (Roche) on day 3 after beginning of the treatment. Proliferation was measured using BrdU Cell Proliferation Assay (Millipore) on day 3 after beginning of the treatment. Apoptosis was assayed by determination of caspase 3/7 activity using Caspase-Glo 3/7 Assay (Promega) on day 3 after beginning of the treatment. For stimulated cortisol ACTH (Synacthen) in concentration 3 ng/mL was used. Cortisol in supernatant will be measured by EIA (IBL). Data in FIG. 20 shows that PIF in culture increases cells viability while reducing apoptosis. Data in FIG. 21 shows that PIF promotes cortisol secretion significantly by these cells effect was most pronounced one day after addition to culture. This supportive data indicates that adrenal cells pre-conditioning could be valuable prior to transplant to the host therefore opens the possibility of developing a bio-artificial adrenal.

Experiments on rat insulinoma cells using PIF-basis for islet transplantation. PIF regulates global immune response both in vitro and in vivo [15-17]. PIF prevents diabetes development in NOD mice in both adoptive transfer and spontaneously developing disease long term. PTFscr tested in parallel has no effect. The preserved islet architecture and insulin expression is associated with increased pancreatic PDI/Thioredoxin and HSP proteins levels. This is coupled with systemic immunity regulation reflected by changes in both TH1 and Th2 cytokine levels. As recently shown (Barnea PLOS One 2014). PIF directly targets PDI/T and HSPs through a shared binding site. Thus, the protection observed against oxidative stress and protein misfolding critical for transplant protection is mechanistically plausible. Having the ability to transplant viable islets cells to patients with Type I diabetes would be a major progress since until present such an approach is limited both by the availability of donor cells as well after transplantation there is a requirement for continuous immune suppression and despite the engraftment the transplanted cells fail to provide adequate insulin for these patients on a long-term basis.

PIF administration Ins-1 cells of passage 24 were used in the experiments. For viability, apoptosis and proliferation assay cells were seeded in 96 well plates ($1\times10^4$ cells per well, sixplicate). PIF was used in three concentrations: 0.01 µg/ml; 0.1 µg/ml and 1 µg/ml. Medium, containing substrates, was changed every day. Viability was assessed using XTT Cell Proliferation Assay (Roche). Proliferation was measured using BrdU Cell Proliferation Assay (Roche). Apoptosis was assayed by determination of caspase 3/7 activity using Caspase-Glo 3/7 Assay (Promega). Results were analyzed by regression analysis for evaluation of the processes occurring in the tested models. For evaluation of the effects of PIF on cells Wilcoxon signed-rank test for related samples and Spearman's rank correlation and Student's t-test were used. FIG. 22 shows that PIF promotes insulinoma cells viability at 48 hours and proliferation at low 0.1 µg/ml concentration. The increase in apoptosis indicates elimination of cells of poor quality of frequent occurrence in culture conditions.

---

What is claimed is:

1. A method of treating and/or preventing acute radiation syndrome in a subject in need thereof and that has not received a bone marrow transplant, the method comprising:
after the subject has been exposed to radiation, administering to the subject a pharmaceutical composition comprising a therapeutically effective amount of a PreImplantation Factor (PIF) peptide, and a pharmaceutically acceptable carrier, the PIF peptide being selected from the group consisting of:
SEQ ID NO:3;
SEQ ID NO:6;
SEQ ID NO:13;
SEQ ID NO:15;
SEQ ID NO:16;
SEQ ID NO:17; and
combinations thereof.

2. A method of treating and/or preventing gastrointestinal inflammation or injury associated with acute radiation syndrome in a subject in need thereof and that has not received a bone marrow transplant, the method comprising:
after the subject has been exposed to radiation, administering to the subject a pharmaceutical composition comprising a therapeutically effective amount of a PreImplantation Factor (PIF) peptide, and a pharmaceutically acceptable carrier, the PIF peptide being selected from the group consisting of:
SEQ ID NO:3;
SEQ ID NO:6;
SEQ ID NO:13;
SEQ ID NO:15;
SEQ ID NO:16;
SEQ ID NO:17; and
combinations thereof.

3. The method of claim 1, wherein the therapeutically effective amount is from about 0.10 milligrams/kilograms/day to about 10.00 milligrams/kilograms/day.

4. The method of claim 1, wherein the therapeutically effective amount is from about 0.75 milligrams/kilograms/day to about 1.50 milligrams/kilograms/day.

5. The method of claim 1, wherein the therapeutically effective amount is from about 0.75 milligrams/kilograms/day to about 1.00 milligrams/kilograms/day.

6. The method of claim 1, wherein the pharmaceutical composition is administered within about 24 hours after the exposure to the radiation.

7. The method of claim 1, wherein the pharmaceutical composition is administered intermittently or continuously for a time period of from about 2 to about 14 days.

8. The method of claim 1, wherein the pharmaceutical composition is administered intermittently for at least about twelve weeks.

9. The method of claim 1, wherein the pharmaceutical composition is administered intravenously, intramuscularly, or subcutaneously.

10. The method of claim 1, wherein the pharmaceutical composition is administered in an intermittent or continuous infusion.

11. The method of claim 1, wherein the acute radiation syndrome is caused by exposure to lethal radiation.

12. The method of claim 1, wherein the acute radiation syndrome is caused by exposure to a radiation dose of about 100 rads to about 6000 rads.

13. The method of claim 1, wherein the acute radiation syndrome comprises delayed effects of acute radiation exposure, and/or damage to any organ, tissue, or cell.

14. The method of claim 1, wherein the acute radiation syndrome is caused by exposure to sub-lethal radiation.

15. The method of claim 1, wherein the PIF peptide is SEQ ID NO: 13.

16. The method of claim 1, wherein the therapeutically effective amount of the PIF peptide is from about 0.10 milligrams/kilograms/day to about 10.00 milligrams/kilograms/day.

17. The method of claim 2, wherein the pharmaceutical composition is administered intravenously, intramuscularly, or subcutaneously.

18. A method of treating and/or preventing colon inflammation or injury associated with acute radiation syndrome in a subject in need thereof and that has not received a bone marrow transplant, the method comprising:
- after the subject has been exposed to radiation, administering to the subject a pharmaceutical composition comprising a therapeutically effective amount of a PreImplantation Factor (PIF) peptide, and a pharmaceutically acceptable carrier, the PIF peptide being selected from the group consisting of:
- SEQ ID NO:3;
- SEQ ID NO:6;
- SEQ ID NO:13;
- SEQ ID NO:15;
- SEQ ID NO:16;
- SEQ ID NO:17; and
- combinations thereof.

19. The method of claim 17, wherein the pharmaceutical composition is administered intravenously, intramuscularly, or subcutaneously.

20. The method of claim 17, wherein the therapeutically effective amount of the PIF peptide is from about 0.10 milligrams/kilograms/day to about 10.00 milligrams/kilograms/day.

* * * * *

SEQUENCE LISTING

```
Sequence total quantity: 40
SEQ ID NO: 1            moltype = AA  length = 15
FEATURE                 Location/Qualifiers
REGION                  1..15
                        note = Synthetic Peptide
source                  1..15
                        mol_type = protein
                        organism = synthetic construct
SEQUENCE: 1
MVRIKPGSAN KPSDD                                                          15

SEQ ID NO: 2            moltype = AA  length = 15
FEATURE                 Location/Qualifiers
REGION                  1..15
                        note = Synthetic peptide
source                  1..15
                        mol_type = protein
                        organism = synthetic construct
SEQUENCE: 2
MVRIKYGSYN NKPSD                                                          15

SEQ ID NO: 3            moltype = AA  length = 13
FEATURE                 Location/Qualifiers
REGION                  1..13
                        note = Synthetic peptide
source                  1..13
                        mol_type = protein
                        organism = synthetic construct
SEQUENCE: 3
MVRIKPGSAN KPS                                                            13

SEQ ID NO: 4            moltype = AA  length = 9
FEATURE                 Location/Qualifiers
REGION                  1..9
                        note = Synthetic peptide
source                  1..9
                        mol_type = protein
                        organism = synthetic construct
SEQUENCE: 4
MVRIKPGSA                                                                  9

SEQ ID NO: 5            moltype = AA  length = 15
FEATURE                 Location/Qualifiers
REGION                  1..15
                        note = Synthetic peptide
source                  1..15
                        mol_type = protein
```

```
                                         -continued
                          organism = synthetic construct
SEQUENCE: 5
GRVDPSNKSM PKDIA                                                                 15

SEQ ID NO: 6              moltype = AA   length = 10
FEATURE                   Location/Qualifiers
REGION                    1..10
                          note = Synthetic peptide
source                    1..10
                          mol_type = protein
                          organism = synthetic construct
SEQUENCE: 6
SQAVQEHAST                                                                       10

SEQ ID NO: 7              moltype = AA   length = 13
FEATURE                   Location/Qualifiers
REGION                    1..13
                          note = Synthetic peptide
source                    1..13
                          mol_type = protein
                          organism = synthetic construct
SEQUENCE: 7
SQAVQEHAST NMG                                                                   13

SEQ ID NO: 8              moltype = AA   length = 13
FEATURE                   Location/Qualifiers
REGION                    1..13
                          note = Synthetic peptide
source                    1..13
                          mol_type = protein
                          organism = synthetic construct
SEQUENCE: 8
EVAQHSQAST MNG                                                                   13

SEQ ID NO: 9              moltype = AA   length = 14
FEATURE                   Location/Qualifiers
REGION                    1..14
                          note = Synthetic peptide
source                    1..14
                          mol_type = protein
                          organism = synthetic construct
SEQUENCE: 9
GQASSAQMNS TGVH                                                                  14

SEQ ID NO: 10             moltype = AA   length = 18
FEATURE                   Location/Qualifiers
REGION                    1..18
                          note = Synthetic peptide
source                    1..18
                          mol_type = protein
                          organism = synthetic construct
SEQUENCE: 10
SGIVIYQYMD DRYVGSDL                                                              18

SEQ ID NO: 11             moltype = AA   length = 11
FEATURE                   Location/Qualifiers
REGION                    1..11
                          note = Synthetic peptide
source                    1..11
                          mol_type = protein
                          organism = synthetic construct
SEQUENCE: 11
GMRELQRSAN K                                                                     11

SEQ ID NO: 12             moltype = AA   length = 9
FEATURE                   Location/Qualifiers
REGION                    1..9
                          note = Synthetic peptide
source                    1..9
                          mol_type = protein
                          organism = synthetic construct
SEQUENCE: 12
VIIIAQYMD                                                                         9

SEQ ID NO: 13             moltype = AA   length = 15
FEATURE                   Location/Qualifiers
REGION                    1..15
                          note = Synthetic peptide
source                    1..15
```

```
                               mol_type = protein
                               organism = synthetic construct
SEQUENCE: 13
MVRIKPGSAN KPSDD                                                              15

SEQ ID NO: 14                  moltype = AA   length = 13
FEATURE                        Location/Qualifiers
REGION                         1..13
                               note = Synthetic peptide
source                         1..13
                               mol_type = protein
                               organism = synthetic construct
SEQUENCE: 14
SQAVQEHAST NMG                                                                13

SEQ ID NO: 15                  moltype = AA   length = 18
FEATURE                        Location/Qualifiers
REGION                         1..18
                               note = Synthetic peptide
source                         1..18
                               mol_type = protein
                               organism = synthetic construct
SEQUENCE: 15
SGIVIYQYMD DRYVGSDL                                                           18

SEQ ID NO: 16                  moltype = AA   length = 9
FEATURE                        Location/Qualifiers
REGION                         1..9
                               note = Synthetic peptide
source                         1..9
                               mol_type = protein
                               organism = synthetic construct
SEQUENCE: 16
MVRIKPGSA                                                                      9

SEQ ID NO: 17                  moltype = AA   length = 9
FEATURE                        Location/Qualifiers
REGION                         1..9
                               note = Synthetic peptide
source                         1..9
                               mol_type = protein
                               organism = synthetic construct
SEQUENCE: 17
VIIIAQYMD                                                                      9

SEQ ID NO: 18                  moltype = AA   length = 5
FEATURE                        Location/Qualifiers
REGION                         1..5
                               note = Synthetic peptide
source                         1..5
                               mol_type = protein
                               organism = synthetic construct
SEQUENCE: 18
MVRIK                                                                          5

SEQ ID NO: 19                  moltype = AA   length = 4
FEATURE                        Location/Qualifiers
REGION                         1..4
                               note = Synthetic peptide
source                         1..4
                               mol_type = protein
                               organism = synthetic construct
SEQUENCE: 19
PGSA                                                                           4

SEQ ID NO: 20                  moltype = AA   length = 15
FEATURE                        Location/Qualifiers
REGION                         1..15
                               note = Synthetic peptide
VAR_SEQ                        3
                               note = MISC_FEATURE - Xaa is any amino acid except arginine
source                         1..15
                               mol_type = protein
                               organism = synthetic construct
SEQUENCE: 20
MVXIKPGSAN KPSDD                                                              15

SEQ ID NO: 21                  moltype = AA   length = 15
FEATURE                        Location/Qualifiers
```

```
REGION                   1..15
                         note = Synthetic peptide
VAR_SEQ                  1
                         note = MISC_FEATURE - Xaa is any amino acid except arginine
source                   1..15
                         mol_type = protein
                         organism = synthetic construct
SEQUENCE: 21
XVRIKPGSAN KPSDD                                                                 15

SEQ ID NO: 22            moltype = AA  length = 15
FEATURE                  Location/Qualifiers
REGION                   1..15
                         note = Synthetic peptide
VAR_SEQ                  1
                         note = MISC_FEATURE - Xaa is any amino acid except arginine
VAR_SEQ                  3
                         note = MISC_FEATURE - Xaa is any amino acid except arginine
source                   1..15
                         mol_type = protein
                         organism = synthetic construct
SEQUENCE: 22
XVXIKPGSAN KPSDD                                                                 15

SEQ ID NO: 23            moltype = AA  length = 15
FEATURE                  Location/Qualifiers
REGION                   1..15
                         note = Synthetic peptide
VAR_SEQ                  6
                         note = MISC_FEATURE - Xaa is any amino acid except arginine
source                   1..15
                         mol_type = protein
                         organism = synthetic construct
SEQUENCE: 23
MVRIKXGSAN KPSDD                                                                 15

SEQ ID NO: 24            moltype = AA  length = 15
FEATURE                  Location/Qualifiers
REGION                   1..15
                         note = Synthetic peptide
VAR_SEQ                  4
                         note = MISC_FEATURE - Xaa is any amino acid except arginine
source                   1..15
                         mol_type = protein
                         organism = synthetic construct
SEQUENCE: 24
MVRXKPGSAN KPSDD                                                                 15

SEQ ID NO: 25            moltype = AA  length = 15
FEATURE                  Location/Qualifiers
REGION                   1..15
                         note = Synthetic peptide
VAR_SEQ                  2
                         note = MISC_FEATURE - Xaa is any amino acid except arginine
source                   1..15
                         mol_type = protein
                         organism = synthetic construct
SEQUENCE: 25
MXRIKPGSAN KPSDD                                                                 15

SEQ ID NO: 26            moltype = AA  length = 15
FEATURE                  Location/Qualifiers
REGION                   1..15
                         note = Synthetic peptide
source                   1..15
                         mol_type = protein
                         organism = synthetic construct
SEQUENCE: 26
MVRIKEGSAN KPSDD                                                                 15

SEQ ID NO: 27            moltype = AA  length = 15
FEATURE                  Location/Qualifiers
REGION                   1..15
                         note = Synthetic peptide
source                   1..15
                         mol_type = protein
                         organism = synthetic construct
SEQUENCE: 27
MVRGKPGSAN KPSDD                                                                 15
```

```
SEQ ID NO: 28            moltype = AA  length = 15
FEATURE                  Location/Qualifiers
REGION                   1..15
                         note = Synthetic peptide
source                   1..15
                         mol_type = protein
                         organism = synthetic construct
SEQUENCE: 28
MERIKPGSAN KPSDD                                                      15

SEQ ID NO: 29            moltype = AA  length = 15
FEATURE                  Location/Qualifiers
REGION                   1..15
                         note = Synthetic peptide
source                   1..15
                         mol_type = protein
                         organism = synthetic construct
SEQUENCE: 29
AVRIKPGSAN KPSDD                                                      15

SEQ ID NO: 30            moltype = AA  length = 14
FEATURE                  Location/Qualifiers
REGION                   1..14
                         note = Synthetic peptide
VAR_SEQ                  1
                         note = MISC_FEATURE - Xaa is any naturally occurring or
                          non-natural amino acid except that Xaa is not methionine
                          if the amino acid at position 3 is arginine
VAR_SEQ                  3
                         note = MISC_FEATURE - Xaa is any naturally occurring or
                          non-natural amino acid except that Xaa is not arginine if
                          the amino acid at position 1 is methionine
source                   1..14
                         mol_type = protein
                         organism = synthetic construct
SEQUENCE: 30
XVXIKPGSAN KPSD                                                       14

SEQ ID NO: 31            moltype = AA  length = 13
FEATURE                  Location/Qualifiers
REGION                   1..13
                         note = Synthetic peptide
VAR_SEQ                  1
                         note = MISC_FEATURE - Xaa is any naturally occurring or
                          non-natural amino acid except that Xaa is not methionine
                          if the amino acid at position 3 is arginine
VAR_SEQ                  3
                         note = Xaa is any naturally occurring or non-natural amino
                          acid except that Xaa is not arginine if the amino acid at
                          position 1 is methionine
source                   1..13
                         mol_type = protein
                         organism = synthetic construct
SEQUENCE: 31
XVXIKPGSAN KPS                                                        13

SEQ ID NO: 32            moltype = AA  length = 12
FEATURE                  Location/Qualifiers
REGION                   1..12
                         note = Synthetic peptide
VAR_SEQ                  1
                         note = MISC_FEATURE - Xaa is any naturally occurring or
                          non-natural amino acid except that Xaa is not methionine
                          if the amino acid at position 3 is arginine
VAR_SEQ                  3
                         note = MISC_FEATURE - Xaa is any naturally occurring or
                          non-natural amino acid except that Xaa is not arginine if
                          the amino acid at position 1 is methionine
source                   1..12
                         mol_type = protein
                         organism = synthetic construct
SEQUENCE: 32
XVXIKPGSAN KP                                                         12

SEQ ID NO: 33            moltype = AA  length = 11
FEATURE                  Location/Qualifiers
REGION                   1..11
                         note = Synthetic peptide
```

```
VAR_SEQ                   1
                          note = MISC_FEATURE - Xaa is any naturally occurring or
                           non-natural amino acid except that Xaa is not methionine
                           if the amino acid at position 3 is arginine
VAR_SEQ                   3
                          note = MISC_FEATURE - Xaa is any naturally occurring or
                           non-natural amino acid except that Xaa is not arginine if
                           the amino acid at position 1 is methionine
source                    1..11
                          mol_type = protein
                          organism = synthetic construct
SEQUENCE: 33
XVXIKPGSAN K                                                                       11

SEQ ID NO: 34             moltype = AA  length = 10
FEATURE                   Location/Qualifiers
REGION                    1..10
                          note = Synthetic peptide
VAR_SEQ                   1
                          note = MISC_FEATURE - Xaa is any naturally occurring or
                           non-natural amino acid except that Xaa is not methionine
                           if the amino acid at position 3 is arginine
VAR_SEQ                   3
                          note = MISC_FEATURE - Xaa is any naturally occurring or
                           non-natural amino acid except that Xaa is not arginine if
                           the amino acid at position 1 is methionine
source                    1..10
                          mol_type = protein
                          organism = synthetic construct
SEQUENCE: 34
XVXIKPGSAN                                                                         10

SEQ ID NO: 35             moltype = AA  length = 9
FEATURE                   Location/Qualifiers
REGION                    1..9
                          note = Synthetic peptide
VAR_SEQ                   1
                          note = MISC_FEATURE - Xaa is any naturally occurring or
                           non-natural amino acid except that Xaa is not methionine
                           if the amino acid at position 3 is arginine
VAR_SEQ                   3
                          note = MISC_FEATURE - Xaa is any naturally occurring or
                           non-natural amino acid except that Xaa is not arginine if
                           the amino acid at position 1 is methionine
source                    1..9
                          mol_type = protein
                          organism = synthetic construct
SEQUENCE: 35
XVXIKPGSA                                                                          9

SEQ ID NO: 36             moltype = AA  length = 8
FEATURE                   Location/Qualifiers
REGION                    1..8
                          note = Synthetic peptide
VAR_SEQ                   1
                          note = MISC_FEATURE - Xaa is any naturally occurring or
                           non-natural amino acid except that Xaa is not methionine
                           if the amino acid at position 3 is arginine
VAR_SEQ                   3
                          note = MISC_FEATURE - Xaa is any naturally occurring or
                           non-natural amino acid except that Xaa is not arginine if
                           the amino acid at position 1 is methionine
source                    1..8
                          mol_type = protein
                          organism = synthetic construct
SEQUENCE: 36
XVXIKPGS                                                                           8

SEQ ID NO: 37             moltype = AA  length = 7
FEATURE                   Location/Qualifiers
REGION                    1..7
                          note = Synthetic peptide
VAR_SEQ                   1
                          note = MISC_FEATURE - Xaa is any naturally occurring or
                           non-natural amino acid except that Xaa is not methionine
                           if the amino acid at position 3 is arginine
VAR_SEQ                   3
                          note = MISC_FEATURE - Xaa is any naturally occurring or
                           non-natural amino acid except that Xaa is not arginine if
```

```
                           the amino acid at position 1 is methionine
source                     1..7
                           mol_type = protein
                           organism = synthetic construct
SEQUENCE: 37
XVXIKPG                                                                        7

SEQ ID NO: 38              moltype = AA  length = 6
FEATURE                    Location/Qualifiers
REGION                     1..6
                           note = Synthetic peptide
VAR_SEQ                    1
                           note = MISC_FEATURE - Xaa is any naturally occurring or
                            non-natural amino acid except that Xaa is not methionine
                            if the amino acid at position 3 is arginine
VAR_SEQ                    3
                           note = MISC_FEATURE - Xaa is any naturally occurring or
                            non-natural amino acid except that Xaa is not arginine if
                            the amino acid at position 1 is methionine
source                     1..6
                           mol_type = protein
                           organism = synthetic construct
SEQUENCE: 38
XVXIKP                                                                         6

SEQ ID NO: 39              moltype =     length =
SEQUENCE: 39
000

SEQ ID NO: 40              moltype =     length =
SEQUENCE: 40
000
```